(12) United States Patent
Pivac

(10) Patent No.: US 12,065,826 B2
(45) Date of Patent: *Aug. 20, 2024

(54) BLOCK FOR USE IN AUTOMATED BUILDING CONSTRUCTION

(71) Applicant: FASTBRICK IP PTY LTD, Western Australia (AU)

(72) Inventor: Mark Joseph Pivac, Western Australia (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,574

(22) Filed: Feb. 14, 2023

(65) Prior Publication Data

US 2023/0193625 A1 Jun. 22, 2023

Related U.S. Application Data

(63) Continuation of application No. 16/753,692, filed as application No. PCT/AU2018/000142 on Aug. 20, 2018, now Pat. No. 11,608,633.

(30) Foreign Application Priority Data

Oct. 4, 2017 (AU) .................................. 2017904002

(51) Int. Cl.
*E04B 2/18* (2006.01)
*B28B 1/087* (2006.01)
(Continued)

(52) U.S. Cl.
CPC ................ *E04B 2/18* (2013.01); *B28B 1/087* (2013.01); *C04B 14/108* (2013.01); *C04B 14/12* (2013.01);
(Continued)

(58) Field of Classification Search
CPC ...... E04B 2/18; E04B 1/35; E04B 2001/3588; E04B 2002/0208; E04B 2002/0228;
(Continued)

(56) References Cited

U.S. PATENT DOCUMENTS 1,633,192 A 6/1927 Reagan
1,829,435 A 10/1931 Barnhart
(Continued)

FOREIGN PATENT DOCUMENTS

CN 1458358 A 11/2003
CN 2730976 Y 10/2005
(Continued)

OTHER PUBLICATIONS

Chinese Office Action for CN Application No. 201880072854.7, mailed Apr. 27, 2021, 11 pgs.
(Continued)

*Primary Examiner* — Rodney Mintz
(74) *Attorney, Agent, or Firm* — Merchant & Gould P.C.

(57) ABSTRACT

The present disclosure relates to the building industry and in particular to a block for use in automated building construction. In one aspect, the block comprises a generally cuboid body having a top and a base, a length extending between a pair of opposed ends, and a width extending between a pair of opposed sides; the body including a plurality of hollow cores extending from said top to said base, and arranged in a row between said opposed ends; wherein each core has a rectilinear cross-sectional shape; and wherein the thickness of the block between each pair of adjacent cores is at least double the thickness of the block on all other sides of each core, so that the block is divisible into a plurality of substantially identical block portions, each portion including four walls of substantially uniform wall thickness about its core.

23 Claims, 39 Drawing Sheets

(51) Int. Cl.
 C04B 14/10 (2006.01)
 C04B 14/12 (2006.01)
 C04B 14/24 (2006.01)
 C04B 18/02 (2006.01)
 C04B 28/02 (2006.01)
 C04B 103/30 (2006.01)
 C04B 111/40 (2006.01)
 E04B 1/35 (2006.01)
 E04B 2/02 (2006.01)
 E04C 1/00 (2006.01)
 E04C 1/39 (2006.01)

(52) U.S. Cl.
 CPC ............ *C04B 14/24* (2013.01); *C04B 18/027* (2013.01); *C04B 28/02* (2013.01); *E04C 1/00* (2013.01); *C04B 2103/30* (2013.01); *C04B 2111/40* (2013.01); *E04B 1/35* (2013.01); *E04B 2001/3588* (2013.01); *E04B 2002/0208* (2013.01); *E04B 2002/0228* (2013.01); *E04B 2002/025* (2013.01); *E04B 2002/026* (2013.01); *E04B 2002/0273* (2013.01); *E04B 2002/0289* (2013.01); *E04C 1/397* (2013.01)

(58) Field of Classification Search
 CPC ......... E04B 2002/025; E04B 2002/026; E04B 2002/0273; E04B 2002/0289; E04C 1/00; E04C 1/397
 See application file for complete search history.

(56) References Cited

U.S. PATENT DOCUMENTS

| | | | |
|---|---|---|---|
| 2,151,798 | A | 3/1939 | Raad |
| 2,688,245 | A | 9/1954 | Vesper |
| 3,673,750 | A | 7/1972 | Bokvist |
| 3,974,027 | A | 8/1976 | Michel |
| 4,628,899 | A | 12/1986 | Eriksson |
| 4,698,949 | A | 10/1987 | Dietrich |
| 4,703,599 | A | 11/1987 | Pardo |
| 4,787,189 | A | 11/1988 | Haug |
| 4,798,036 | A | 1/1989 | Pardo |
| 5,402,609 | A | 4/1995 | Kelley, Jr. |
| 5,913,789 | A | 6/1999 | Varre |
| 8,677,715 | B2 | 3/2014 | Giorio |
| 9,863,145 | B2 | 1/2018 | Genest |
| 10,343,199 | B2 | 7/2019 | Hills |
| D855,835 | S | 8/2019 | Pivac |
| D898,231 | S | 10/2020 | Pivac |
| D898,945 | S | 10/2020 | Pivac |
| D898,946 | S | 10/2020 | Pivac |
| D898,947 | S | 10/2020 | Pivac |
| D898,948 | S | 10/2020 | Pivac |
| D905,870 | S | 12/2020 | Pivac |
| D924,436 | S | 7/2021 | Pivac |
| 11,608,633 | B2 * | 3/2023 | Pivac ................... B28B 1/087 |
| 2009/0104349 | A1 | 4/2009 | Hills |
| 2012/0291366 | A1 | 11/2012 | Giorio |
| 2014/0059965 | A1 | 3/2014 | Edwards |
| 2017/0145690 | A1 | 5/2017 | Genest |
| 2020/0270863 | A1 * | 8/2020 | Pivac .................. C04B 14/108 |

FOREIGN PATENT DOCUMENTS

| | | |
|---|---|---|
| CN | 203891302 U | 10/2014 |
| EP | 0190076 A1 | 8/1986 |
| FR | 1162331 A | 9/1958 |
| FR | 2230825 A1 | 12/1974 |
| FR | 2524522 A1 | 10/1983 |
| GB | 673472 A | 6/1952 |
| GB | 682010 A | 11/1952 |
| GB | 839253 | 6/1960 |

OTHER PUBLICATIONS

European Search Report for EP Application No. 18865146.7, mailed Jun. 15, 2021, 8 pgs.

Unknown: "technical and Test Institute for Construction Prague: Europaishe Technische Bewertung ETA." Jan. 5, 2017, www.mkt.de/fileadmin/mkt/pdf/Zulassungen/sul_eta.vm-ea_mw.de.pdf. May 28, 2021.

International Search Report and Written Opinion from International Application No. PCT/AU2018/000142, mail Oct. 31, 2018.

* cited by examiner

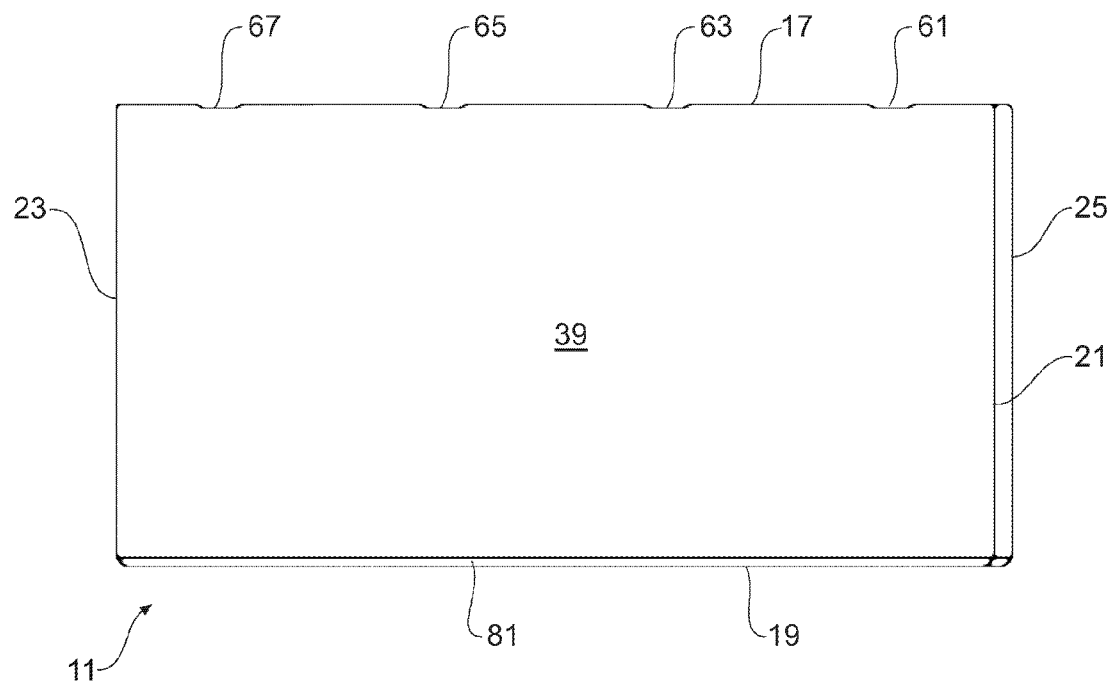
*Figure 5*
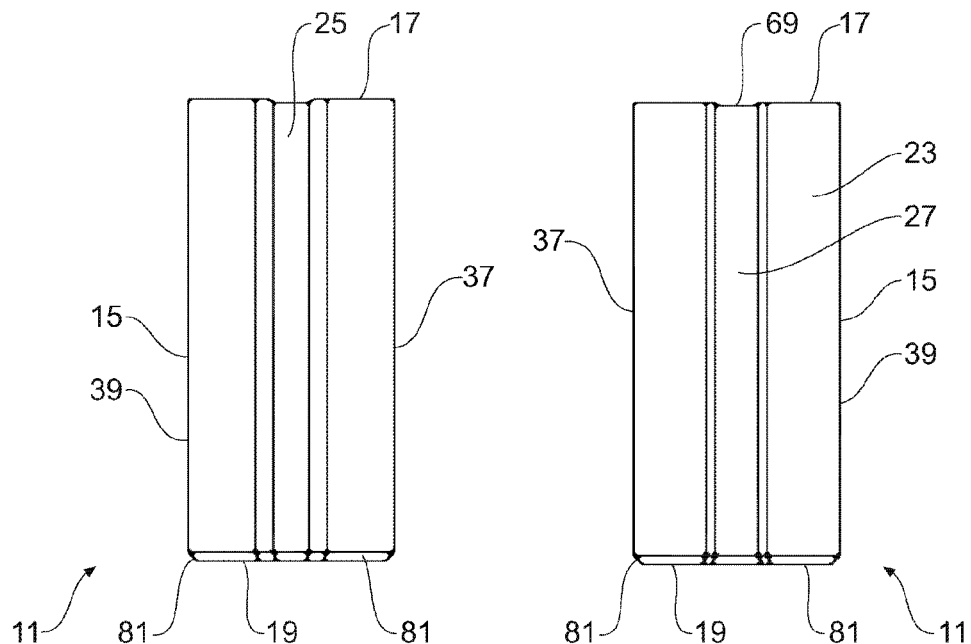
*Figure 6*     *Figure 7*

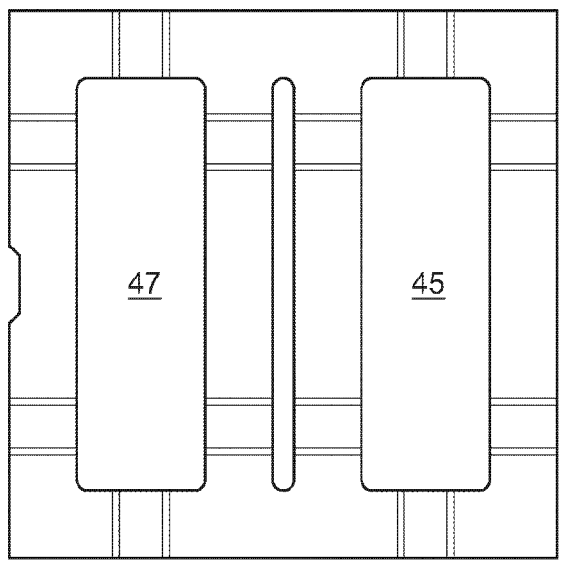 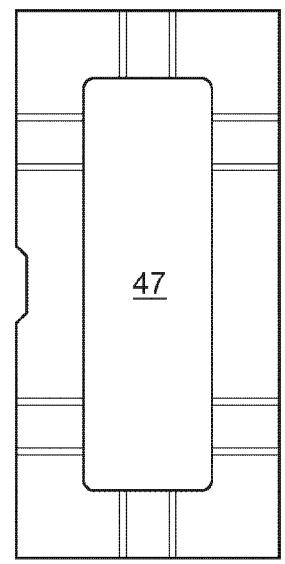
*Figure 19*    *Figure 20*
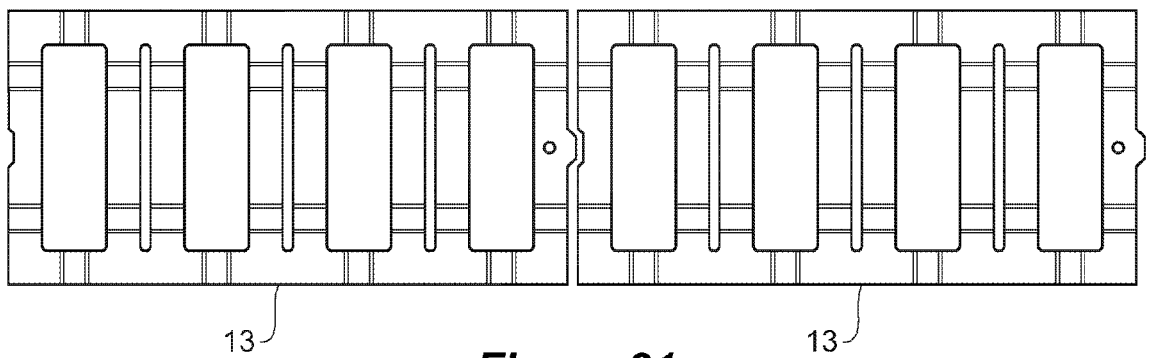
*Figure 21*
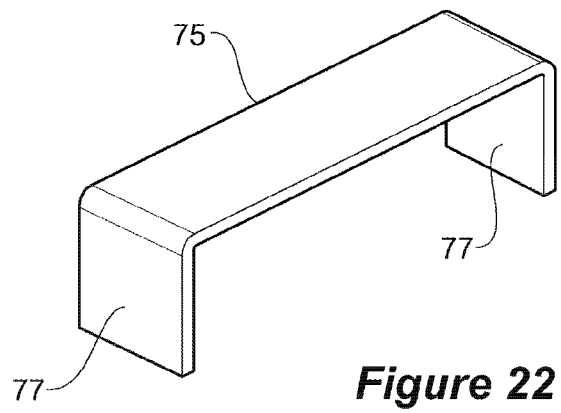
*Figure 22*

BLOCK FOR USE IN AUTOMATED BUILDING CONSTRUCTION

CROSS-REFERENCE TO RELATED APPLICATIONS

This application is a continuation of U.S. application Ser. No. 16/753,692, filed Apr. 3, 2020 which in turn is a National Stage Application of PCT/AU2018/000142, filed Aug. 20, 2018, which claims benefit of Serial No. 2017904002, filed Oct. 4, 2017 in Australia, and which applications are incorporated herein by reference. To the extent appropriate, a claim of priority is made to each of the above disclosed applications.

BACKGROUND OF THE INVENTION

The present disclosure relates to the building industry and in particular to a block for use in automated building construction.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

International Patent Application No. PCT/AU2017/050728 (WO/2018/009978) discloses a brick laying and adhesive applying head which is fitted to an articulated telescopingly extendable boom mounted on a truck, forming an automated brick laying machine. The brick laying and adhesive applying head applies adhesive to the brick, and comprises a robot which lays the brick.

Many of the common clay bricks used in building construction in Australia such as the Boral Maxi Brick, and Slick brick, are made using techniques that produce a poor tolerance of the bricks dimensions, with resultant variation between different bricks of length, height and width. This is acceptable in the construction of buildings using cement-based mortars which are laid manually, as the builder/bricklayer can adjust for variations in brick dimensions, by varying the thickness of adjoining beds of mortar as the bricks are laid. Common clay bricks are very dense, and consequently are difficult to machine. In addition to this, the size of these bricks is very small, which increases the number of handling operations in the construction of a building for a given wall area, with a resultant reduction of efficiency. Overall these factors make these bricks unsuitable for use within automated building construction requiring close tolerances in building construction.

Another block on the market that could overcome some of the problems in automated building construction is the Porotherm clay brick supplied by Wienerberger A. G. While the Porotherm clay brick has a precise height, it has an irregular width and length. The Porotherm external and internal bricks do not tie in with each other, resulting in complex joins between internal and external walls. While not an insurmountable problem, the standard size of the Porotherm does not work well with the current standard Australian door frame width and height sizes. These factors produce a large amount of waste when using the Porotherm system in the Australian construction industry. The Porotherm clay bricks are also very fragile. In addition to this, the shape and features of the Porotherm clay brick do not allow for easy recognition using machine vision techniques.

An alternative to the above described bricks and blocks is the CSR Hebel PowerBlock product. This is a solid brick formed of moulded aerated concrete. While supplied in various large format sizes which would render it suitable for use in automated building construction, the inventor has found that the need for post manufacturing processing and the tendency of the supplied bricks to warp, renders these bricks less than ideal for use with the inventor's automated building construction system.

It is against this background, and the problems and difficulties associated therewith, that the present invention has been developed.

SUMMARY OF THE PRESENT INVENTION

In one broad form, the present invention seeks to provide a block for use in automated building construction, the block comprising a generally cuboid body having:
  a) a top and a base;
  b) a length extending between a pair of opposed ends;
  c) a width extending between a pair of opposed sides;
  d) a plurality of hollow cores extending from said top to said base, and arranged in a row between said opposed ends; wherein each core has a rectilinear cross-sectional shape; and,
  wherein the thickness of the block between each pair of adjacent cores is at least double the thickness of the block on all other sides of each core, so that the block is divisible into a plurality of substantially identical block portions of rectilinear cross-sectional shape, each portion including four walls of substantially uniform wall thickness about its core.

That is to say, the cuboid body comprises six rectangular faces at right angles to each other.

In one embodiment, the walls extending about the cores are substantially solid.

In one embodiment, the walls extending about the cores include a plurality of secondary cores extending from said top to said base, the secondary cores separated by a plurality of webs.

In this way, the block is lightened by the inclusion of the secondary cores, but sufficient strength and rigidity is maintained by the webs.

In one embodiment, the block includes four hollow cores, so as to be divisible into four substantially identical block portions.

In one embodiment, the cores comprise at least one of:
  a) a square cross-sectional shape; and,
  b) a rectangular cross-sectional shape.

In one embodiment, the block is for use in constructing an external wall, the block having:
  a) a length of approximately 490 mm;
  b) a width of approximately 240 mm; and,
  c) a height of approximately 230 mm.

In one embodiment, the block has a dry mass of approximately 17 to 22 kg.

In one embodiment, the block is for use in constructing an internal wall, the block having:
  a) a length of approximately 490 mm;
  b) a width of approximately 115 mm; and,
  c) a height of approximately 230 mm.

In one embodiment, the block has a dry mass of approximately 10 to 14 kg.

In one embodiment, the block further includes at least one slot located between each pair of adjacent cores, each slot extending from said top to said base, and transversely across said block; wherein the slots delineate the plurality of substantially identical block portions.

In one embodiment, two or more slots are located between a pair of adjacent cores to delineate two block portions, these slots are aligned transversely across the block, and separated by one or more webs.

In one embodiment, the slots are spaced substantially equidistant longitudinally, from each adjacent hollow core.

In one embodiment, the slots are spaced substantially equidistant from each other and from the opposed ends.

In one embodiment, each slot is located in a predetermined position denoting where the block is intended to be cut. The spacing of the slots in the block defines positions where the block may be trimmed.

In one embodiment, each hollow core is spaced evenly from each of the opposed sides, and the hollow cores adjacent each end are spaced evenly therefrom.

In one embodiment, the block includes on the top thereof, a transverse rectangular recess located extending across each hollow core between the opposed sides, to accommodate a rectangular-section tie plate extending into the hollow core and across part of the transverse rectangular recess.

In one embodiment, the block includes on the top thereof, at least one longitudinal rectangular recess spaced from the opposed sides by substantially the same distance as the spacing of the transverse rectangular recess from the nearest of the opposed ends or a slot located between adjacent cores, to accommodate a rectangular-section tie plate extending into the hollow core and across part of the longitudinal rectangular recess.

In one embodiment, the block includes at least one tongue located at one of the opposed ends, and at least one groove located at the other of the opposed ends, each groove being provided to at least partially accommodate a tongue of an adjacent one of the blocks.

In one embodiment, each tongue and each groove extend vertically from the top to the base of the block.

In one embodiment, the block includes an aperture extending into the block, located on the top proximal to the tongue, to provide a reference point to identify the tongue end of the block in a machine vision system.

In one embodiment, the block includes a bevel located extending around at least some edges of at least one of the top, base or vertical side edges of the block.

In one embodiment, the block includes a rectangular section recess located extending along longitudinal edges of at least one of the top, base or vertical side edges of the block.

In one embodiment, the block includes a bevel located along external edges not having a rectangular section recess.

In one embodiment, the block is manufactured from a mixture including at least:
a) water;
b) cement; and,
c) a lightweight expanded aggregate.

In one embodiment, the lightweight expanded aggregate is at least one of:
a) an expanded clay aggregate;
b) an expanded slate aggregate;
c) an expanded shale aggregate; and,
d) an expanded glass aggregate.

In one embodiment, the mixture further includes a plasticiser.

In one embodiment, the mixture further includes a fine aggregate.

In one embodiment, the mixture includes:
a) water;
b) cement;
c) lightweight expanded clay aggregate (LECA);
d) a fine aggregate; and,
e) a plasticiser.

In one embodiment, the cement is a high early strength (HE) cement.

In one embodiment, the fine aggregate is quarry dust.

In one embodiment, the plasticiser is MasterGlenium® SKY8100.

In one embodiment, the LECA particles used in the mixture have a diameter of at least one of 0 mm-1 mm, 1 mm-2 mm, 2 mm-3 mm, 3-4 mm, 4 mm-5 mm, 5 mm-6 mm, 7 mm-8 mm, 8 mm-9 mm and 9 mm-10 mm.

In another broad form, the present invention seeks to provide a block portion divided from one of the hereinbefore described blocks, by a cut made at a midpoint between adjacent cores.

In another broad form, the present invention seeks to provide a building system using the hereinbefore described blocks, wherein the blocks are provided in two sizes having a first width and a second width twice that of the first width plus the thickness of the spacing between the blocks.

In another broad form, the present invention seeks to provide a wall assembly including a plurality of the hereinbefore described blocks laid in a plurality of courses, and an adhesive applied between each course of blocks and a successive course to bond these.

In one embodiment, the adhesive is machine applied to the base of a block before it is laid onto a lower course.

In one embodiment, at least two parallel beads of adhesive are applied onto the base of a block along a lengthwise extent thereof.

In one embodiment, the adhesive is further applied onto one or more end faces of a block so as to form a perp joint with an adjacent block in a course.

In one embodiment, the adhesive is one of:
a) Huntsman Suprasec® 7273; and,
b) Selleys Aquadhere Durabond®.

In one embodiment, the wall assembly further includes one or more block portions divided from the block or a remainder thereof by a cut made at a midpoint between adjacent cores.

In one embodiment, the wall assembly is assembled using a plurality of first blocks having a first width and a plurality of second blocks having a second width twice that of said first width plus the thickness of the spacing between the blocks.

In one embodiment, the first blocks are internal blocks that are used substantially in the construction of internal walls and the second blocks are external blocks that are used substantially in the construction of external walls.

In one embodiment, internal walls are tied into external walls by inserting internal blocks between adjacent external blocks for at least alternating courses of blocks so that ends of the internal blocks lay flush with an outer face of an external wall.

In one embodiment, internal walls are tied into external walls by forming a cut-out in an inner face of at least some external blocks and locating an internal block into the cut-out to thereby interlock the blocks.

In one embodiment, internal walls are tied into external walls by tie clips used in at least some of the courses.

In one embodiment, internal walls are tied into external walls so that overlapping hollow cores of respective internal and external blocks are substantially aligned.

In one embodiment, the wall assembly further includes a render applied to at least external surfaces thereof.

In one embodiment, the render is an acrylic non-porous render to seal a wall from moisture ingress.

In another broad form, an aspect of the present invention seeks to provide method of manufacturing a hereinbefore described block, the method including the steps of:
 a) producing a batch mixture including:
  i) water;
  ii) cement;
  iii) a lightweight expanded aggregate;
  iv) a fine aggregate; and,
  v) a plasticiser.
 b) pouring the mixture into a mould; and,
 c) using dry vibration pressing to form a plurality of blocks from the mixture.

In one embodiment, the lightweight expanded aggregate is a lightweight expanded clay aggregate (LECA).

In one embodiment, the fine aggregate is quarry dust.

In one embodiment, the plasticiser is MasterGlenium® SKY8100.

According to a further aspect, there is provided a block for automated building construction, said block having a body with a top and a base, said body having a length extending between opposed ends, and a width extending between opposed sides; said body having a plurality of hollow cores extending from said top to said base; wherein each said hollow core extends across at least half of said width, and is spaced substantially evenly from said opposed sides, and said hollow cores are spaced apart substantially evenly from each other along said length, said hollow cores extending in single file between said opposed ends; wherein said body has a slot located between each said hollow core extending transversely across said block to an extent commensurate with the transverse extent of said hollow cores, said slots each having a width of no greater than one fifth of the longitudinal extent of said hollow cores.

In one embodiment, said slots do not have any portion that impinges a facing surface of said block.

In one embodiment, said slots are spaced substantially equidistant longitudinally, from each said hollow core.

In one embodiment, said slots are spaced substantially equidistant from each other and from said opposed ends. The slots may notionally divide the block into fractions, for example in the most preferred embodiment, into quarters, so that a cut block can be divided into a quarter length and three quarter length blocks or two half length bocks. Alternatively the block could be longer and dividable into fifths or sixths.

In one embodiment, the slots have a width commensurate with the thickness of a cutting blade or slightly less and are provided to speed the process of cutting through a block.

In one embodiment, the slots have a width of no more than three times the thickness of a cutting blade. This would provide a recess for any tongue in an end of a said block to nest after a cut has been made through such a slot. In addition, where a cut brick has the cut edge exposed, there would not be a great amount of filler such as plaster or render required to fill any recess, in order to make the finished wall smooth. In practice the slot width could be anywhere from just under the cutting blade thickness to a maximum of two and a half centimetres or an inch, in order to achieve an objective of minimising the amount of debris produced by cutting a block at the slot width location, and minimising the amount of filler required to cover an exposed cut in a finished wall. The most preferred slot width is from half a centimetre up to one centimetre.

In one embodiment, the slots taper in width, all being narrower and shorter at one of the top (or bottom) of the block and wider and longer all at the bottom (or top) of the block. The taper may range from 0.05° upward but anywhere in the range of 0.1° to 1.0° is practical. The hollow cores may also possess a similar taper, extending in the same way as the slot taper. The blocks may be formed in a mould with tapered inserts formed of a "slippery" plastic material such as polyethylene, placed into the mould in the positions where the hollow cores and slots are located. Aerated concrete (possibly including aggregate of low density material) or other settable material is poured or packed into the mould to form the block, and once the settable material has hardened or cured, the mould is disassembled to reveal the block. The tapered inserts are then driven out of the block, with the taper assisting in their removal without causing cracking.

In one embodiment, the hollow cores are each of square section.

In one embodiment, said hollow cores are each of rectangular section. In one form, the hollow cores have rounded corners.

In one embodiment, each said hollow core is spaced evenly from each of said opposed sides and said hollow cores adjacent each end are spaced evenly therefrom.

In one embodiment, there is a single hollow core extending across said width between each said slot and said opposed ends, and between each said slot. In a wider brick there may be more than one hollow core, say two hollow cores, located side by side across said width between each said slot and said opposed ends, and between each said slot, but in practice, this would be expected to lead to unwarranted manufacturing complexity.

In the arrangement as described, each slot is located in a predetermined position where the block is intended to be cut to length. In one form there will be four hollow cores and three slots in each block. However, there could be a greater number of hollow cores and slots if required.

In one embodiment, said hollow cores are rectangular and have internal walls spaced from each other double the distance as the spacing from a said internal wall to the closest of said opposed ends or said opposed sides.

In one aspect, there is provided a block having substantially the same width as the spacing between adjacent slots, which can be used as a block for constructing an internal wall, and also in a second preferred embodiment a block having substantially double the width as the spacing between adjacent slots, which can be used as a block for constructing an external wall. Note that in both of these embodiments the longitudinal slot spacing is identical.

In one embodiment, the hollow core longitudinal spacing of said first embodiment and said second embodiment is identical.

In one embodiment, said block includes on the top thereof, a transverse rectangular recess located extending across each said hollow core between said opposed sides, to accommodate a rectangular-section tie plate extending into said hollow core and across part of said transverse rectangular recess. The rectangular-section tie plate would in practise, tie adjacent courses of intersecting wall sections during construction of a building. The transverse rectangular recess need only be as deep as the thickness of the rectangular-section of the tie plate, or could be slightly less than this where the adhesive bonding successive courses spaces the bricks from each other.

In one embodiment, said block includes on the top thereof, at least one longitudinal rectangular recess spaced from said opposed sides by substantially the same distance as the spacing of a said transverse rectangular recess from the nearest of said opposed ends or a said slot, to accommodate a rectangular-section tie plate extending into said hollow core and across part of said longitudinal rectangular recess. With this arrangement, in a block having the same width as the spacing between adjacent slots, the longitudinal rectangular recess will extend centrally along the top of the block. In a block having double the width as the spacing between adjacent slots, there may be only two longitudinal rectangular recesses, each spaced from the nearest of said opposed sides by substantially the same distance as the spacing of a said transverse rectangular recess from the nearest of said opposed ends or a said slot.

With the above described arrangement, in a system of blocks having two preferred embodiments as described, with four spaced hollow cores separated by three slots, the ends of the blocks can intersect in four predetermined positions along the sides of adjoining blocks, and can be secured by a rectangular-section tie plate extending between adjacent hollow cores of adjoining blocks, with the rectangular-section tie plate being accommodated within a part of the transverse and/or longitudinal recess as the case may be. In one form, said block includes at least one tongue located at one of said opposed ends and at least one groove located at the other of said opposed ends, each said groove being provided to at least partially accommodate a said tongue of an adjacent one of said blocks.

In one embodiment, each said tongue and each said groove extend vertically from top to bottom of said block.

In one embodiment, said block has one said tongue and one said groove.

In one embodiment, said block includes an aperture extending into said block, located on the top proximal to said tongue. This aperture provides a reference point to identify the tongue end of the block in a machine vision system.

In one embodiment, said block includes a bevel located extending along longitudinal edges of said base.

In one embodiment, said block includes a bevel located extending along longitudinal edges of said top.

In one embodiment, said block includes a bevel located extending around the periphery of said top.

In one embodiment, said block includes a bevel located extending around the periphery of said base.

In one embodiment, said block includes a bevel located extending along external vertical edges.

In one embodiment, said block includes a rectangular section recess located extending along longitudinal edges of said base.

In one embodiment, said block includes a rectangular section recess located extending along longitudinal edges of said top.

In one embodiment, said block includes a rectangular section recess located extending along external vertical edges.

In one embodiment, said block includes a bevel located along external edges not having a square section recess.

In one embodiment, the rectangular section recess may include ledge extents of up to ⅜ of an inch or 10 mm, 5/16 of an inch or 8 mm, ¼ of an inch or 6 mm, 3 mm, 4 mm, 4.5 mm or 5 mm.

Also in accordance with the invention there is provided a building system using blocks as hereinbefore described, wherein said slots are spaced substantially equidistant from each other and from said opposed ends, and the distance between adjacent said slots is equal to said width.

Also in accordance with the invention there is provided a building system using blocks as hereinbefore described, wherein said slots are spaced equidistant from each other and from said opposed ends, and the distance between adjacent said slots is equal to half of said width.

Yet further, in accordance with the invention there is provided a building system using blocks as hereinbefore described, wherein said blocks are provided in two sizes having a first width and a second width twice that of said first width, wherein said blocks are provided all having said slots spaced substantially equidistant from each other and from said opposed ends, and the distance between adjacent said slots is equal to said first width.

The block may be provided in any length being twice the first width or longer but in first width increments, plus the thickness of the spacing between the bricks.

In a further aspect, there is provided a block portion divided from one of the above described blocks, by a cut made at a midpoint between adjacent cores.

In a further aspect, there is provided a wall assembly comprised of a plurality of the above described blocks laid in a plurality of courses, and an adhesive applied between each course of blocks and a successive course to bond these.

In one embodiment, the wall assembly further comprises one or more block portions divided from a remainder of one of the blocks by a cut made at a midpoint between adjacent cores.

In one embodiment, this cut is made at one of the slots (where provided).

In one embodiment, the wall assembly further comprises a render applied to at least one side thereof.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Examples of the present invention will now be described with reference to the accompanying drawings, in which:—

FIG. 5 is a right side plan view of the block of FIG. 1;

FIG. 6 is a front plan view of the block of FIG. 1;

FIG. 7 is a rear plan view of the block of FIG. 1;

FIG. 19 is a top plan view of a block according to the second embodiment trimmed to half length;

FIG. 20 is a top plan view of a block according to the second embodiment trimmed to quarter length;

FIG. 21 is a top plan view of two blocks according to the second embodiment, showing end to end nesting;

FIG. 22 is an isometric view showing a brick tie clip for use with either embodiment;

In the following description, like reference characters designate like or corresponding parts throughout the Figures.

DETAILED DESCRIPTION OF THE PREFERRED EMBODIMENTS

Figure 1:
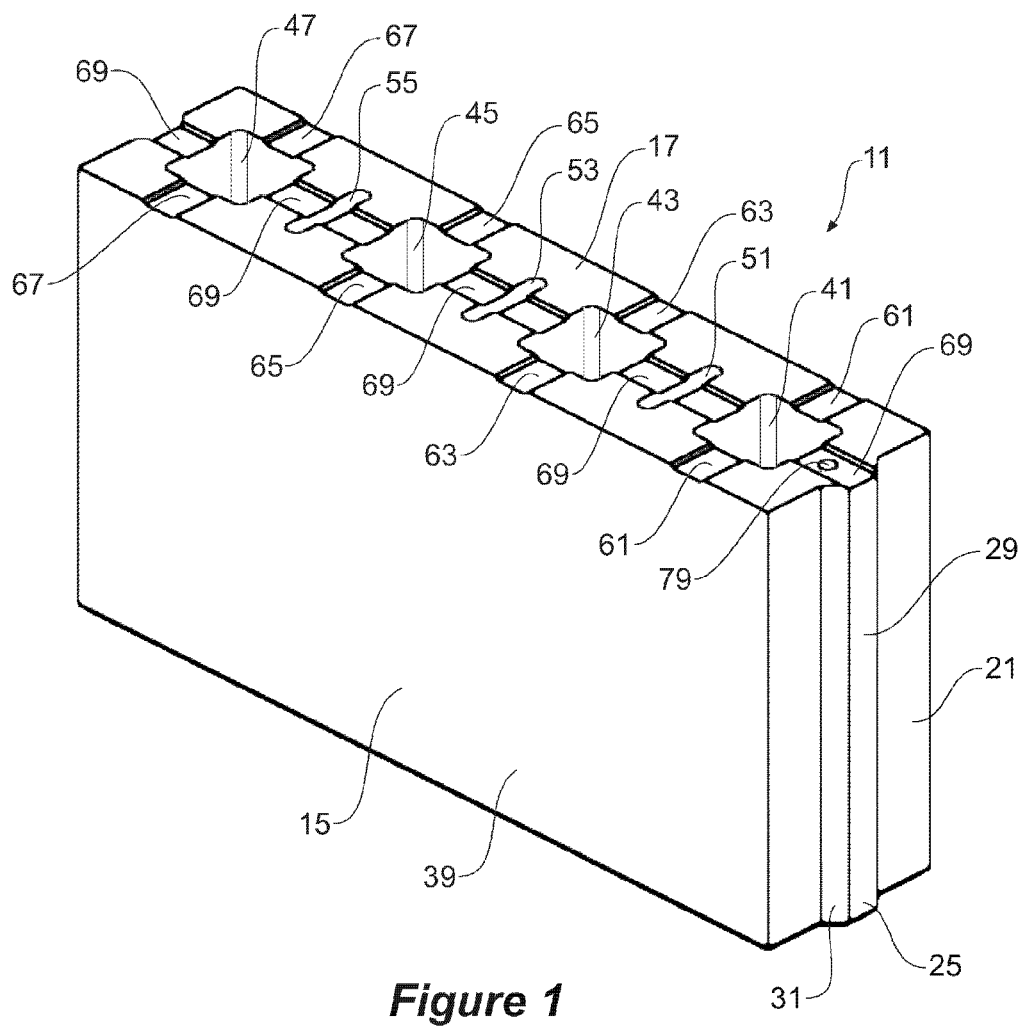
FIG. 1 is an isometric view of a block according to a first embodiment.
Figure 2:
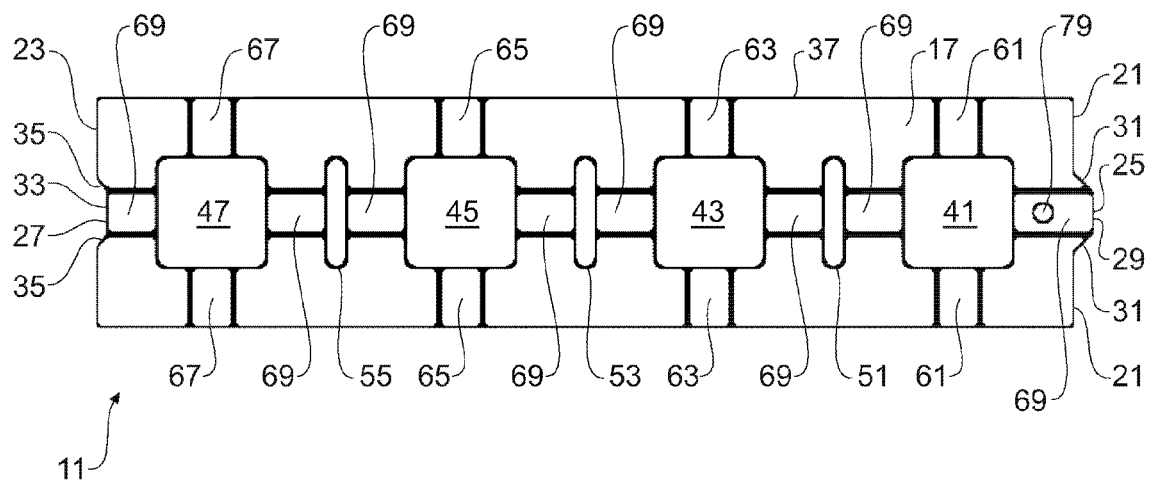
FIG. 2 is a top plan view of the block of FIG. 1.
Figure 3:
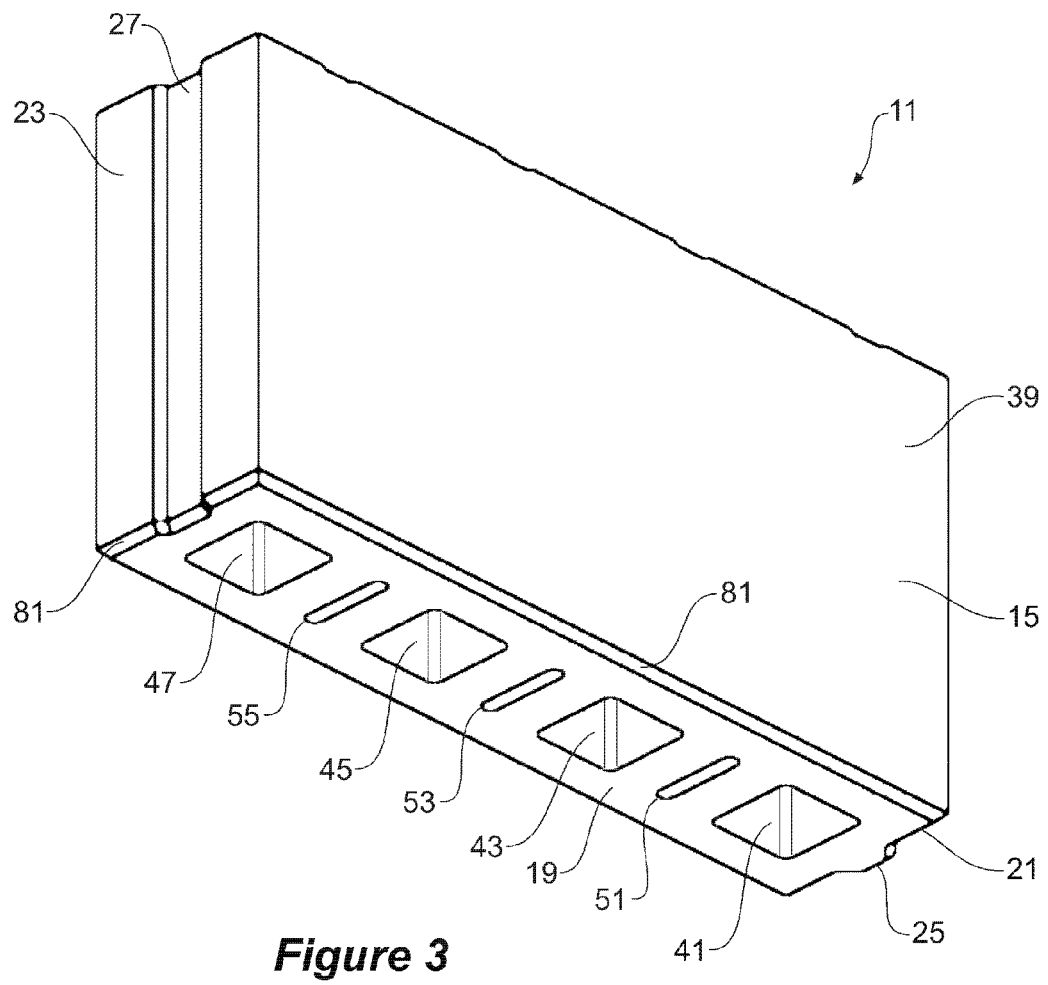
FIG. 3 is an isometric view of the block of FIG. 1.
Figure 4:
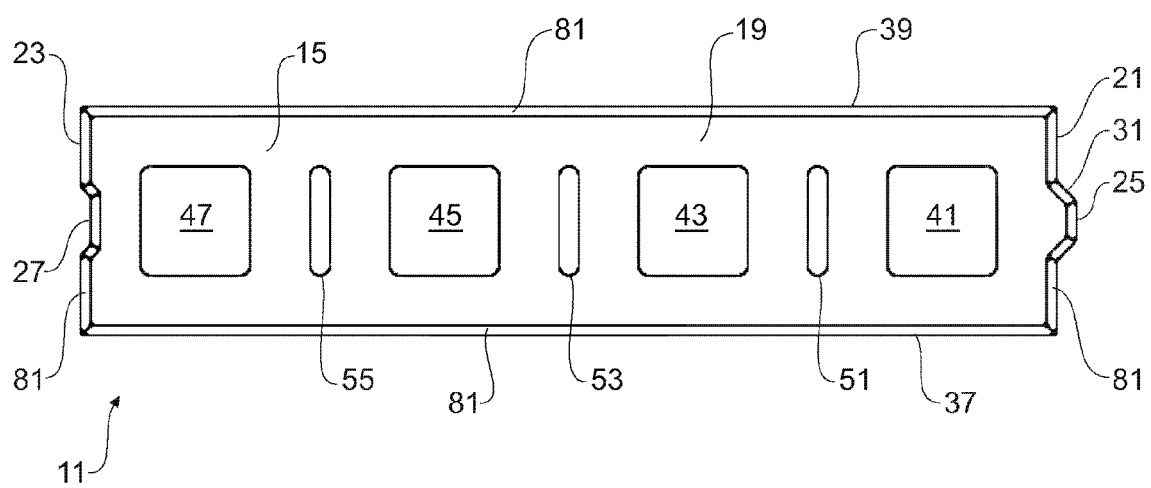
FIG. 4 is a bottom plan view of the block of FIG. 1.
Figure 8:
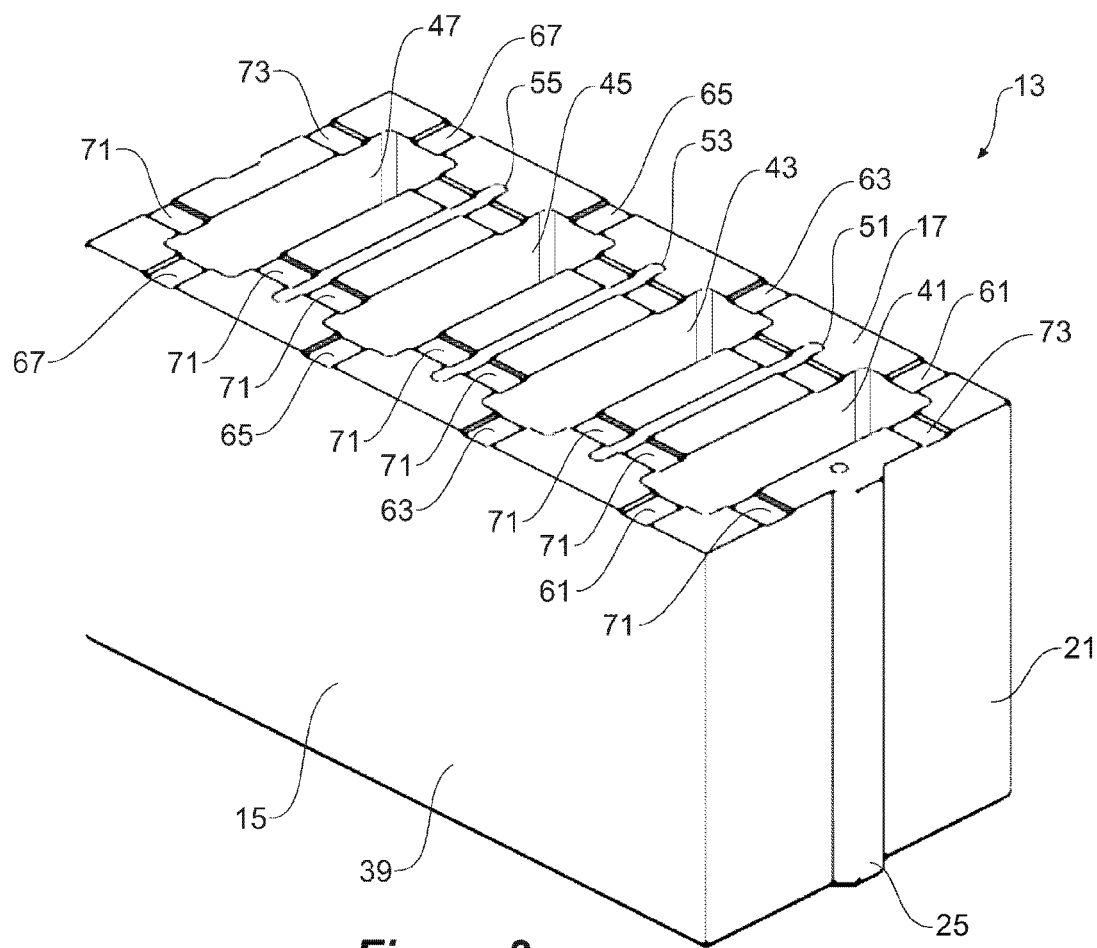
FIG. 8 is an isometric view a block according to a second embodiment.
Figure 9:
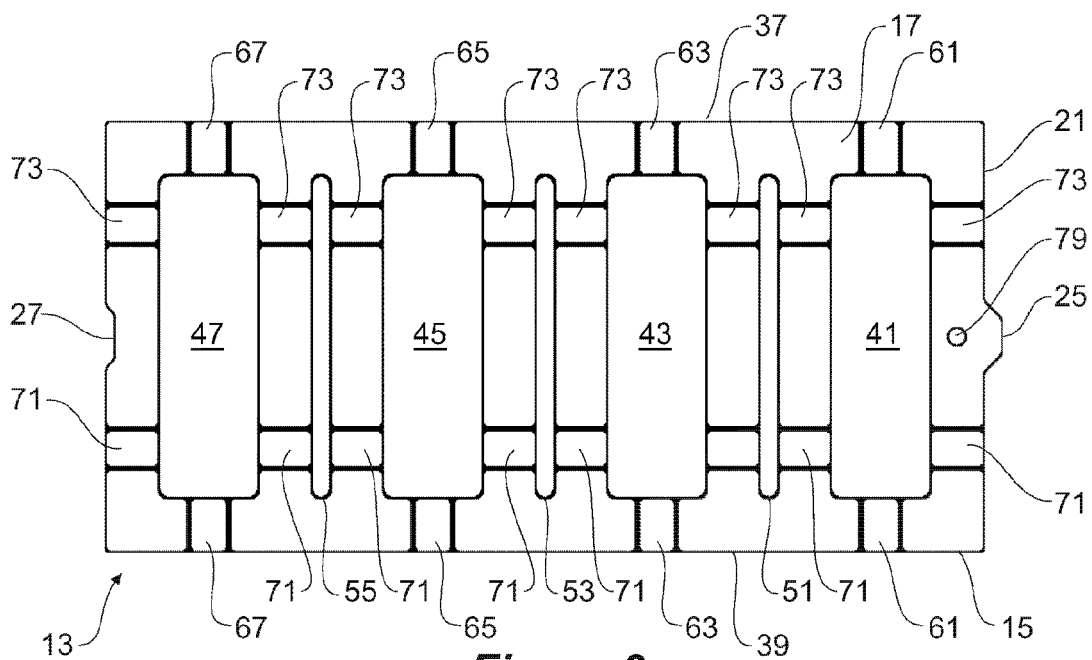
FIG. 9 is a top plan view of the block of FIG. 8.
Figure 10:
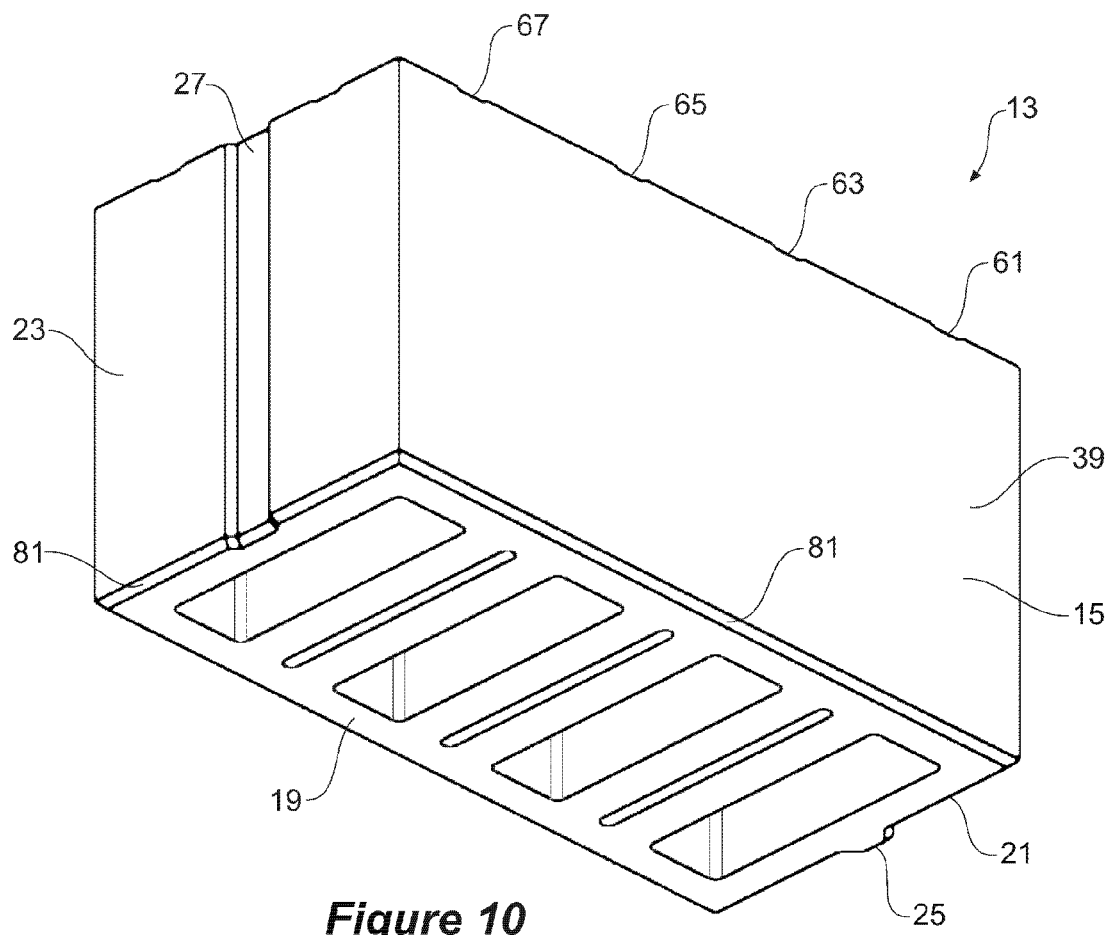
FIG. 10 is an isometric view of the block of FIG. 8.
Figure 11:
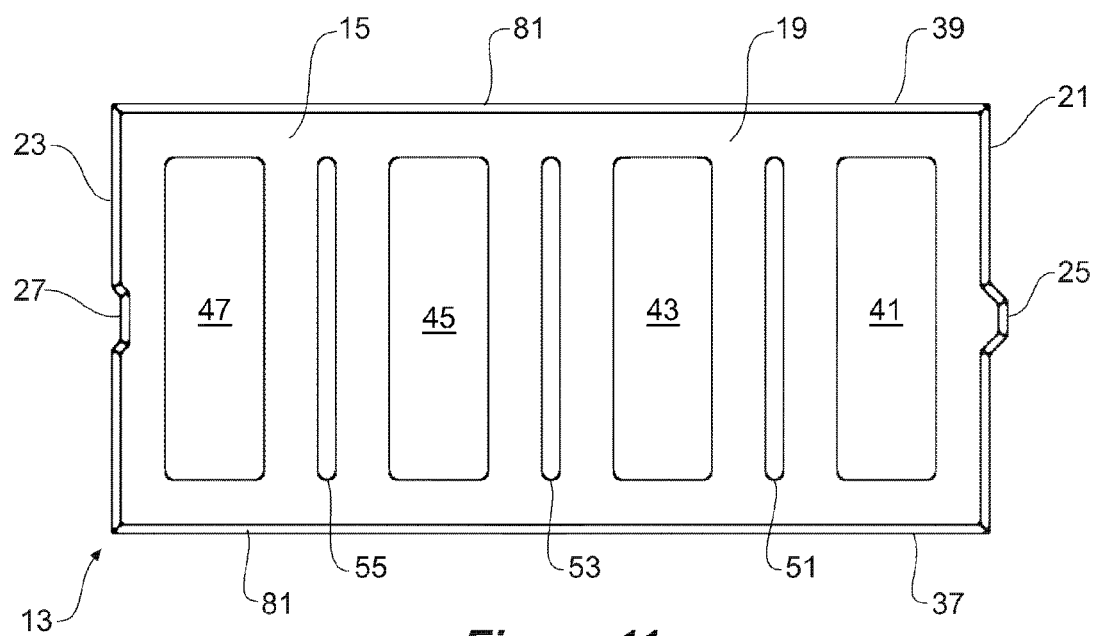
FIG. 11 is a bottom plan view of the block of FIG. 8.
Figure 12:
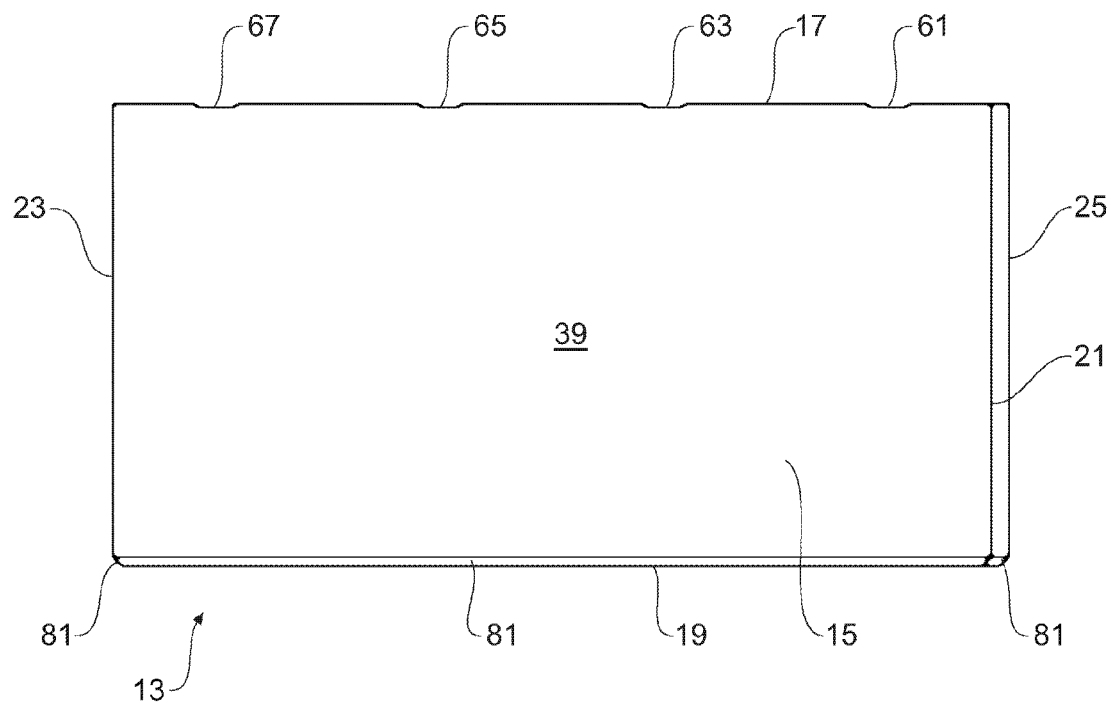
FIG. 12 is a right side plan view of the block of FIG. 8.
Figures 13, 14:
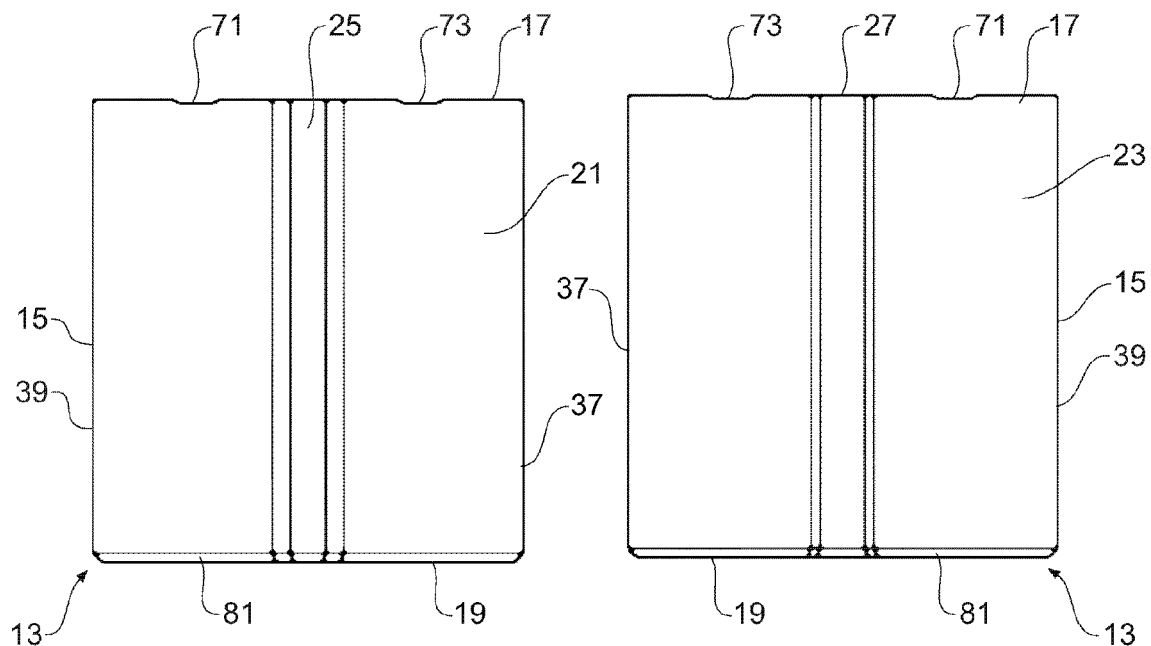
FIG. 13 is a front plan view of the block of FIG. 8.
FIG. 14 is a rear plan view of the block of FIG. 8.

An example of a block 11 for automated building construction shall now be described with reference to FIGS. 1 to 7.

In this example, the block 11 comprises a generally cuboid body 15 having a top 17 and a base 19, a length extending between a pair of opposed ends 21, 23 and a width extending between a pair of opposed sides 37, 39. The body 16 further includes a plurality of hollow cores 41, 43, 45, 47 extending from said top 17 to said base 19, and arranged in a row between said opposed ends 21, 23 wherein each core 41, 43, 45, 47 has a rectilinear cross-sectional shape. The thickness of the block 11 between each pair of adjacent cores 41, 43, 45, 47 is at least double the thickness of the block 11 on all other sides of each core 41, 43, 45, 47, so that the block 11 is divisible into a plurality of substantially identical block portions of rectilinear cross-sectional shape, each portion including four walls of substantially uniform wall thickness about its core 41, 43, 45, 47.

The above described arrangement provides a number of advantages.

Firstly, the ability to divide the block into a plurality of substantially identical block portions enables the block to be cut into a number of usable elements, each of which may be used as a construction element in a building wall. This substantially reduces building waste and allows all off-cuts to be used. Indeed, the entire building design can be based on a grid system defined by the size of the smallest usable block portion. The useful ability to divide the block into further usable block portions is enabled by the relative thickness between adjacent cores compared to the thickness of the block on all other sides of the core (which is nominally double). This thickness ensures that the remaining block portion has sufficient strength once it has been trimmed for use in the overall building structure.

A number of further features will now be described.

In one example, the walls extending about the cores are substantially solid (for example for a concrete masonry unit (CMU) block. However, in other examples the walls extending about the cores include a plurality of secondary cores extending from said top to said base, the secondary cores separated by a plurality of webs. The secondary cores (i.e. extrusion coring) may assist in reducing the weight of the block and may also form a complex pathway for the ingress of water through or across the block. Such a block may be manufactured from clay for example. As the size of clay blocks is typically variable within the same batch, when not using mortar, the top and bottom and possibly ends of the block may need to be rectified to produce a consistent size necessary for automated building construction using adhesive instead of mortar.

Typically, the block includes four hollow cores so as to be divisible into four substantially identical block portions. This enables the block to be divided into quarter length, half length and three quarter length block portions. In another example, the block may include three cores so as to be divisible into three substantially identical block portions. This enables the block to be divided into one third and two third length portions. The block may also include one of five, six, seven, eight, nine or even ten cores so as to be divisible into many different number of substantially identical block portions.

Typically, the cores comprise at least one of a square cross-sectional shape; and, a rectangular cross-sectional shape, although this is not essential and circular or oval shaped cores could also be provided.

In the example shown in FIGS. 1 to 7, the block is for use in constructing an internal wall, the block having a length of approximately 490 mm; a width of approximately 115 mm; and, a height of approximately 230 mm. The block has a dry mass of approximately 10 to 14 kg.

In another example, a wider block is employed for use in constructing an external wall, the block having a length of approximately 490 mm; a width of approximately 240 mm; and, a height of approximately 230 mm. In this example, the block may have a dry mass of approximately 17 to 22 kg. The block in either example is a large block compared to a standard clay brick for example that is commonly used in the construction industry. The size of the block combined with the relatively low mass makes it suitable for use in automated building construction. The size means that relatively fewer blocks are required to be handled and the relatively low mass reduces the payload that the robot is required to carry which results in less structural load/stress and dynamic disturbance in the system meaning that the block can be positioned with higher accuracy.

In one example, the block further includes at least one slot located between each pair of adjacent cores, each slot extending from said top to said base, and transversely across said block, wherein the slots delineate the plurality of substantially identical block portions. In this way, each slot is located in a predetermined position denoting where the block is intended to be cut. The slots provide a cutting guide for a saw blade or the like and typically each slot is at least the width of a cutting blade.

In the case of a clay block as previously described, two or more slots may be located between a pair of adjacent cores to delineate two block portions, these slots are aligned transversely across the block, and separated by one or more webs. As with the secondary cores, the two or more slots may assist in forming a tortuous path for water transfer through or across the block.

Preferably, the slots are spaced substantially equidistant longitudinally, from each adjacent hollow core. Furthermore, the slots are typically spaced substantially equidistant from each other and from the opposed ends.

In one example, each hollow core is spaced evenly from each of the opposed sides, and the hollow cores adjacent each end are spaced evenly therefrom. This provides overall symmetry to the block which enables it to be laid in any orientation (i.e. there is no distinction between either end or side).

In some examples, tie plates are used to tie together adjoining walls made from the blocks. In particular, the block may include on the top thereof, a transverse rectangular recess located extending across each hollow core between the opposed sides, to accommodate a rectangular-section tie plate extending into the hollow core and across part of the transverse rectangular recess.

Furthermore, the block may include on the top thereof, at least one longitudinal rectangular recess spaced from the opposed sides by substantially the same distance as the spacing of the transverse rectangular recess from the nearest of the opposed ends or a slot located between adjacent cores, to accommodate a rectangular-section tie plate extending into the hollow core and across part of the longitudinal rectangular recess. The tie plates may tie together external and internal walls, although the use of tie plates is not essential and other means for interlocking or 'keying in' the walls may be used as will be further described.

In one example, the block includes at least one tongue located at one of the opposed ends, and at least one groove located at the other of the opposed ends, each groove being provided to at least partially accommodate a tongue of an adjacent one of the blocks. Typically, each tongue and each groove extend vertically from the top to the base of the block. The tongue and groove arrangement is used to interlock adjacent blocks to one another which provides a resulting wall with increased flexural strength and also ensures that there are no gaps between the perpends. Although such an interlocking arrangement would be beneficial, it does make automated brick laying more difficult as machine vision systems are required to correctly orient the block the right way and laying tolerances become much tighter to avoid laying collisions between adjacent blocks. Nevertheless, in one example, the block includes an aperture extending into the block, located on the top proximal to the tongue, to provide a reference point to identify the tongue end of the block in a machine vision system.

In some examples, the block includes a bevel located extending around at least some edges of at least one of the top, base or vertical side edges of the block.

The block may further include a rectangular section recess located extending along longitudinal edges of at least one of the top, base or vertical side edges of the block.

In yet a further example, the block includes a bevel located along external edges not having a rectangular section recess.

The composition of the block will now be described in some more detail. Whilst a clay block is envisaged as previously described, the following discussion will focus on the manufacture of a CMU block. Whilst a block made from aerated concrete has been envisaged, it has been found that an improved CMU block for use in automated building construction may be attained wherein the block is manufactured from a mixture including at least water; cement (such as high early strength (HE) cement); and, a lightweight expanded aggregate.

The light expanded aggregate enables a concrete block of significant size to be manufactured whilst minimising its weight and density as far as possible to make it suitable for use by an automated brick laying machine which imposes weight constraints on the block (e.g. less than 20-23 kg).

The lightweight expanded aggregate may be selected from at least one of an expanded clay aggregate, an expanded slate aggregate, an expanded shale aggregate, and, an expanded glass aggregate. Most preferably, lightweight expanded clay aggregate (LECA) is used as a course aggregate in the mixture which in addition to reducing weight in the block also improves the insulation characteristics of the block.

Typically, the mixture further includes a fine aggregate such as quarry dust or sand which fills up small cavities and holes.

In addition, it has been found to be preferably to add a plasticiser into the mixture which provides elasticity and helps to keep everything together when wet. The plasticiser allows more concrete to be used and less water which increases strength while reducing weight. A particularly preferred plasticiser used is MasterGlenium® SKY8100 manufactured by BASF although other suitable plasticiser having similar properties to this may be used instead and this example is not intended to be limiting.

Accordingly, in one preferred mixture there includes water, cement (e.g. HE cement), lightweight expanded clay aggregate (LECA); a fine aggregate (such as sand or quarry dust) and, a plasticiser (such as MasterGlenium® SKY8100).

In one example, the LECA particles used in the mixture have a diameter of at least one of 0 mm-1 mm, 1 mm-2 mm, 2 mm-3 mm, 3-4 mm, 4 mm-5 mm, 5 mm-6 mm, 7 mm-8 mm, 8 mm-9 mm and 9 mm-10 mm.

In one particularly preferred recipe, the above ingredients are mixed together to form a batch mixture in the following amounts: at least 70 L of water (typically more than 100 L), 0.4 $m^3$ of LECA particles having a diameter of between 0 mm-4 mm, 0.5 $m^3$ of LECA particles having a diameter of between 4 mm-8 mm, 0.15 $m^3$ of quarry dust, 0.175 $m^3$ of HE cement; and, 900 mL of MasterGlenium® SKY8100.

In a further aspect, there is provided a block portion divided from one of the blocks by a cut made at a midpoint between adjacent cores.

In another aspect, there is provided a building system using the aforementioned blocks, said blocks provided in two sizes having a first width and a second width twice that of said first width plus the thickness of the spacing between the blocks. The block having the first width is an internal block used in the construction of internal walls, whilst the block having the second width is an external block used in the construction of external walls. The second width ensures that when internal and external blocks are in abutment, the cores of each block will be in alignment.

According to a further aspect, there is provided a wall assembly including a plurality of the aforementioned blocks laid in a plurality of courses, and an adhesive applied between each course of blocks and a successive course to bond these. In this regard, it is to be appreciated that the adhesive is machine applied to the base of a block before it is laid onto a lower course. At least two parallel beads of adhesive are typically applied onto the base of a block along a lengthwise extent thereof.

In a further example, the adhesive is further applied onto one or more end faces of a block so as to form a perp joint with an adjacent block in a course. By gluing the perps, flexural strength of the wall is increased which makes the structure more suitable for use in cyclone rated areas. In other examples, there is no adhesive between the perps as application of such is more difficult in the context of an automatic bricklaying machine.

Particularly preferred examples of a suitable adhesive include Huntsman Suprasec® 7273, and Selleys Aquadhere Durabond®. These adhesives are moisture curing, high strength, polyurethane construction adhesives and it will be appreciated that other similar adhesives may also be used and these examples are not intended to be limiting.

In one example, the wall assembly includes one or more block portions divided from the block or a remainder thereof by a cut made at a midpoint between adjacent cores. As previously described, a grid system may be used in the design of the wall based around the size of the smallest divisible block portion which enables every block portion to be used in the construction of the wall with no building waste.

Typically, the wall assembly is assembled using a plurality of first blocks having a first width and a plurality of second blocks having a second width twice that of said first width plus the thickness of the spacing between the blocks. As previously described, the first blocks are internal blocks that are used substantially in the construction of internal walls and the second blocks are external blocks that are used substantially in the construction of external walls.

In one example, internal walls are tied into external walls by inserting internal blocks between adjacent external blocks for at least alternating courses of blocks so that ends of the internal blocks lay flush with an outer face of an external wall. Alternatively, internal walls are tied into external walls by forming a cut-out in an inner face of at least some external blocks and locating an internal block into the cut-out to thereby interlock the blocks.

In a further example and as previously mentioned, internal walls may be tied into external walls by tie clips used in at least some of the courses.

In the above examples, it is preferable that internal walls are tied into external walls so that overlapping hollow cores of respective internal and external blocks are substantially aligned. This enables the cores of the wall system to be used as conduits for services etc. as previously described.

In one example, the wall assembly further includes a render applied to at least external surfaces thereof. Preferably, the render is an acrylic non-porous render to seal a wall from moisture ingress. A wall made from CMU blocks which are very porous will typically require a render whilst a wall made from clay blocks may or may not require a render. The render further serves to tie the wall structure together and thereby acts as an external skin. Particularly in examples where the perps are not glued, the render covers these gaps in the structure. In addition, the render also blocks ultraviolet (UV) light, thereby preventing it from damaging the adhesive between courses of blocks.

A suitable acrylic render is Rockcoat PM100 Quick Render which is currently used in construction. It will be appreciated that any other similar acrylic render could also be used and this is not intended to be limiting.

Finally, in another aspect there is provided a method of manufacturing a block for use in automated construction including the steps of producing a batch mixture including: water, cement (such as HE cement), a lightweight expanded aggregate (such as LECA), a fine aggregate (such as quarry dust); and, a plasticiser (such as MasterGlenium® SKY8100). The method further includes pouring the mixture into a mould and using dry vibration pressing to form a plurality of blocks from the mixture.

Referring now to the Figures, several illustrated embodiments of a block for use in automated building construction will be described in further detail.

The blocks 11 illustrated in FIGS. 1 to 7 are intended for the construction of internal walls, and the blocks 13 illustrated in FIGS. 8 to 14 are intended for the construction of external walls. In one example, each block 11, 13 has a moulded body 15 formed in a mould from aerated concrete. The body 15 has a top 17 and a base 19, and has a nominal length of approximately 50 cm between opposed ends 21 and 23. End 21 has a protruding tongue 25 extending between and from the top 17 substantially to the base 19. End 23 has a recess 27 also extending between and from the top 17 substantially to the base 19. The recess 27 may partially accommodate a tongue 25 of an adjacently placed block in end 23 to end 21 alignment as shown in FIG. 21, and the purpose of this interengagement is to prevent passage of light through the small space between the ends 21 and 23 of adjacently placed blocks and also to increase the flexural strength of an assembled wall. The tongue 25 has a flat surface 29 extending parallel to the surface of the end 21 of the blocks 11 and 13, with sloping ramp surfaces 31 extending either side down from the surface 29 to the surface of the end 21. The arrangement of the recess 27 is similar, with a flat recessed surface 33 extending parallel to the surface of the end 23 of the blocks 11 and 13, with sloping ramp surfaces 35 extending either side from the surface 33 up to the surface of the end 23. As the specific detail of the tongue 25 and groove 27 shape is not particularly important, these details are shown numbered only in FIG. 2.

The block 11 has a width of approximately 12.5 cm extending between opposed sides 37 and 39 and the block 13 has a width of approximately 25 cm extending between opposed sides 37 and 39. The overall height from top 17 to base 19 of both blocks 11 and 13 is approximately 25 cm. These blocks are large format blocks, intended for handling by brick laying machines and in particular robotic brick laying machines, and as large format blocks, will weigh much more than conventional bricks used in manual brick laying in the building industry.

Each block 11 and 13 has four hollow cores 41, 43, 45, 47 extending from the top 17 to the base 19, and in the block 11 extending across about half of the width of the block 11, and in the block 13 extending across about three quarters of the width of the block 13. These hollow cores 41, 43, 45, 47 provide an air pocket for insulation and can be used as conduits for carrying services in a building constructed with the blocks 11 and 13. They can also be used to carry reinforcing rods and have concrete poured down them for added strength. The hollow cores 41, 43, 45, 47 are spaced from the sides 37 and 39 to provide a wall thickness of about 3 cm in both blocks 11 and 13. The hollow cores 41, 43, 45, 47 are spaced apart from each other evenly along the length of the block and the cores 41 and 47 have a nominal wall thickness at their adjacent respective ends 21 and 23 of about 3 cm. The hollow cores 41, 43, 45, 47 are rectangular with rounded internal corners (square with rounded internal corners in block 11). The hollow cores 41, 43, 45, 47 may have a 0.1° to 0.5° draft (or taper) for ease of manufacture with a mould.

The body 11 and 13 has three slots 51, 53, 55 extending from the top 17 to the base 19, extending normally to the length of the block, and in the block 11 extending across half of its width and in the block 13 extending across three quarters of its width. The slots 51, 53, 55 are spaced from the sides 37 and 39 to provide a wall thickness of about 3 cm in both blocks 11 and 13. The slots 51, 53, 55 also have a 0.1° to 0.5° draft (or taper) for ease of manufacture with a mould.

Slot 51 is located between hollow cores 41 and 43. Slot 53 is located between hollow cores 43 and 45. Slot 55 is located between hollow cores 45 and 47. The spacing between each slot and adjacent hollow core provides a substantially uniform wall thickness about the cores of about 3 cm. In one example, the hollow cores 41, 43, 45, 47 and slots 51, 53, 55 are formed using tapered inserts that are placed in the mould prior to the aerated concrete being introduced into the mould, before being allowed to cure to a hardness sufficient to allow the tapered inserts to be driven or pressed out, after the mould has been disassembled.

The slots 51, 53, 55 are spaced substantially equidistant from each other and from said opposed ends, and provide a cross section through which the block 11 and 13 may be cut with a power saw. The cut proceeds through a slot 51, 53 or 55 and the effect is to minimise the amount of material that the power saw blade must traverse. This reduces the amount of dust generated by cutting through the brick in these positions, which reduces the amount of waste that must be taken away from the site and disposed of. The cut can be slightly offset to any slot so that a recess results that can partially accommodate a tongue 25 of an adjacently placed block. The spacing of the slots 51, 53, 55 is such that it divides the block 11 and 13 into four nominally 12.5 cm long portions.

Figure 15:
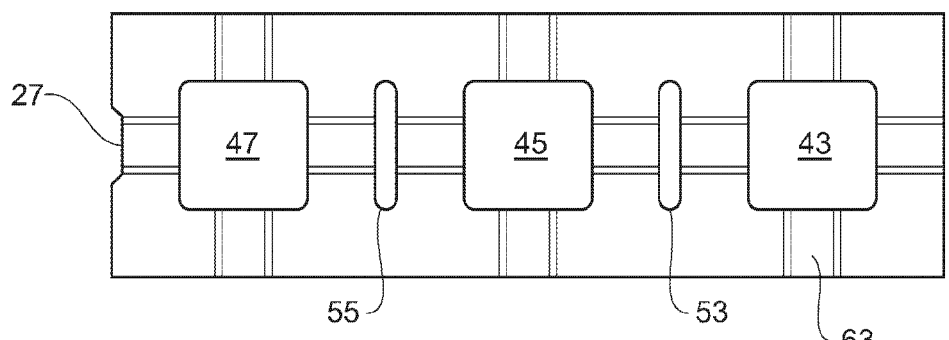
FIG. 15 is a top plan view of a block according to the first embodiment trimmed to three quarter length.
Figure 16:
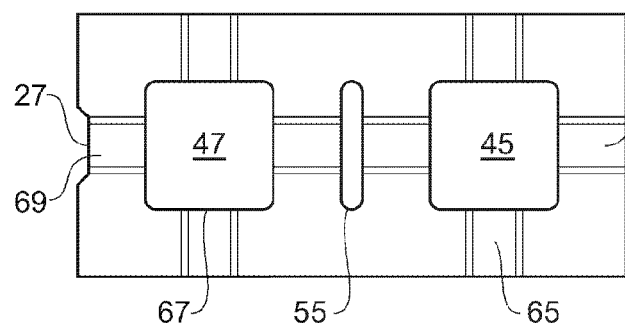
FIG. 16 is a top plan view of a block according to the first embodiment trimmed to half length.
Figure 17:
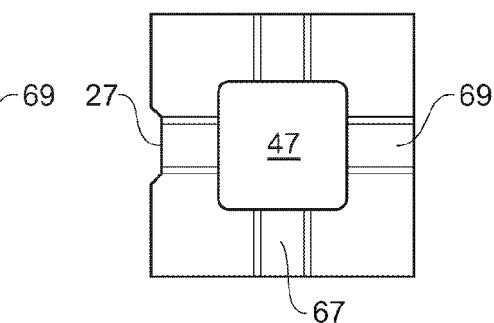
FIG. 17 is a top plan view of a block according to the first embodiment trimmed to quarter length.
Figure 18:
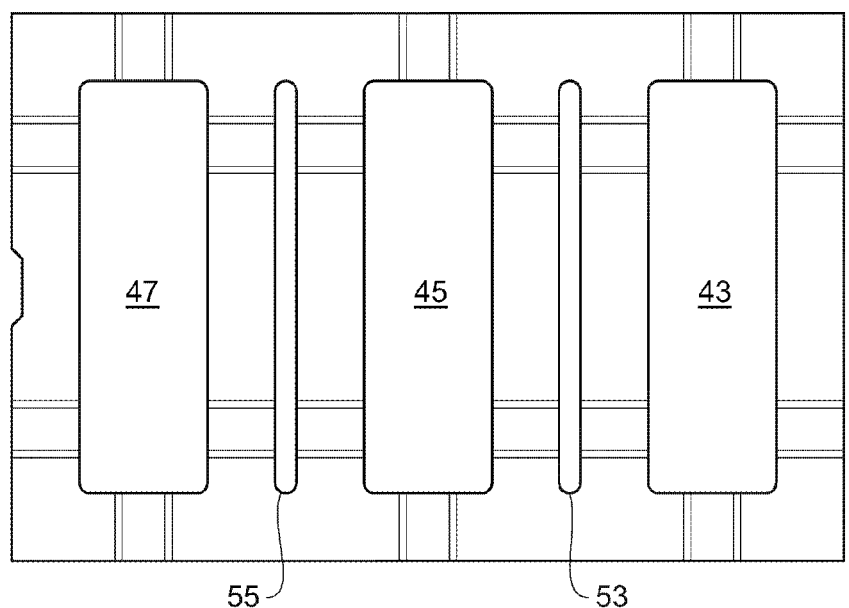
FIG. 18 is a top plan view of a block according to the second embodiment trimmed to three quarter length.

In the arrangement as described, each slot is located in a predetermined position where the block is intended to be cut to length. Thus a block may be cut into lengths of 12.5 cm, 25 cm and 37.5 cm, as shown in FIGS. 15 to 20. FIG. 15 shows a block 11 cut to three quarter length by cutting through slot 51. FIG. 16 shows a block 11 cut to half length by cutting through slot 53. FIG. 17 shows a block 11 cut to quarter length by cutting through slot 55. FIG. 18 shows a block 13 cut to three quarter length by cutting through slot 51. FIG. 19 shows a block 13 cut to half length by cutting through slot 53. FIG. 20 shows a block 13 cut to quarter length by cutting through slot 55.

Each block 11 and 13 includes on the top 17 thereof, a transverse rectangular recess 61, 63, 65, 67 located extending across each hollow core 41, 43, 45, 47 between the opposed sides 37 and 39.

The block 11 includes on the top 17 thereof, a longitudinal rectangular recess 69. The longitudinal rectangular recess 69 spaced from an opposed side 37 or 39 by substantially the same distance as the spacing of any transverse rectangular recess 61, 63, 65, 67 from the nearest of an opposed end 21 or 23 or any slot 51, 53 or 55.

The block 13 includes on the top 17 thereof, two parallel longitudinal rectangular recesses 71 and 73. These longitudinal rectangular recesses 71 and 73 are spaced from their nearest side 37 or 39 by substantially the same distance as the spacing of any transverse rectangular recess 61, 63, 65, 67 from the nearest of an opposed end 21 or 23 or any slot 51, 53 or 55.

These rectangular recesses 61, 63, 65, 67, 69, 71 and 73 are provided to accommodate a rectangular-section tie plate 75 having downwardly extending legs 77 that extend into any juxtaposed hollow core and across part of a rectangular recess that is adjacent to the hollow core that a downwardly extending leg extends into.

The sizes of the blocks and the positioning of the slots 51, 53 and 55 are configured so that a building can be constructed so that the rectangular recesses will align, and the tie plates 75 used at each intersection of each course to tie the courses together. The rectangular-section tie plate would in practise, tie adjacent courses of intersecting wall sections during construction of a building. The transverse rectangular recess need only be as deep as the thickness of the rectangular-section of the tie plate, or could be slightly less than this where the adhesive bonding successive courses spaces the bricks from each other.

Each block 11 and 13 includes an aperture 79 extending partially into the block, located on the top 17 proximal to and spaced from the tongue 25. This aperture 79 provides a reference point to identify the tongue end 21 of the block 11 and 13 in a machine vision system.

Each block 11 and 13 includes a bevel 81 located extending entirely around the periphery of the base 19, including through the tongue 25 and recess 27. The purpose of the bevel 81 on the bottom periphery of the block is to reduce the chipping of the block during transport, manufacture, handling and when being placed. In this example, the top of the block does not contain the bevel so the block orientation can be recognised by a machine vision system. In an alternative embodiment, the top of the block may also have bevelled edges, but then the machine vision system would be reliant on determining orientation by identifying the aperture 79 and rectangular recesses 61, 63, 65, 67, and 69 or 71 and 73. In other arrangements, the block is designed to have symmetry (with no cuts and no tongue and groove) so that it can be laid in any lengthwise orientation.

Figure 23:
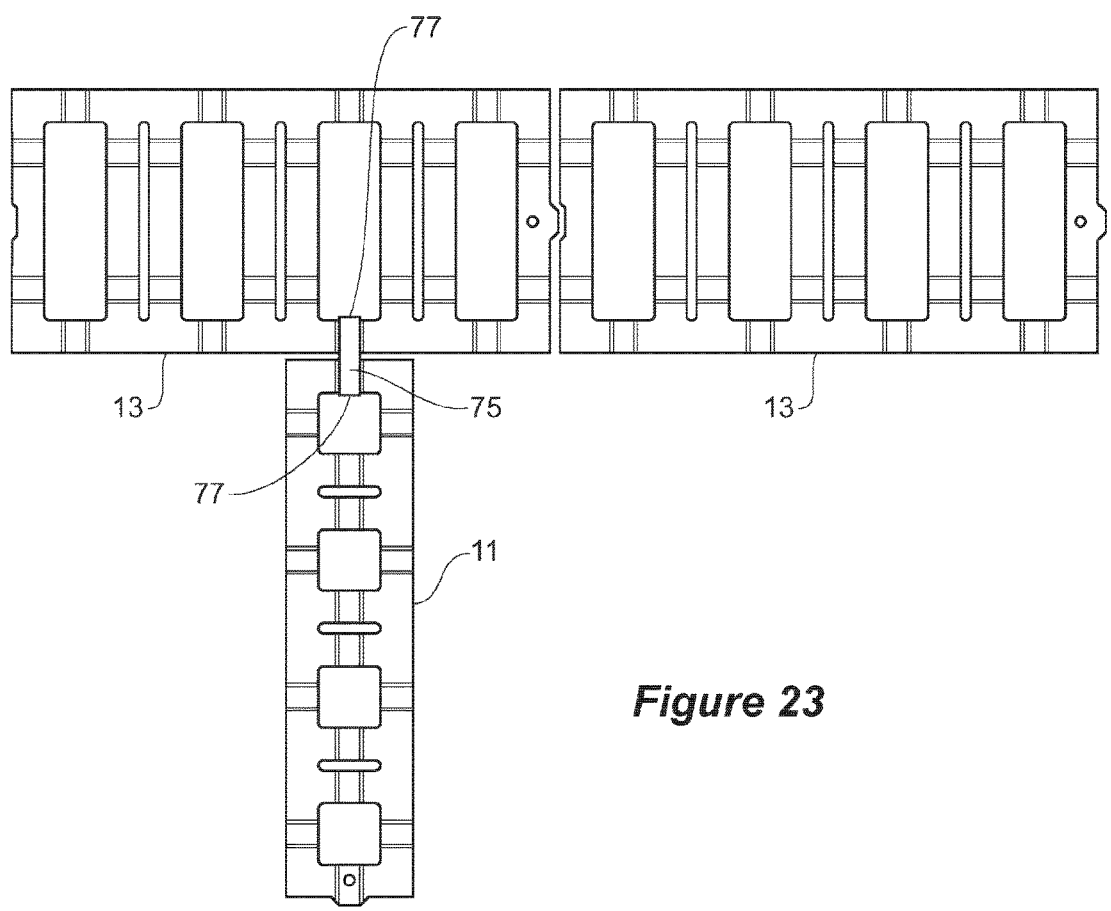
FIG. 23 is a top plan view of the two blocks according to the second embodiment shown in FIG. 21, and an intersecting block according to the first embodiment secured with the brick tie clip of FIG. 22.
Figure 24:
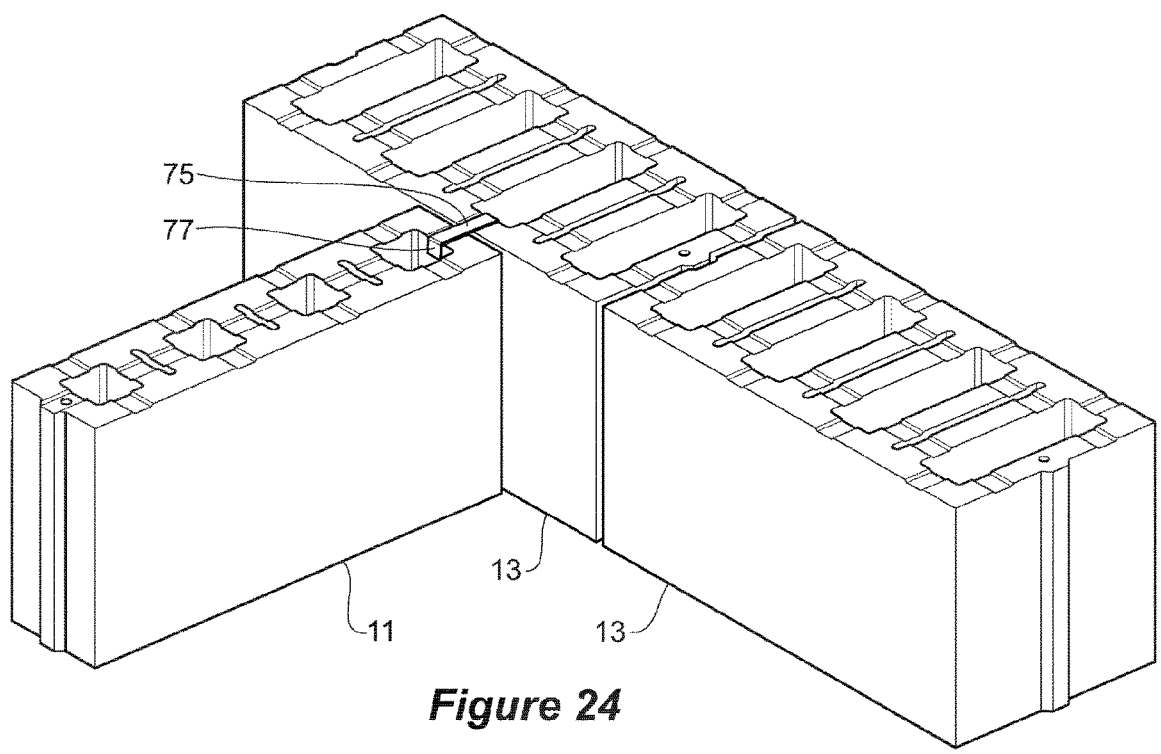
FIG. 24 is an isometric view of the arrangement shown in FIG. 23.
Figure 25:
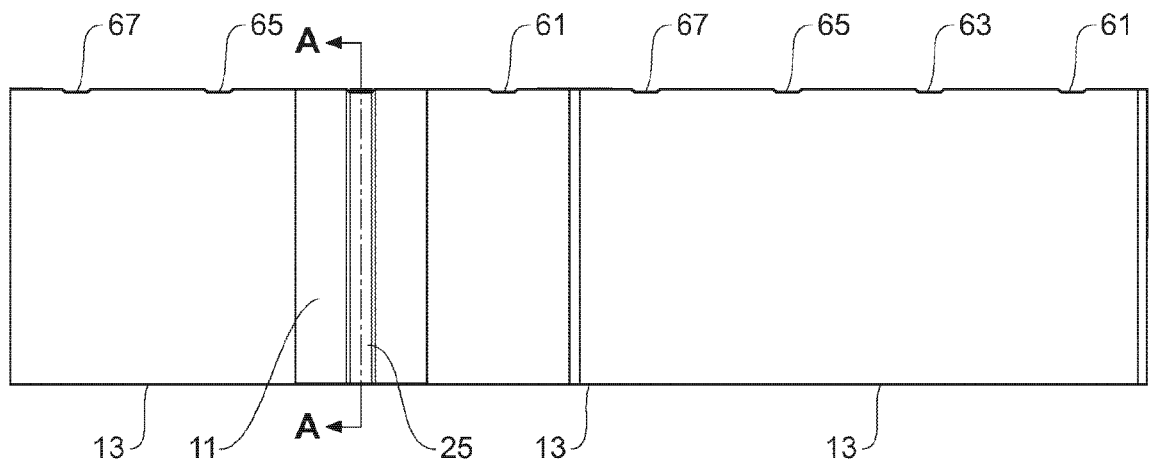
FIG. 25 is a side view of the arrangement shown in FIG. 23, looking toward the end of the intersecting block according to the first embodiment.
Figure 26:
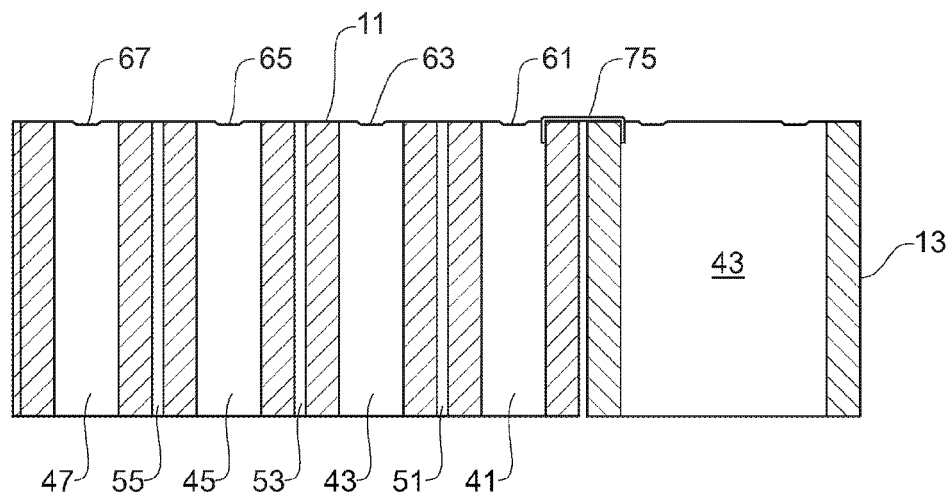
FIG. 26 is a cross-section through A-A in FIG. 25.
Figure 27:
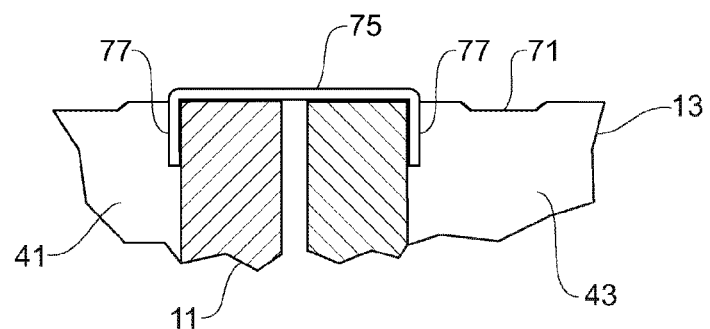
FIG. 27 is a close-up cross-section showing Detail A of FIG. 26.

The blocks 11 and 13 are configured to assemble in a grid system, comprising a 125 mm square grid. The bounding box of each block 11 and 13 is nominally 500 mm long and can be cut into a ¼, ½ or ¾ lengths, and be placed on the grid. Internal walls constructed of blocks 11 can tie to external walls constructed of blocks 13 in any position corresponding to a core of the external wall, as is illustrated in FIGS. 23 and 24. The advantage of using such a grid system is that waste is completely eliminated as any remaining off cut of a trimmed block is of a useful length and can therefore be used elsewhere in the building. The grid system increases the efficiency of the design process and the building process. Each block 11 and 13 is slightly smaller than the bounding box of the grid system to create space for render to stick to the walls. Once the render is applied, the overall dimensions of the walls will fill the 125 mm square grid.

Figure 28:
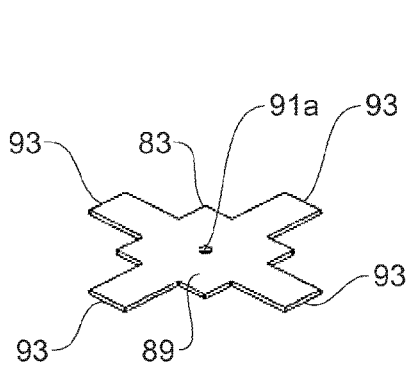
FIG. 28 is a tie down bracket of the threaded type for use with blocks according to the first embodiment.
Figure 29:
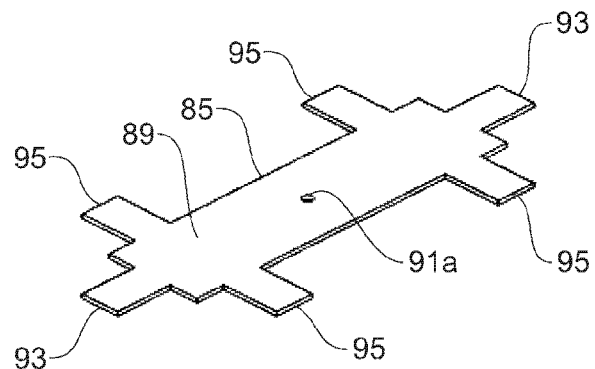
FIG. 29 is a tie down bracket of the threaded type for use with blocks according to the second embodiment.
Figure 30:
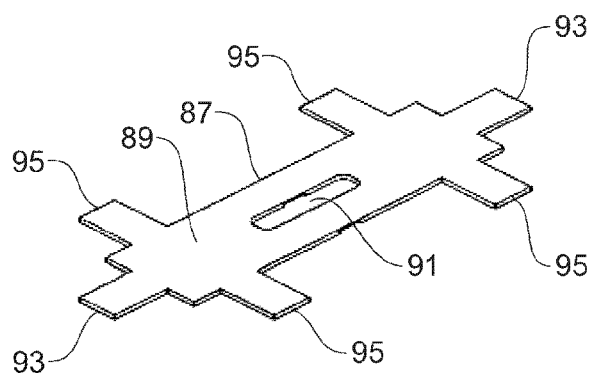
FIG. 30 is a tie down bracket of the slotted type for use with blocks according to the second embodiment.
Figure 31:
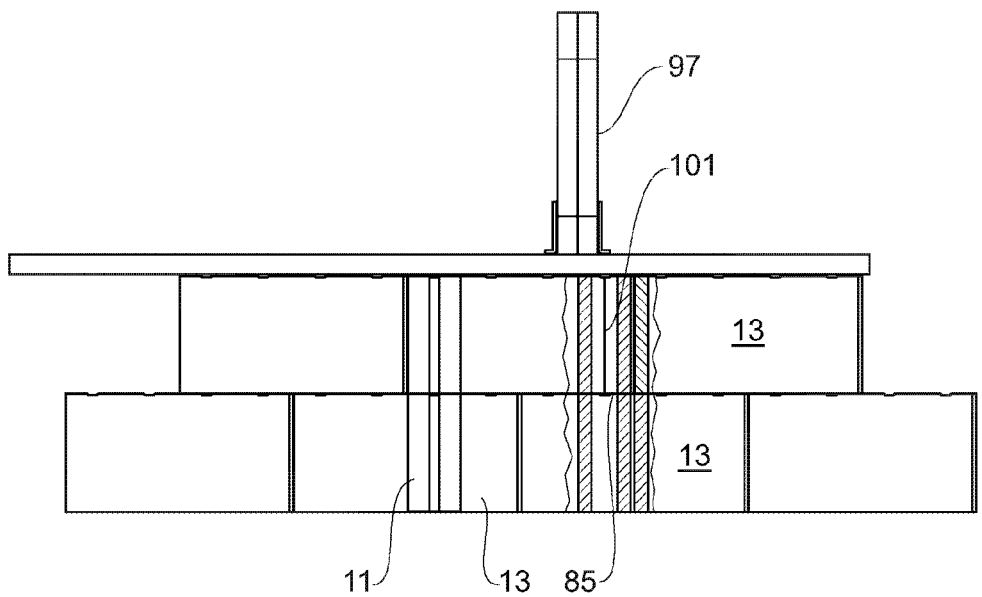
FIG. 31 is a side view showing the tie down bracket of FIG. 29 securing a roof truss.
Figure 32:
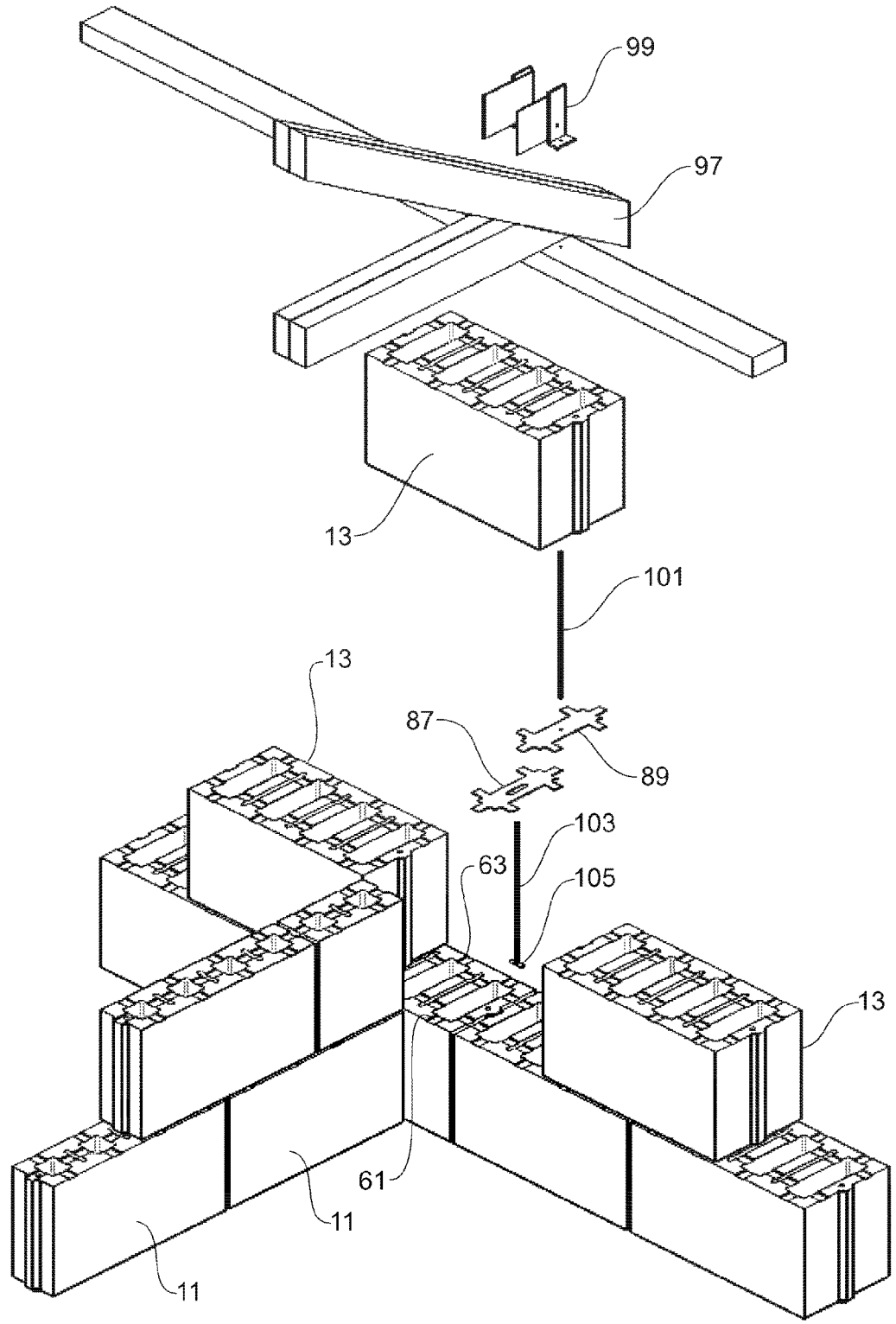
FIG. 32 is an exploded view showing assembly of tie down brackets within courses of bricks, for use in securing a roof truss.

The rectangular recesses 61, 63, 65, 67, and 69 or 71 and 73 also accommodate tie down brackets 83, 85, or 87 as illustrated in FIGS. 28 to 30. These tie down brackets have a main body 89 with a centrally located elongate aperture 91 or a threaded aperture 93 (or hole for a self-tapping screw). Arms 93 extend centrally to be accommodated in rectangular recesses 61, 63, 65, or 67, and 69, and arms 95 extend either side to be accommodated in rectangular recesses 71 and 73. The main body 89 is located in the appropriate sized hollow core 41, 43, 45, 47 in the required position where a roof truss 97 or other building element is to locate, on top of a course of bricks, before one of more courses is overlaid. When the roof truss 97 or other building element is to be secured, it is located and secured to its bracket 99 and a threaded rod 101 passes down into the threaded aperture 93 or a rod 103 with transverse bar 105 is inserted into the elongate aperture 91, depending on the tie down bracket 85 or 87 that has been used.

Figure 33:
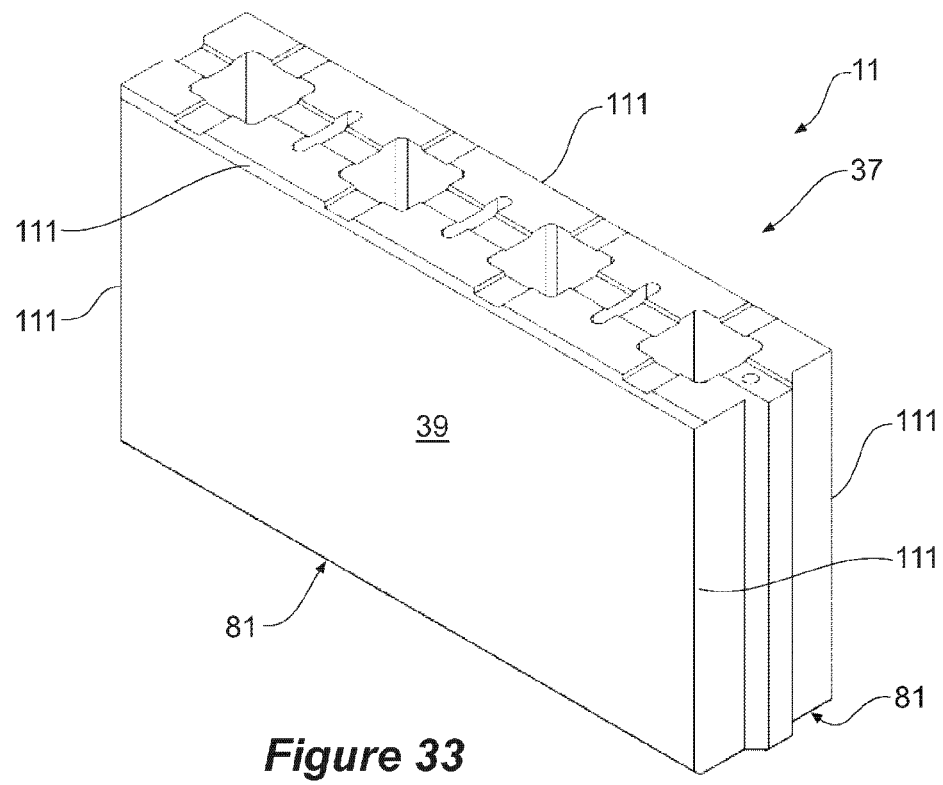
FIGS. 33 and 34 are isometric views of an alternative embodiment of the block shown in FIGS. 1 to 7.
Figure 34:
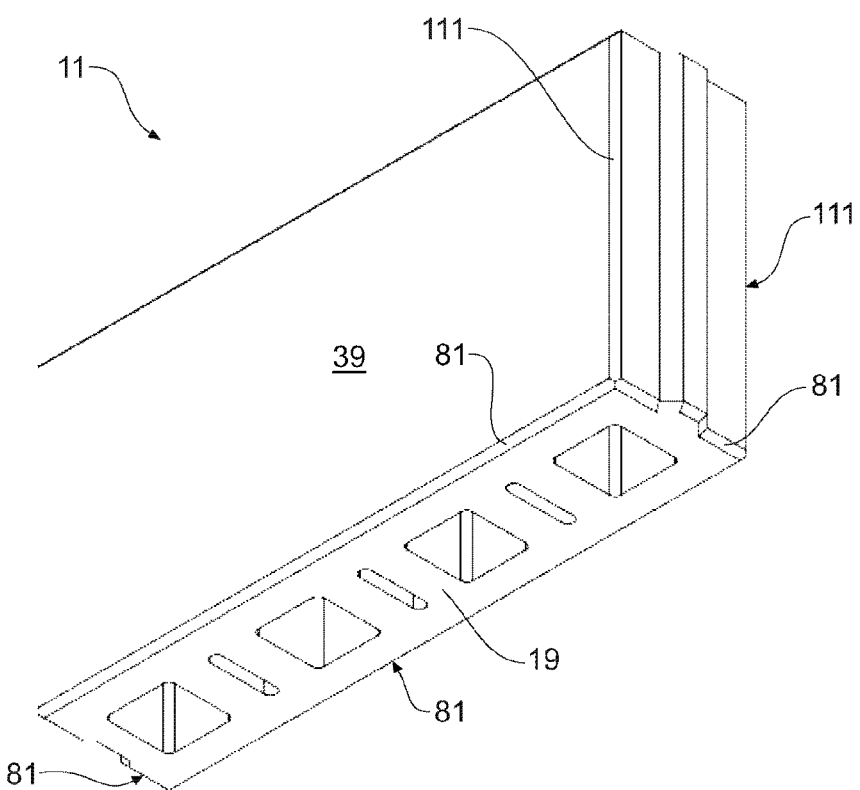

The embodiment illustrated in FIGS. 33 and 34 has the same features as the embodiment illustrated in FIGS. 1 to 7, but in addition to the 45 degree bevel 81 extending around the periphery of the base 19, instead of having sharp edges extending around the vertical edges and top of both sides 37 and 39, is provided with a 45 degree bevel 111 extending along the vertical edges of both sides 37 and 39, and along the top of both sides 37 and 39. The bevels 81 and 111 each have a transverse extent (length along the hypotenuse) of 1 cm.

Figure 35:
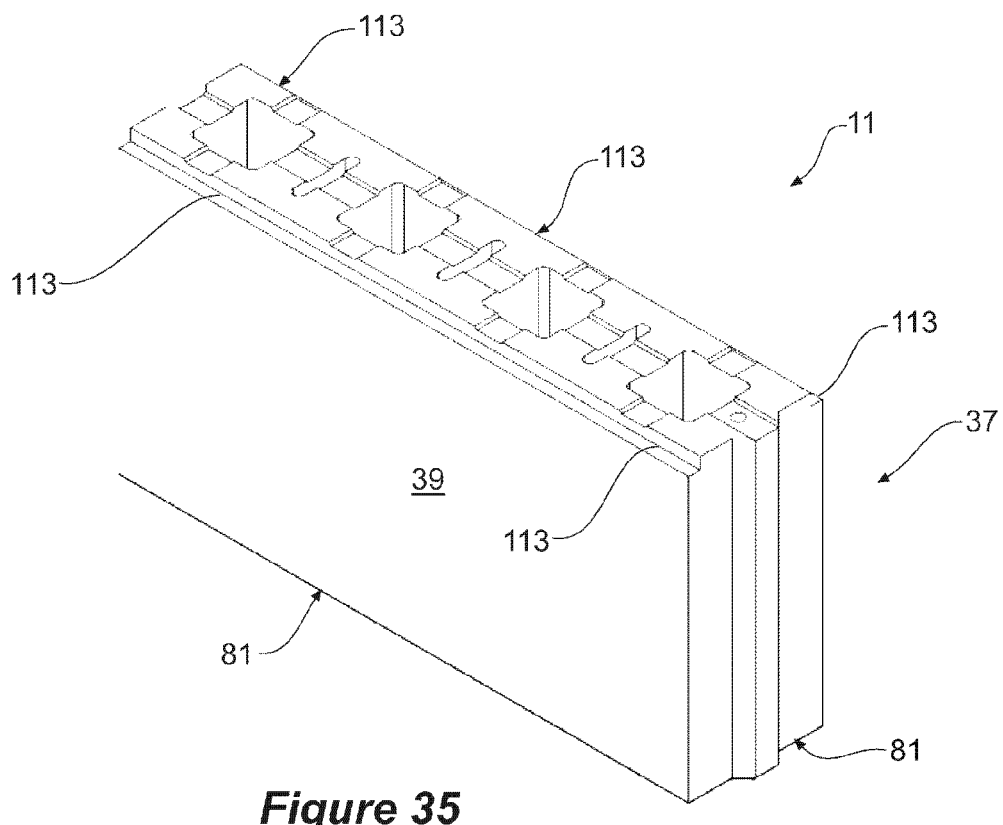
FIGS. 35 and 36 are isometric views of another alternative embodiment of the block shown in FIGS. 1 to 7.
Figure 36:
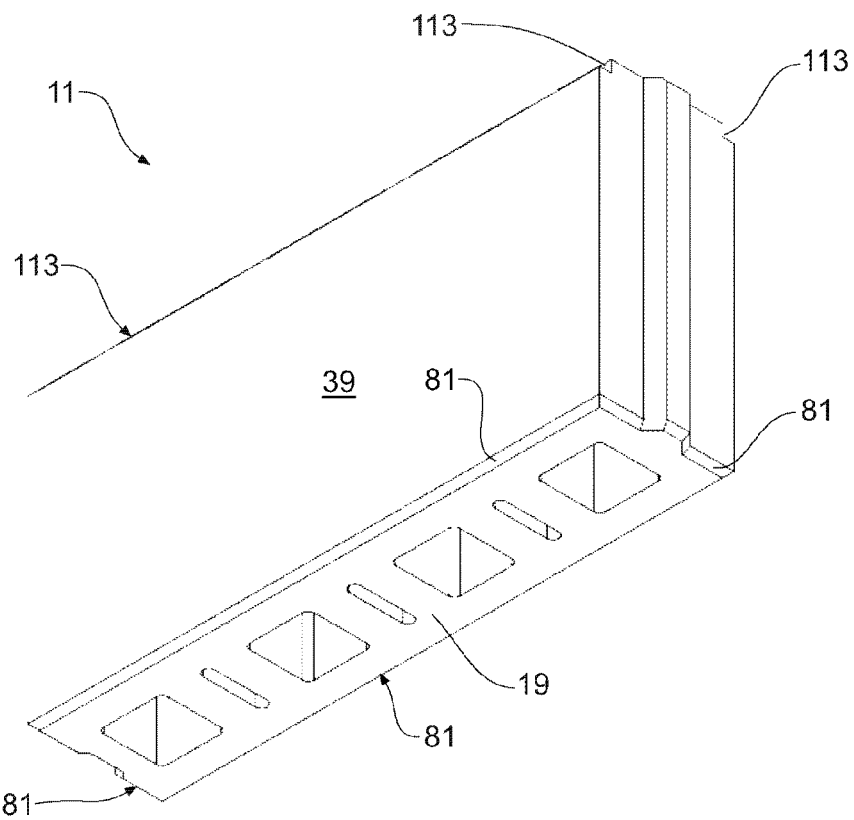

The embodiment illustrated in FIGS. 35 and 36 has the same features as the embodiment illustrated in FIGS. 1 to 7, but in addition to the 45 degree bevel 81 extending around the periphery of the base 19, instead of having sharp edges extending along the top of both sides 37 and 39, is provided with a square section step 113 extending along the top of both sides 37 and 39. The bevels 81 each have a transverse extent of 1 cm, and the square section step 113 has dimensions of 1.25 cm depth×1.25 cm high (half an inch by half an inch). The square section step forms a groove in a feature brick wall which mimics or can be used for bed tuck pointing, in a completed wall.

Figure 37:
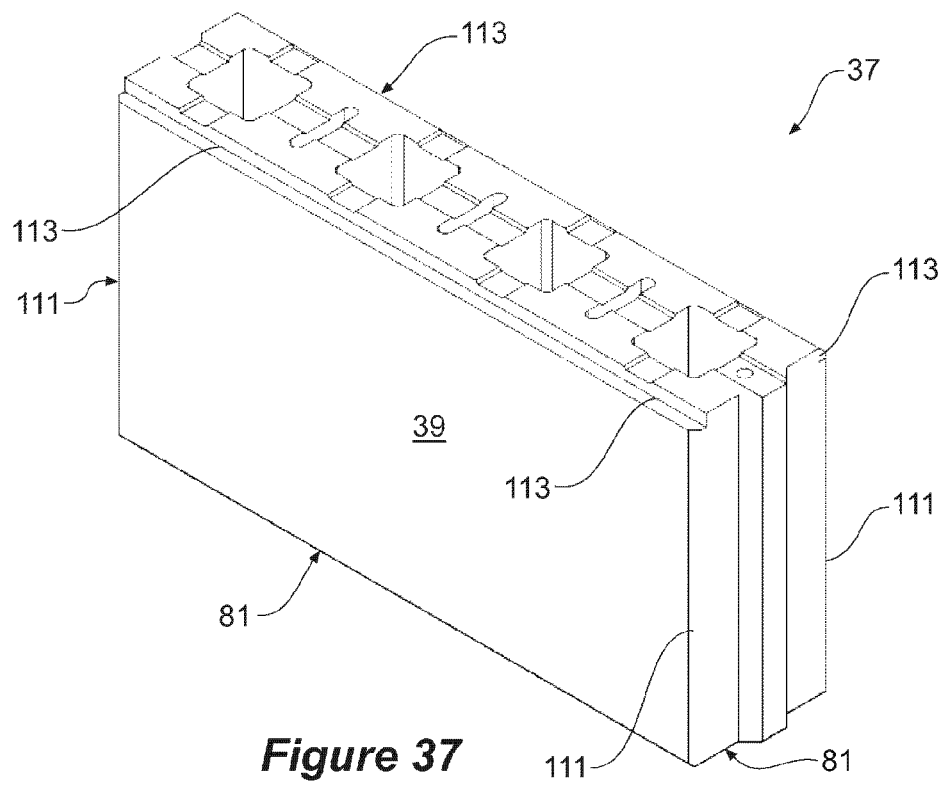
FIGS. 37 and 38 are isometric views of yet another alternative embodiment of the block shown in FIGS. 1 to 7.
Figure 38:
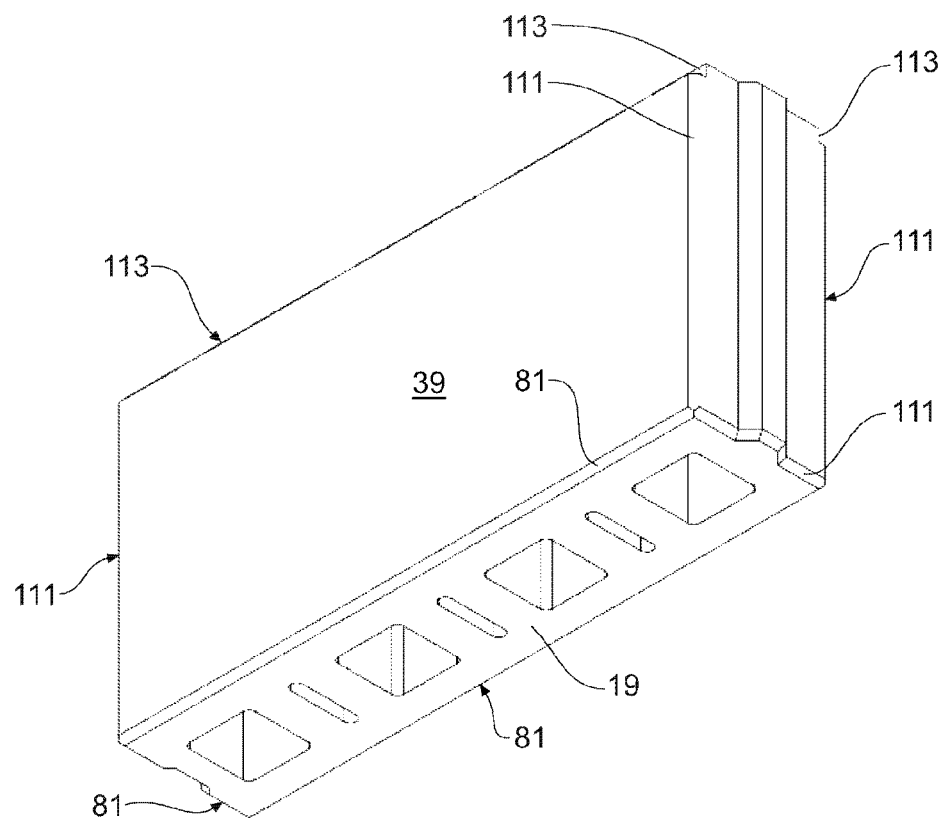

The embodiment illustrated in FIGS. 37 and 38 has the same features as the embodiment illustrated in FIGS. 1 to 7, but in addition to the 45 degree bevel 81 extending around the periphery of the base 19, instead of having sharp edges extending along the vertical edges and along the top of both sides 37 and 39, is provided with a square section step 113 extending along the top of both sides 37 and 39, and a 45 degree bevel 111 extending along the vertical edges of both sides 37 and 39. The bevels 81 and 111 each have a transverse extent of 1 cm, and the square section step 113 has dimensions of 1.25 cm depth×1.25 cm high (half an inch by half an inch).

Figure 39:
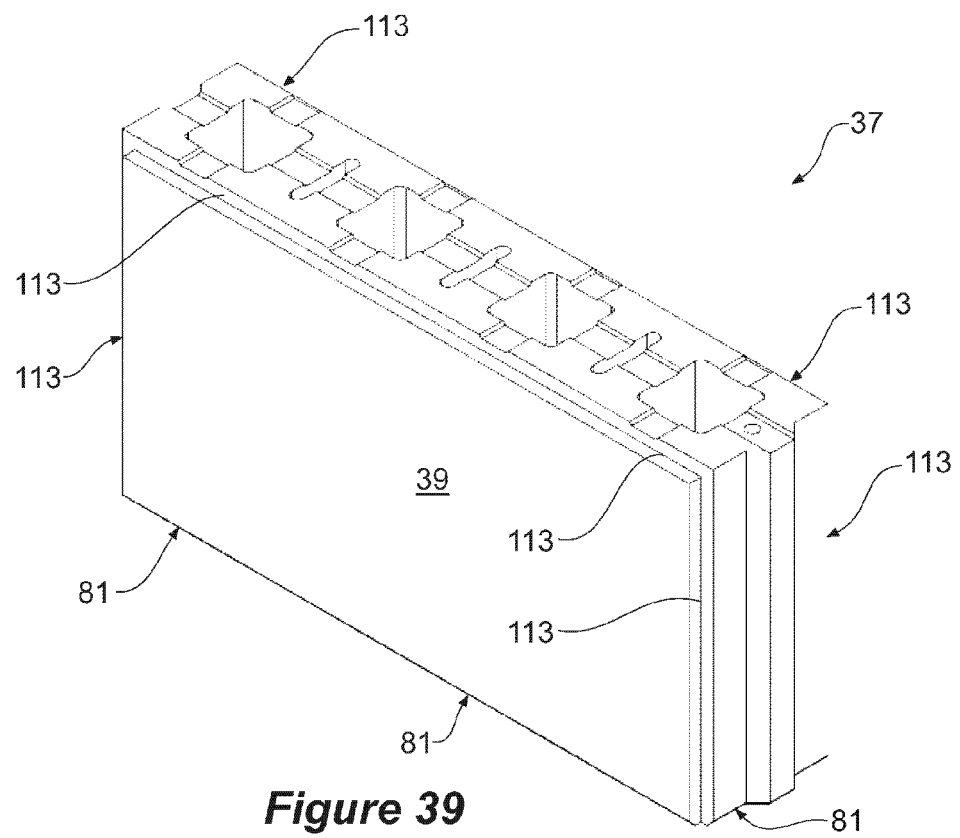
FIGS. 39 and 40 are isometric views of a further alternative embodiment of the block shown in FIGS. 1 to 7.
Figure 40:
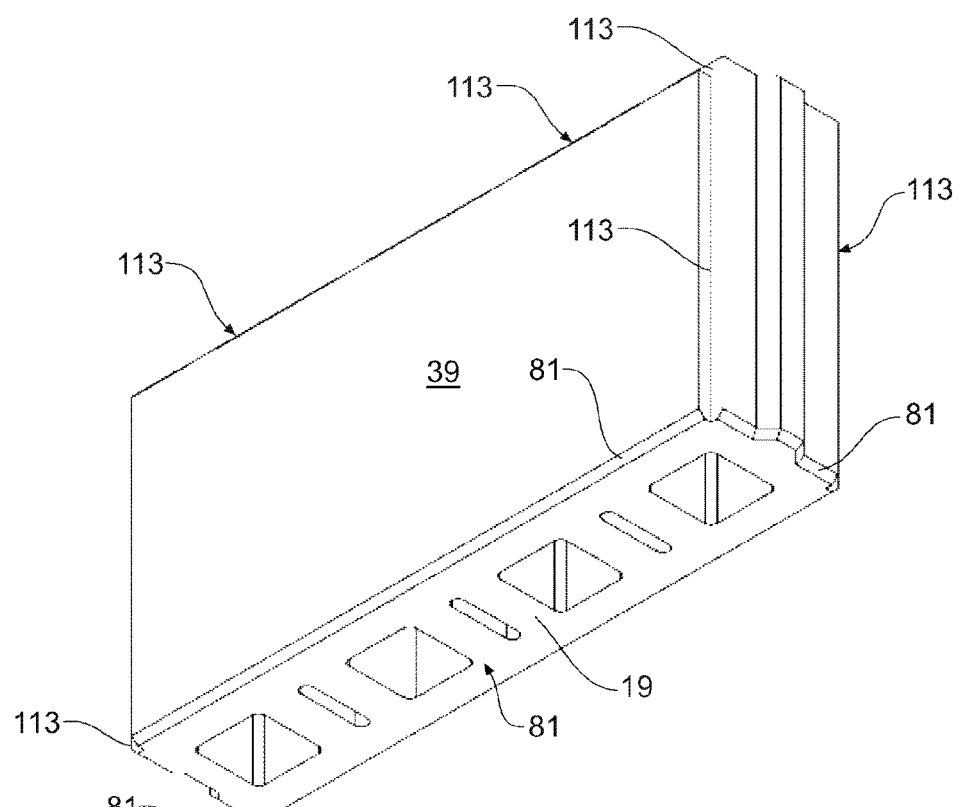

The embodiment illustrated in FIGS. 39 and 40 has the same features as the embodiment illustrated in FIGS. 1 to 7, but in addition to the 45 degree bevel 81 extending around the periphery of the base 19, instead of having sharp edges extending along the vertical edges and along the top of both sides 37 and 39, is provided with a square section step 113 extending along the vertical edges and along the top of both sides 37 and 39. The bevels 81 each have a transverse extent of 1 cm, and the square section step 113 has dimensions of 1.25 cm depth×1.25 cm high (half an inch by half an inch).

Figure 41:
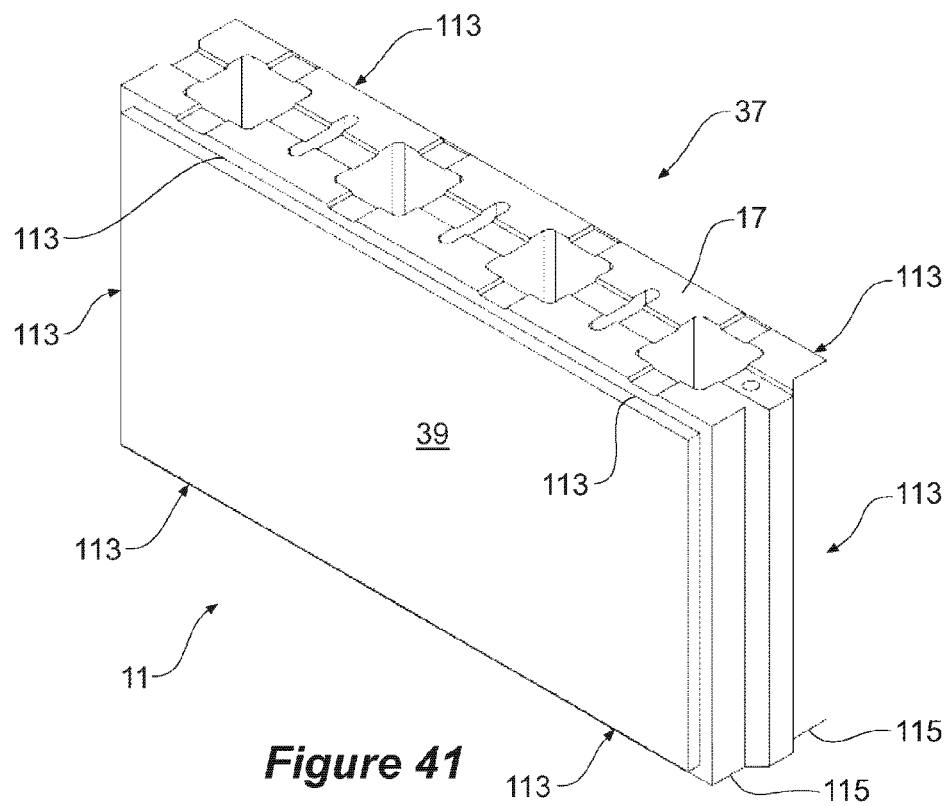
FIGS. 41 and 42 are isometric views of yet a further alternative embodiment of the block shown in FIGS. 1 to 7.
Figure 42:
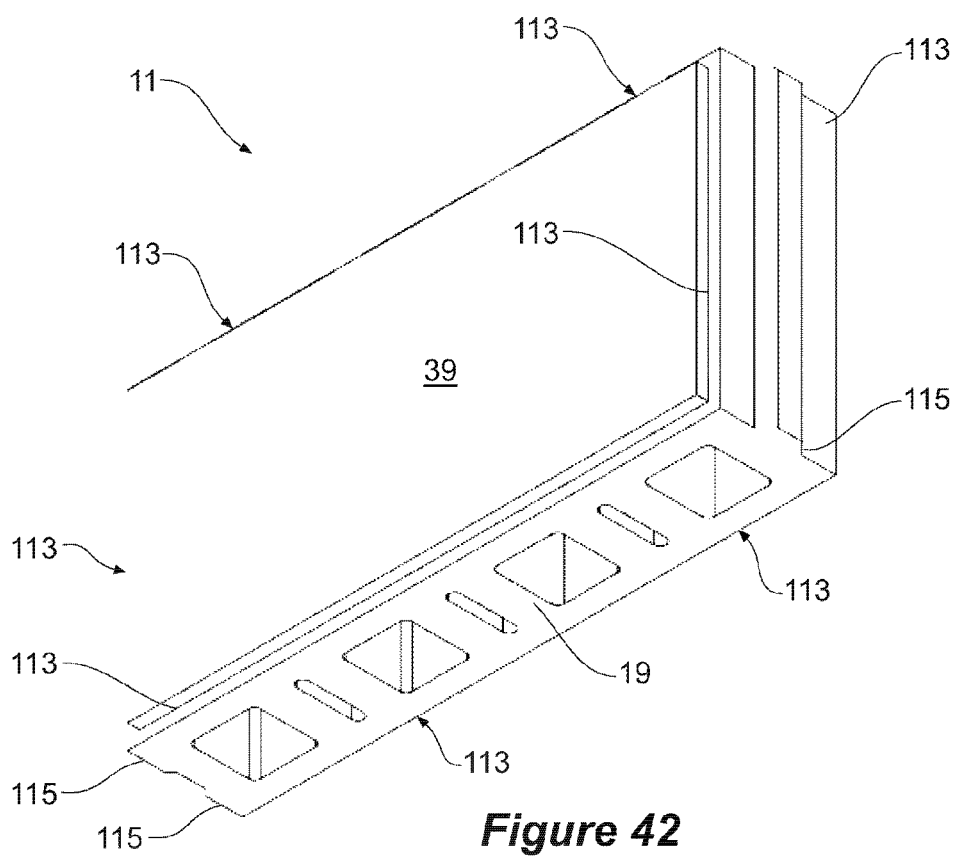

The embodiment illustrated in FIGS. 41 and 42 has the same features as the embodiment illustrated in FIGS. 1 to 7, but does not have the 45 degree bevel 81 extending around the periphery of the base 19, instead having sharp edges 115 extending along the vertical transverse edges of the base 19, and is provided with a square section step 113 extending all around the periphery of both sides 37 and 39. The square section step 113 has dimensions of 1.25 cm depth×1.25 cm high (half an inch by half an inch).

Figure 43:
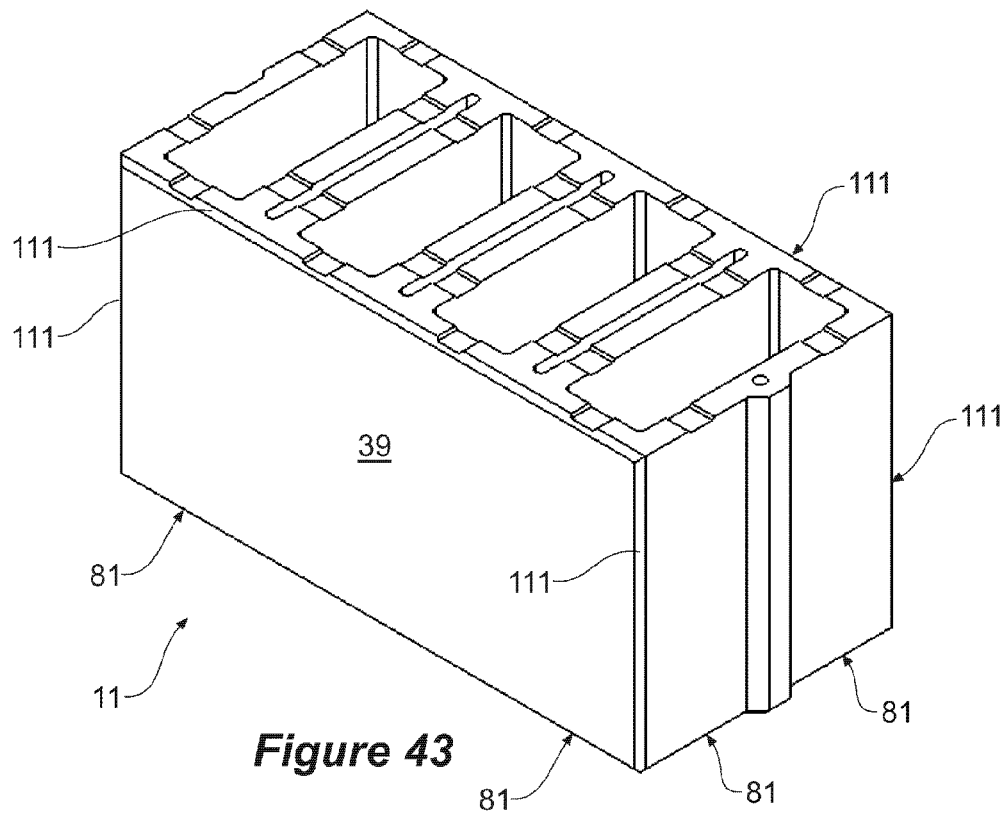
FIGS. 43 and 44 are isometric views of an alternative embodiment of the block shown in FIGS. 8 to 14.
Figure 44:
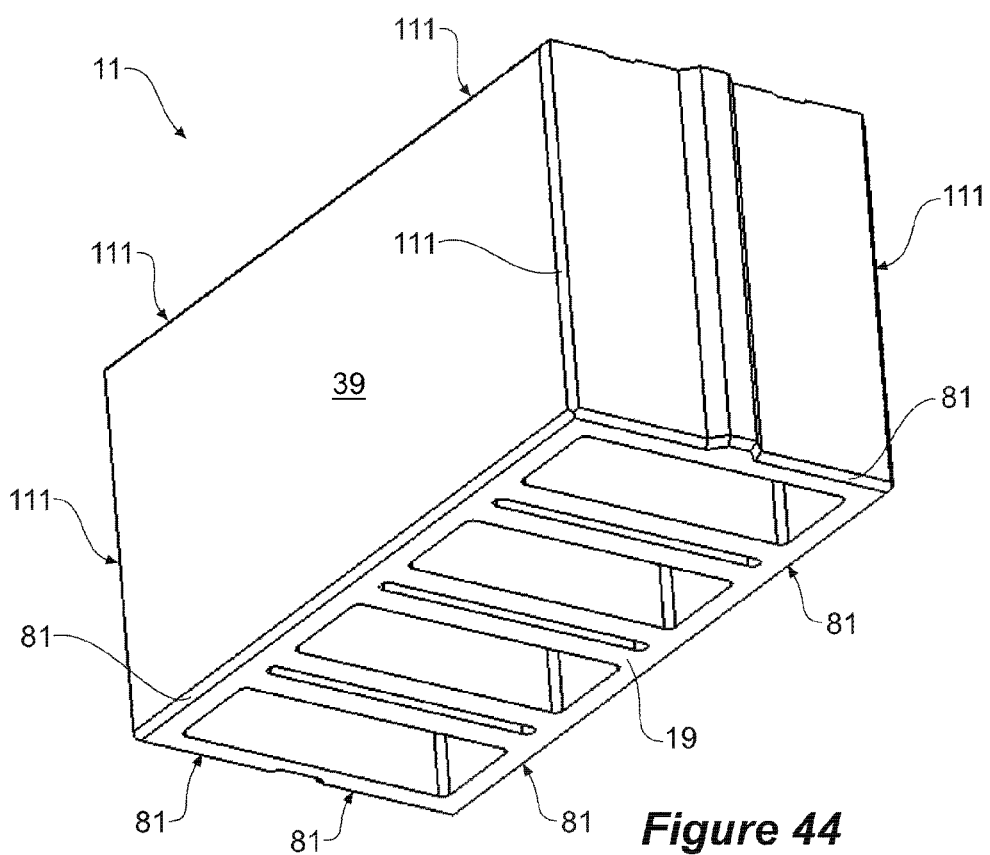

The embodiment illustrated in FIGS. 43 and 44 has the same features as the embodiment illustrated in FIGS. 8 to 14, but in addition to the 45 degree bevel 81 extending around the periphery of the base 19, instead of having sharp edges extending around the vertical edges and top of both sides 37 and 39, is provided with a 45 degree bevel 111 extending along the vertical edges of both sides 37 and 39, and along the top of both sides 37 and 39. The bevels 81 and 111 each have a transverse extent of 1 cm.

Figure 45:
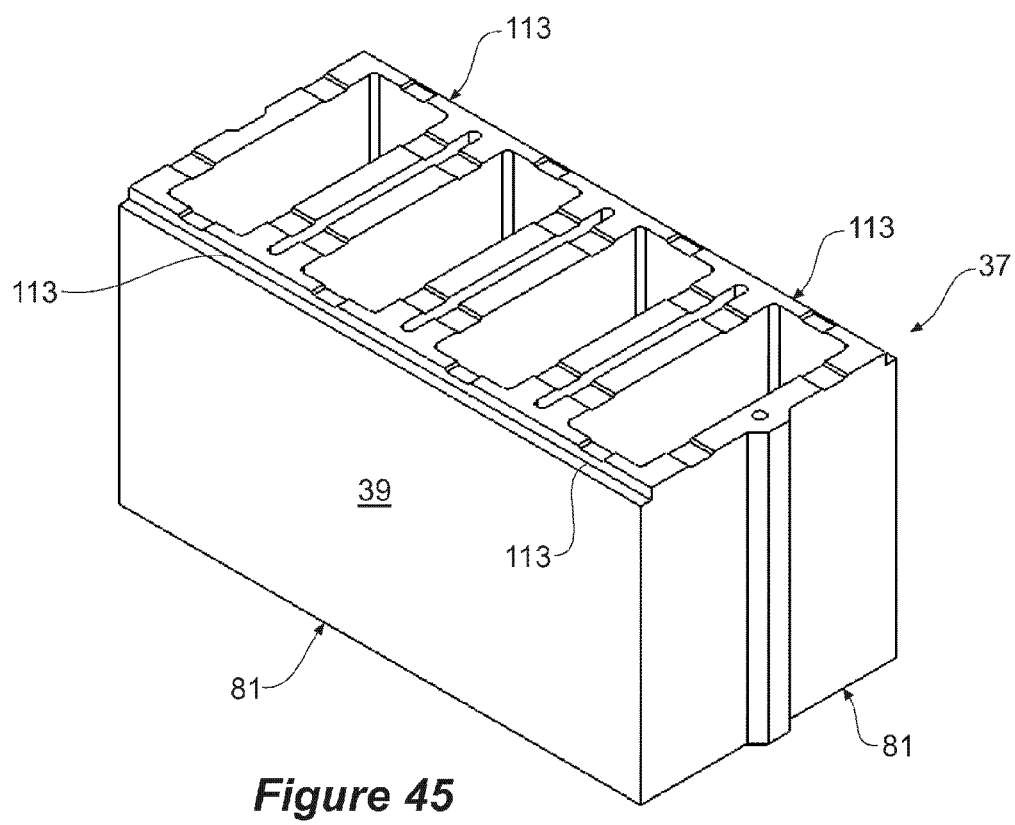
FIGS. 45 and 46 are isometric views of another alternative embodiment of the block shown in FIGS. 8 to 14.
Figure 46:
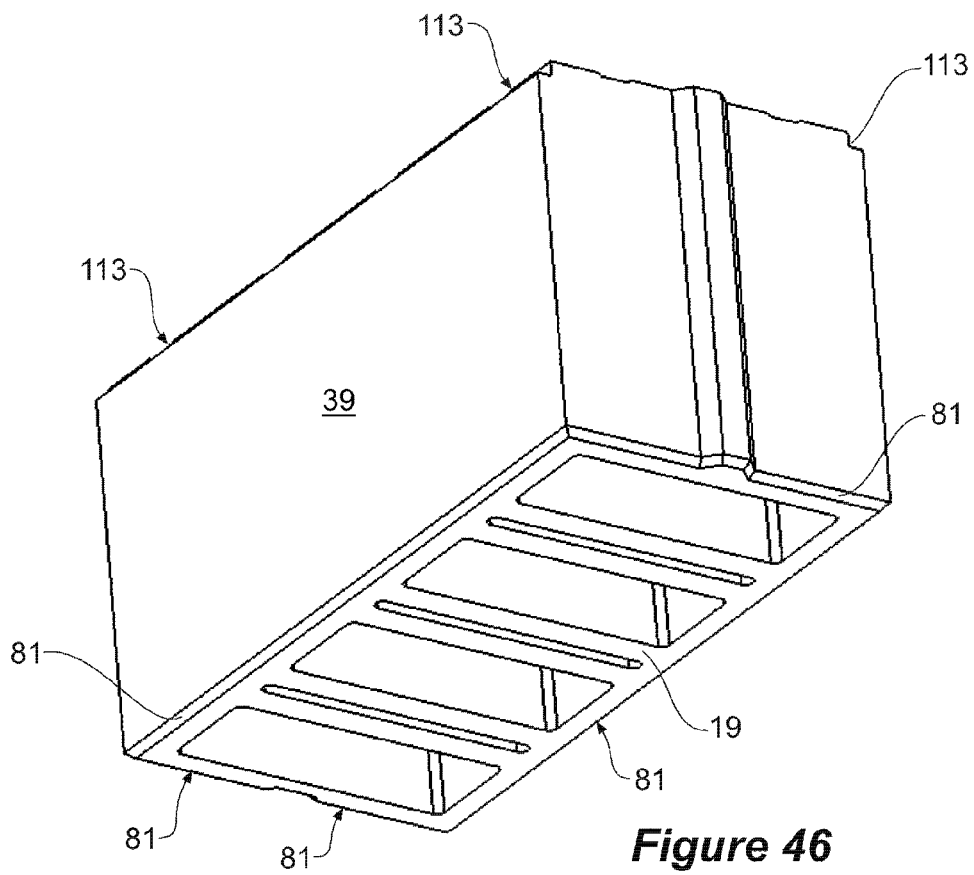

The embodiment illustrated in FIGS. 45 and 46 has the same features as the embodiment illustrated in FIGS. 8 to 14, but in addition to the 45 degree bevel 81 extending around the periphery of the base 19, instead of having sharp edges extending along the top of both sides 37 and 39, is provided with a square section step 113 extending along the top of both sides 37 and 39. The bevels 81 each have a transverse extent of 1 cm, and the square section step 113 has dimensions of 1.25 cm depth×1.25 cm high (half an inch by half an inch).

Figure 47:
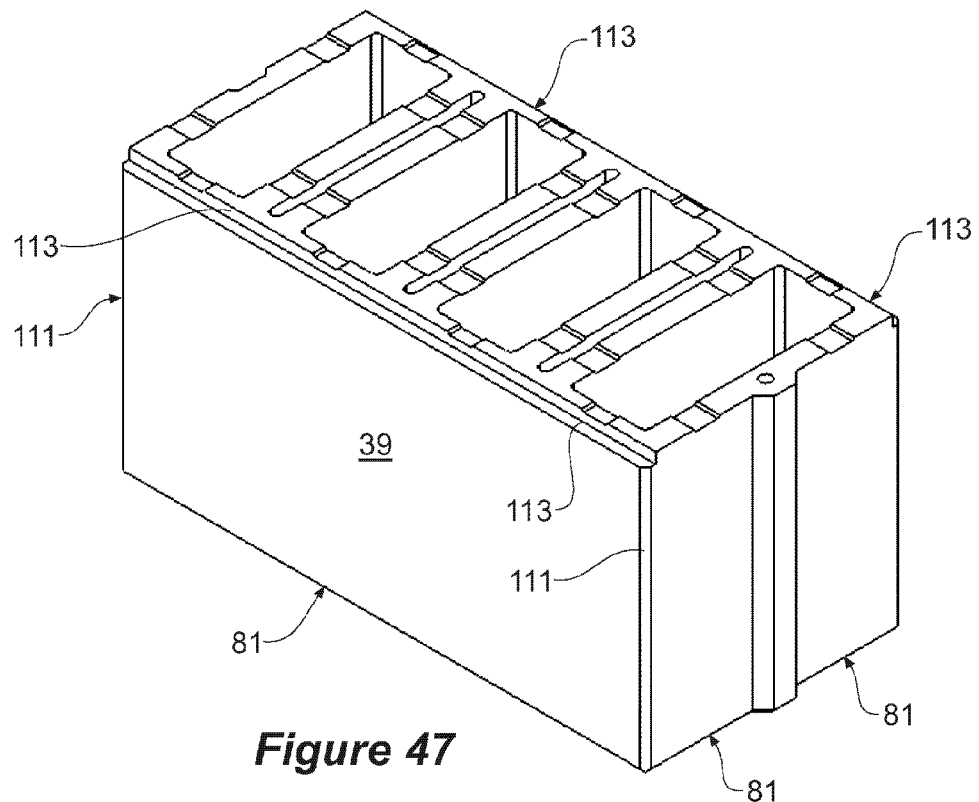
FIGS. 47 and 48 are isometric views of yet another alternative embodiment of the block shown in FIGS. 8 to 14.
Figure 48:
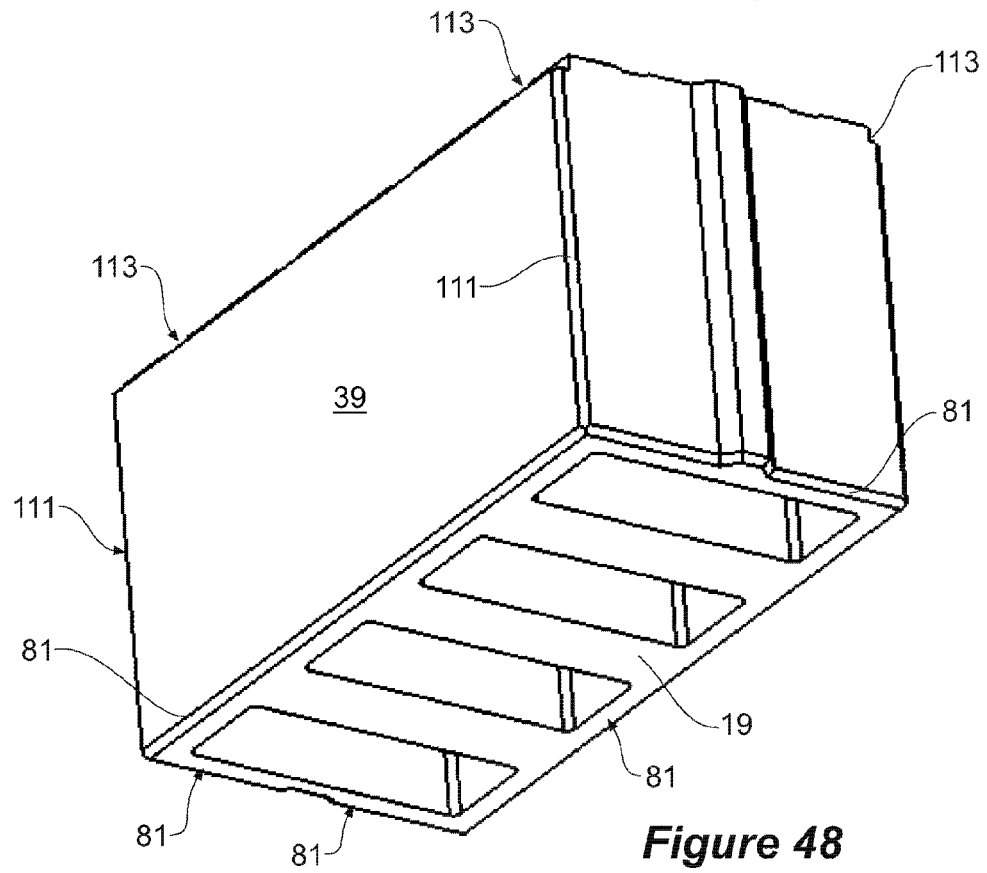

The embodiment illustrated in FIGS. 47 and 48 has the same features as the embodiment illustrated in FIGS. 8 to 14, but in addition to the 45 degree bevel 81 extending around the periphery of the base 19, instead of having sharp edges extending along the vertical edges and along the top of both sides 37 and 39, is provided with a square section step 113 extending along the top of both sides 37 and 39, and a 45 degree bevel 111 extending along the vertical edges of both sides 37 and 39. The bevels 81 and 111 each have a transverse extent of 1 cm, and the square section step 113 has dimensions of 1.25 cm depth×1.25 cm high (half an inch by half an inch).

Figure 49:
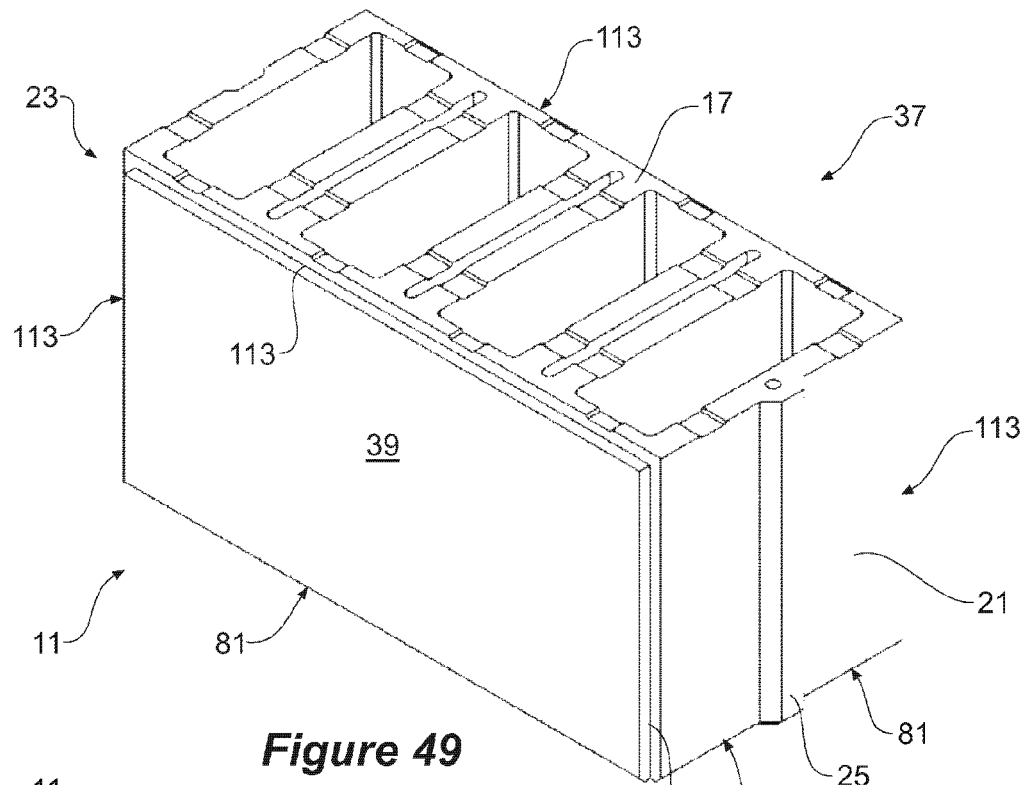
FIGS. 49 and 50 are isometric views of a further alternative embodiment of the block shown in FIGS. 8 to 14.
Figure 50:
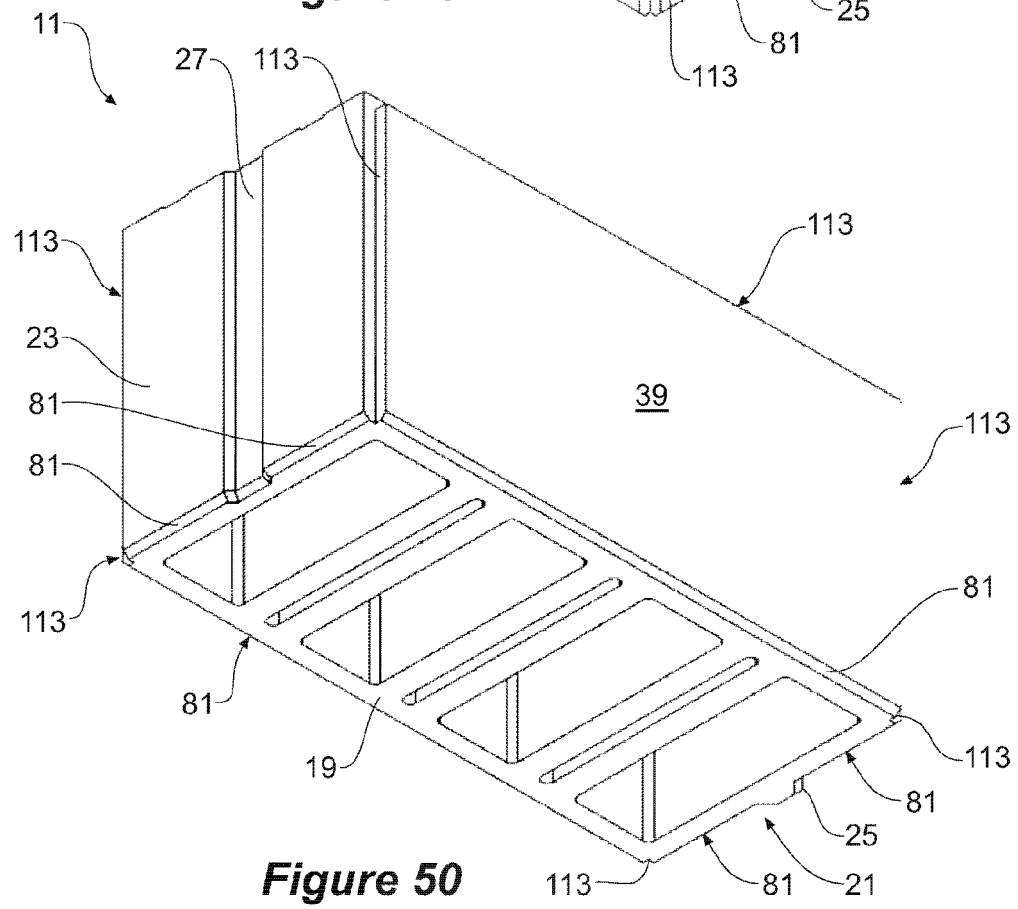

The embodiment illustrated in FIGS. 49 and 50 has the same features as the embodiment illustrated in FIGS. 8 to 14, with the 45 degree bevel 81 extending entirely around the periphery of the base 19. Further, instead of having sharp edges extending along the vertical edges and along the top of both sides 37 and 39, the block 11 is provided with a square section step 113 extending along the vertical edges and along the top of both sides 37 and 39. The bevels 81 each have a transverse extent of 1 cm, and the square section step 113 has dimensions of 1.25 cm depth×1.25 cm high (half an inch by half an inch).

Figure 51:
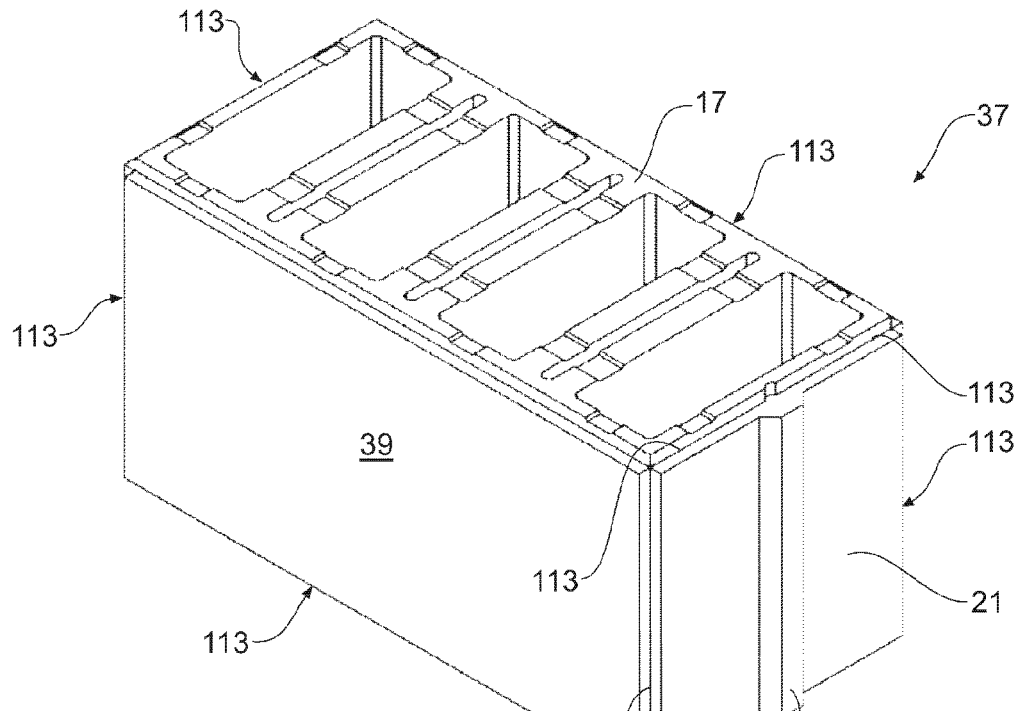
FIGS. 51 and 52 are isometric views of yet a further alternative embodiment of the block shown in FIGS. 8 to 14.
Figure 52:
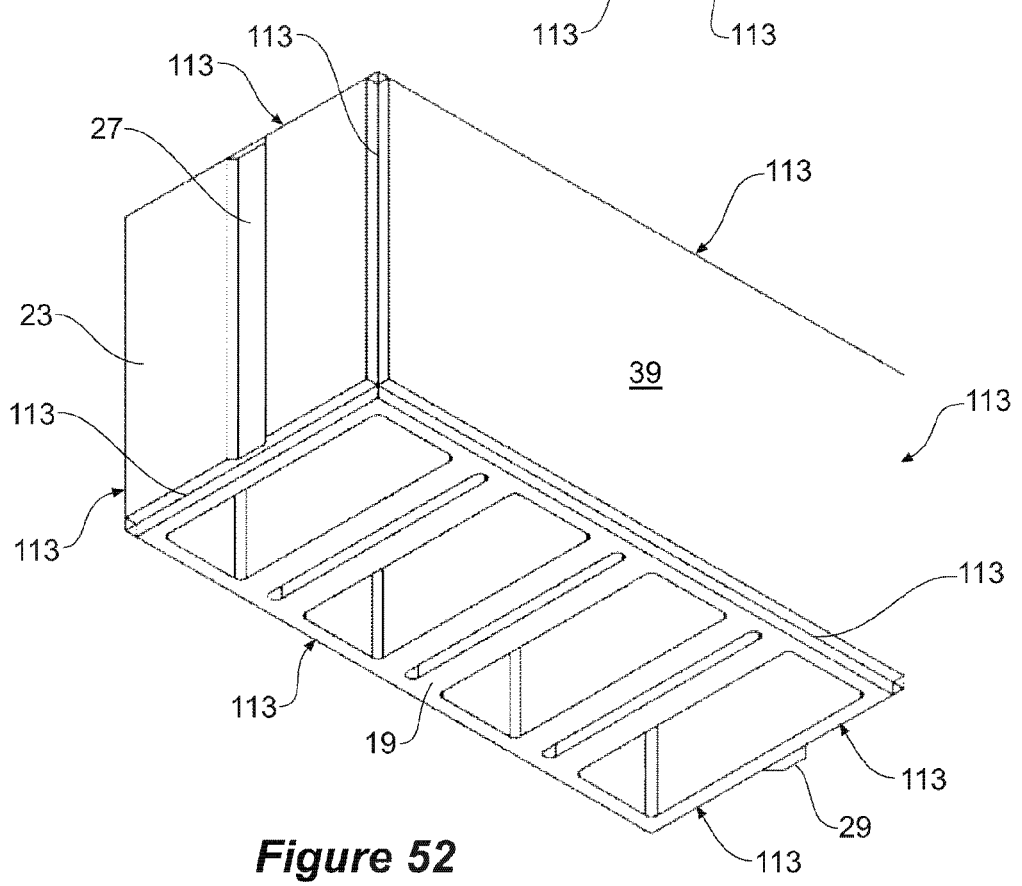

The embodiment illustrated in FIGS. 51 and 52 has the same features as the embodiment illustrated in FIGS. 8 to 14, but does not have the 45 degree bevel 81 extending around the periphery of the base 19, instead having a square section step 113 extending along all edges, all around the periphery of both sides 37 and 39, and along the top and bottom of both ends 21 and 23. The square section step 113 has dimensions of 1.25 cm depth×1.25 cm high (half an inch by half an inch).

In these embodiments, the square section step can be altered to be anywhere between 0.5 cm in height up to 1.25 cm high. The depth could be varied down to 1 cm or even 0.75 cm or 0.5 cm. The provision of square section assists in disguising slight misalignment of the blocks in a construction, in addition to providing a feature effect, such as imitation mortar joins or tuck pointing. Where a completed wall is to be rendered or coated, the square section step provides a purchase for the coating, which assists its adhesion, particularly over the passage of time, where due to cycles of heating and cooling, and under influence of vibration, such coatings may detach from an entirely smooth wall.

Figure 53:
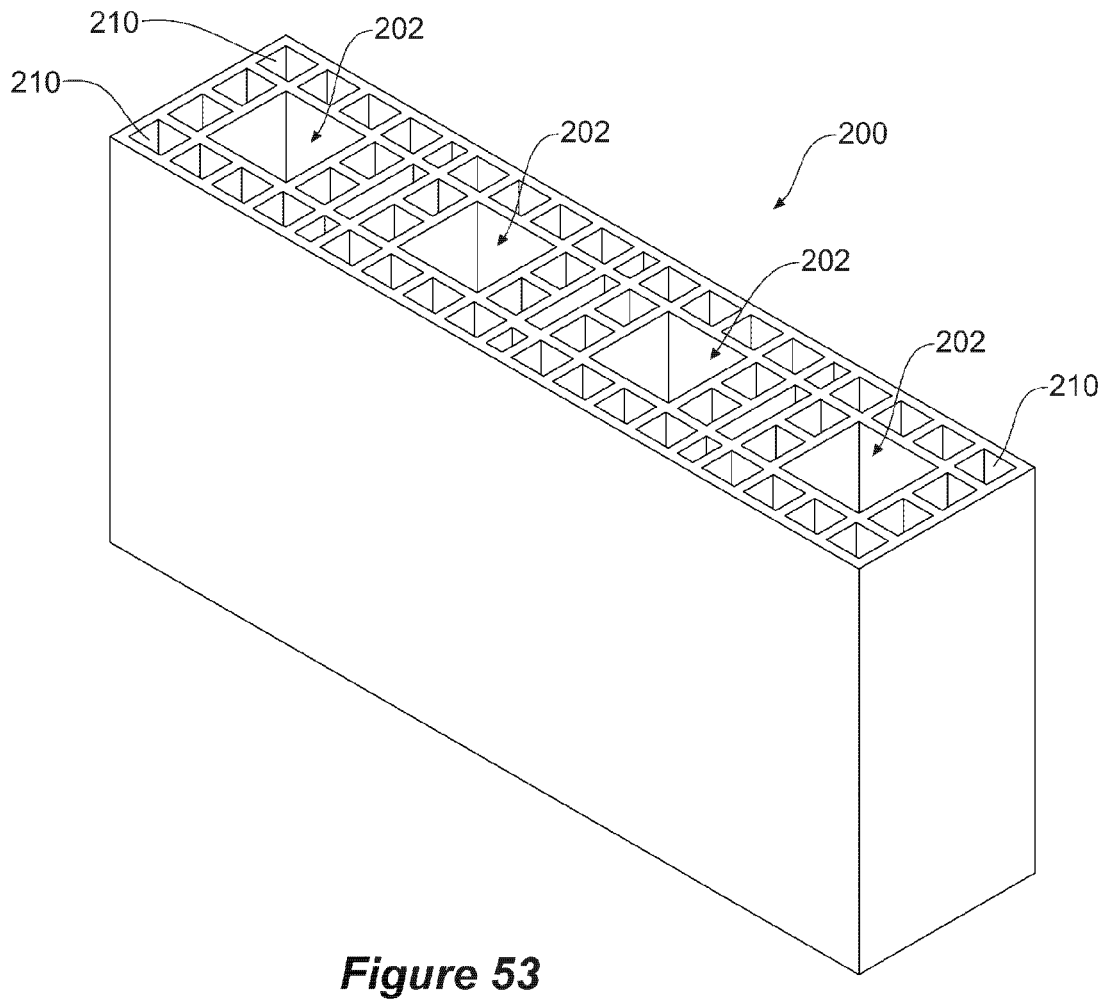
FIG. 53 is an isometric view of a block according to a further embodiment.
Figure 54:
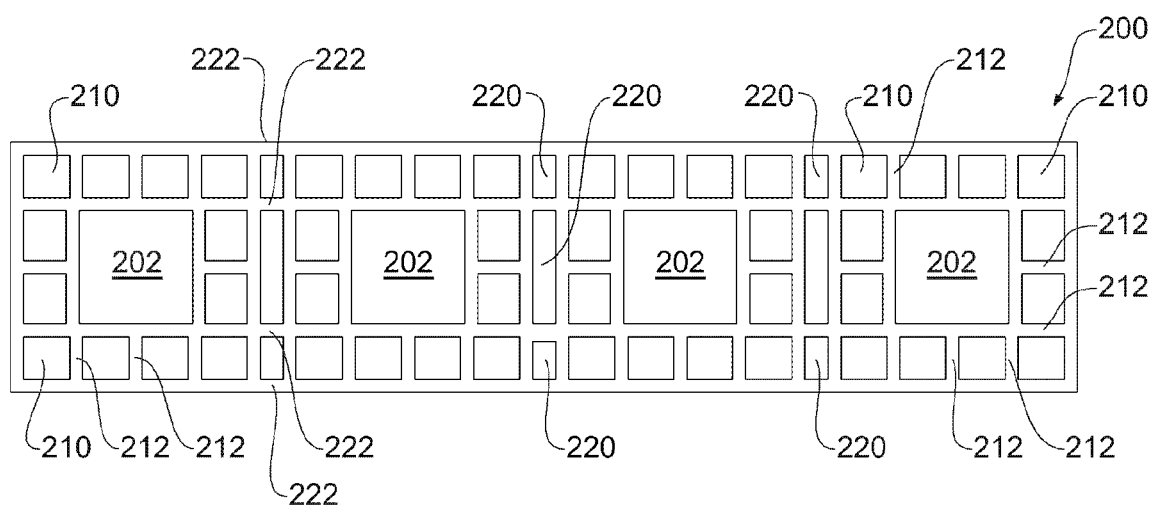
FIG. 54 is a top plan view of the block of FIG. 53.

Referring now to FIGS. 53 and 54, where there is illustrated a block 200 comprising square cores 202, but which differs from previously presented embodiments in that the walls extending about the cores 202 comprise a plurality of secondary cores 210 (also of square cross-sectional shape) extending from said top to said base, which are separated by a plurality of webs 212. In this way, the block 200 is lightened by the inclusion of the secondary cores, but sufficient strength and rigidity is maintained by the webs 212. The secondary cores 210 also provide a complex passage for water transfer across or through the block.

Moreover, three slots 220 are located between each pair of adjacent cores 202 to delineate block portions, where these slots 220 are aligned transversely across the block. Each two adjacent block portions are connected by four webs 222, which delineate these slots 220. Cutting through these webs 222 is easier than cutting through solid block, so division of block portions can be effected considerably faster.

Figure 55:
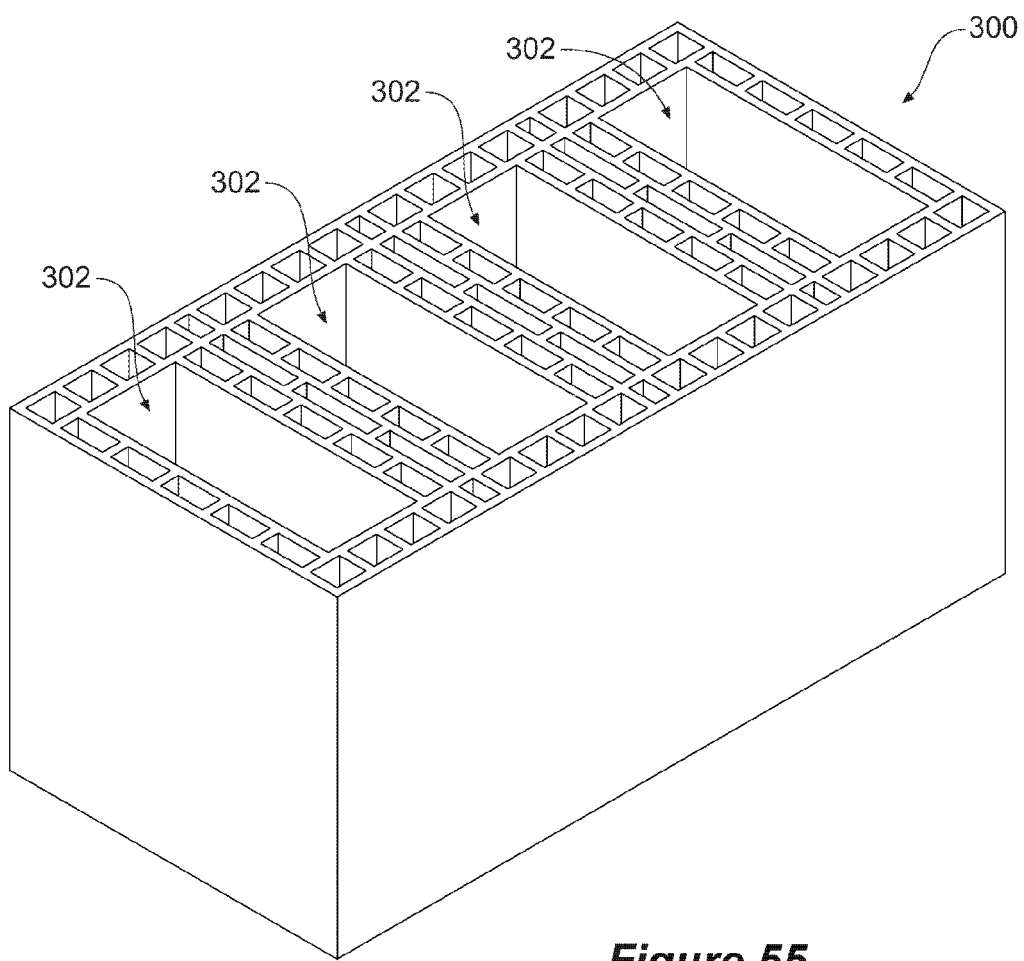
FIG. 55 is an isometric view of a block according to a further embodiment.
Figure 56:
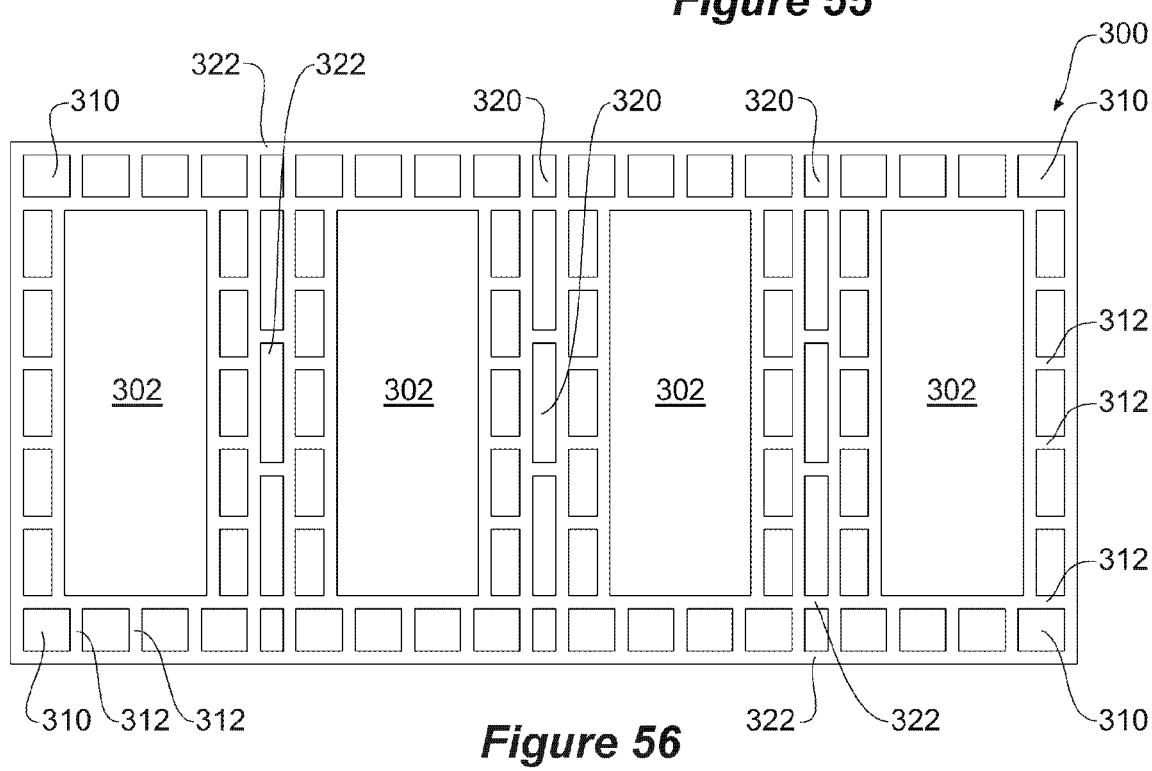
FIG. 56 is a top plan view of the block of FIG. 55.

Referring now to FIGS. 55 and 56, where there is illustrated a block 300 comprising rectangular cores 302, and walls extending about the cores 302 comprising a plurality of secondary cores 310 (some of which have a rectangular cross-sectional shape). Five slots 320 are located between each pair of adjacent cores to delineate block portions, where these slots 320 are aligned transversely across the block. Each two adjacent block portions are connected by six webs 322, which delineate these slots 320.

The blocks 200, 300 denote an example of a block manufactured from clay that is suitable for use in automated building construction. In order to reduce the weight of the clay block a greater number of extrusion cores are required (the CMU block achieves its lightweight properties as a result of the lightweight expanded aggregate which is added into the mixture). The secondary cores also aid in preventing moisture ingress through or across the block meaning that the clay block may be used without a render. The dimensions of clay blocks 200, 300 are nominally the same as the CMU blocks previously described. Block 200 may have a length of approximately 490 mm; a width of approximately 115 mm; and, a height of approximately 230 mm. Whereas block 300 may have a length of approximately 490 mm; a width of approximately 240 mm; and, a height of approximately 230 mm.

Figure 57:
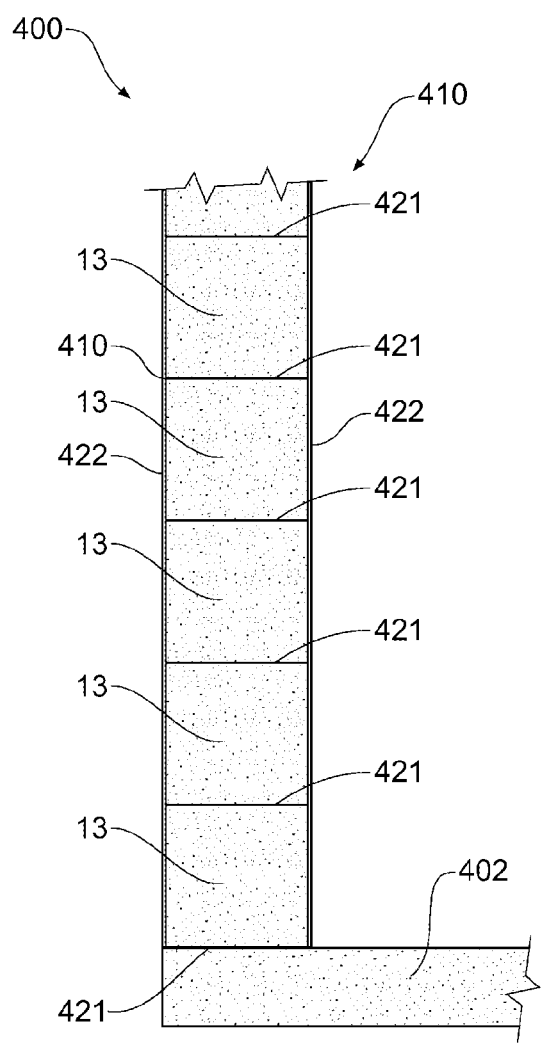
FIG. 57 is an end view of an external wall assembly.
Figure 58:
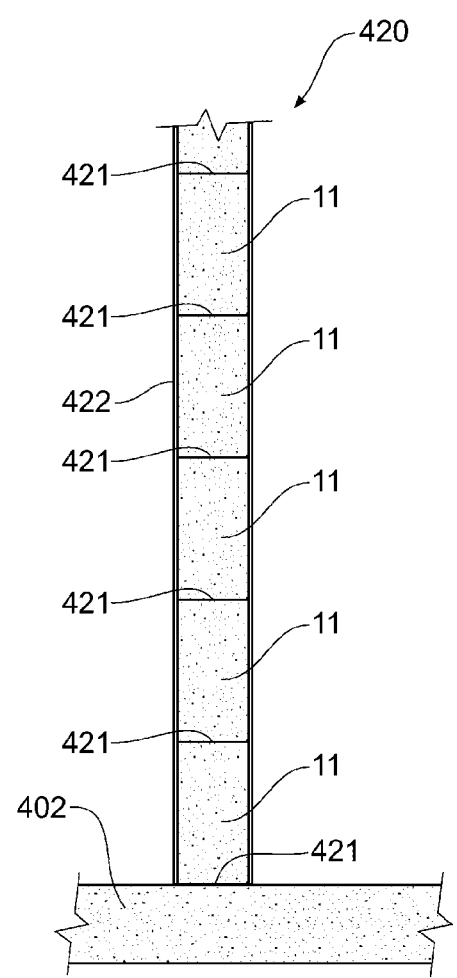
FIG. 58 is an end view of an internal wall assembly.
Figure 59:
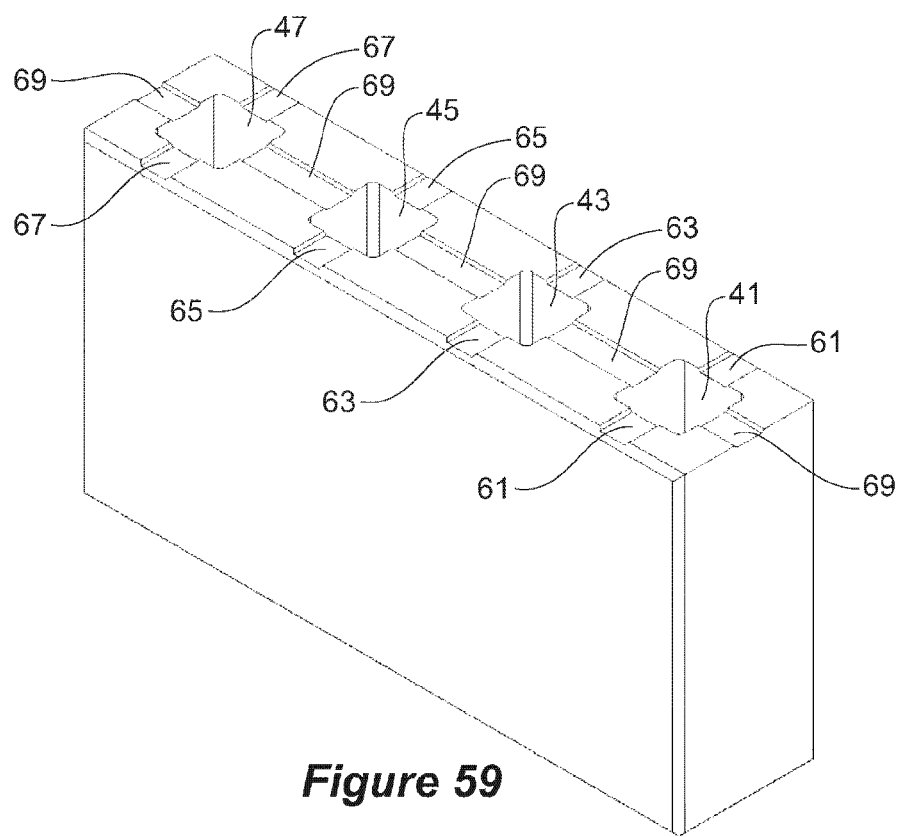
FIGS. 59 and 60 are isometric views of a block according to a further embodiment.
Figure 60:
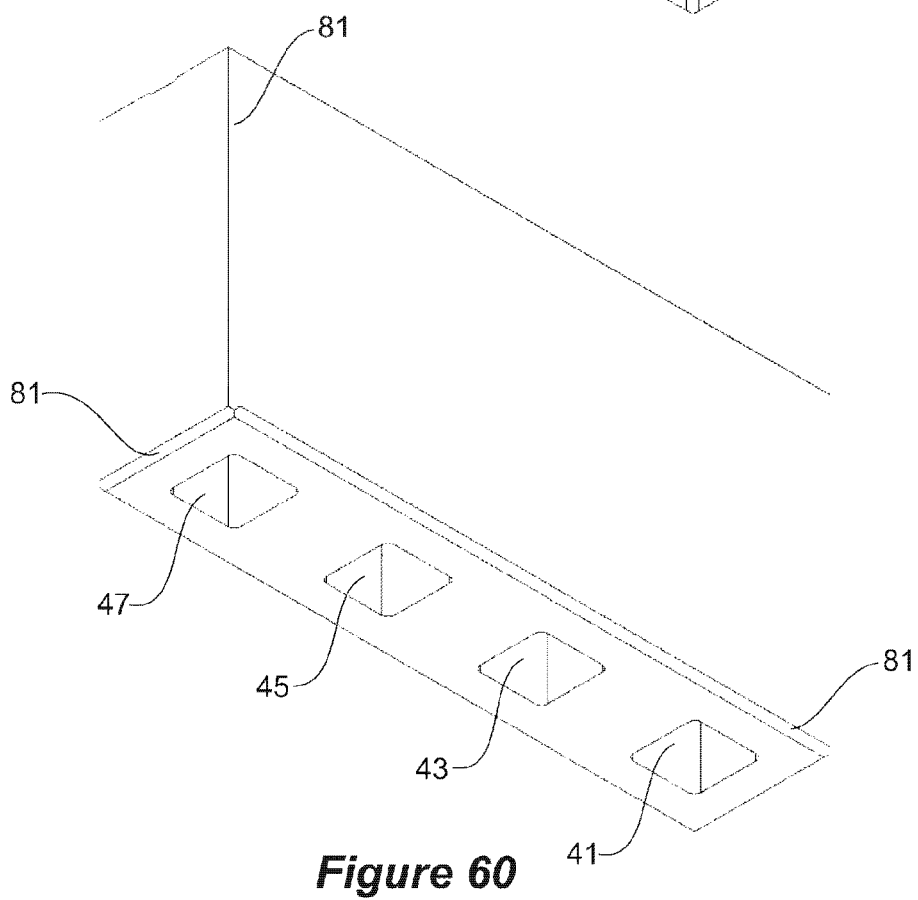
Figure 61:
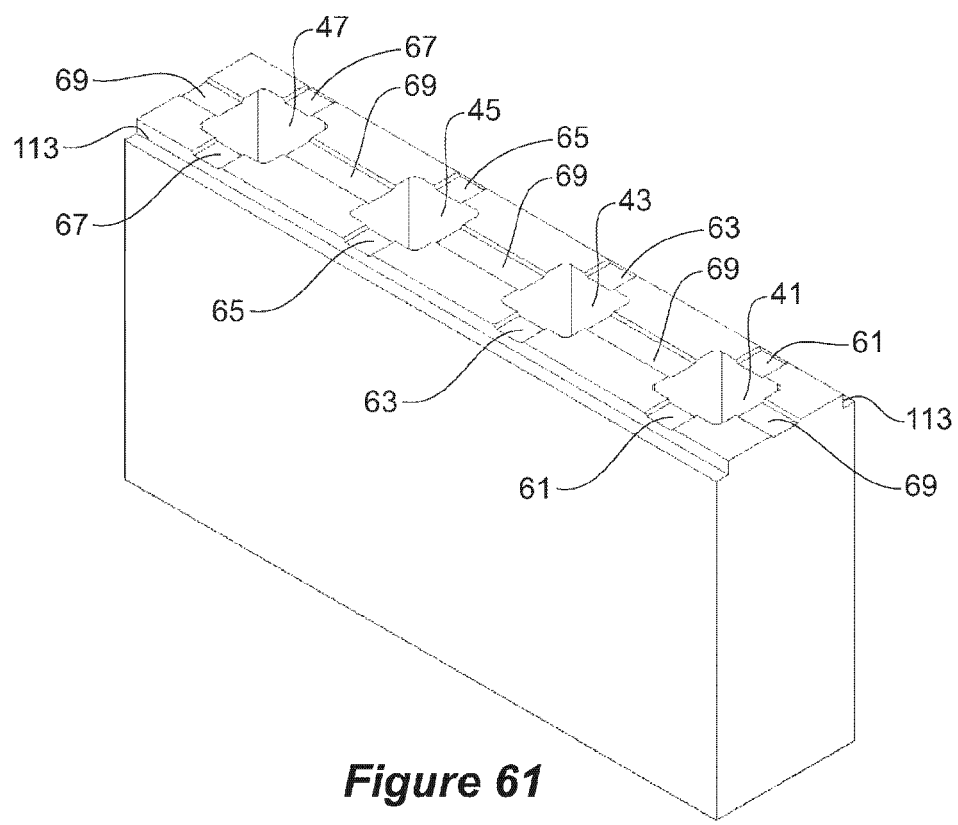
FIGS. 61 and 62 are isometric views of a block according to a further embodiment.
Figure 62:
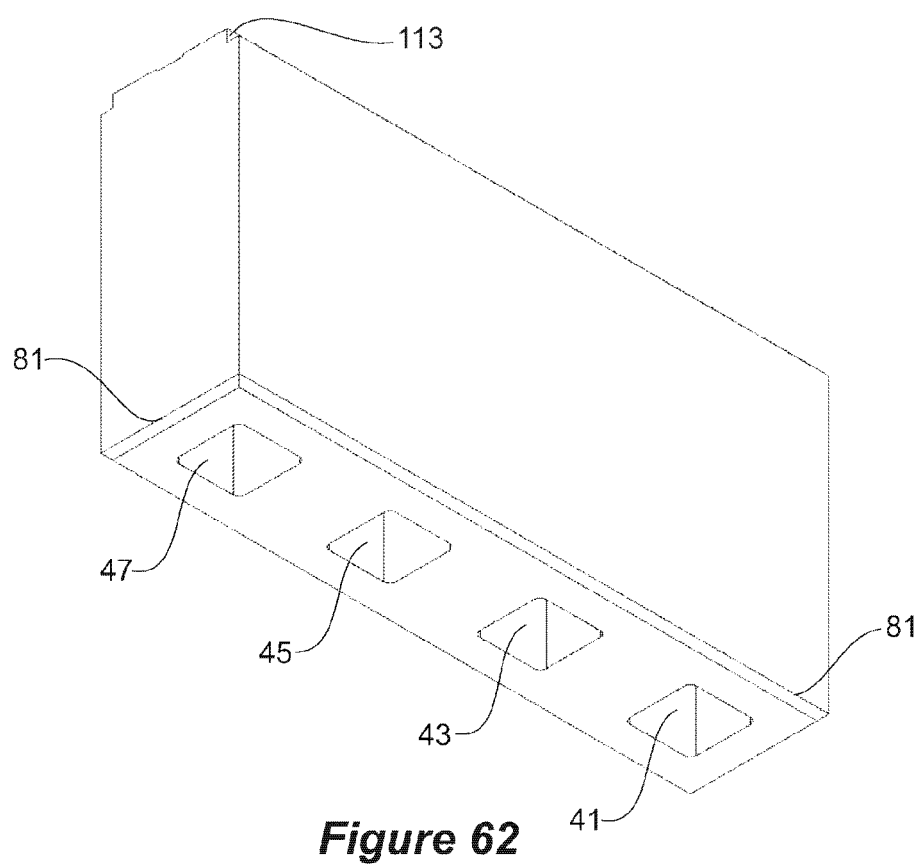
Figure 63:
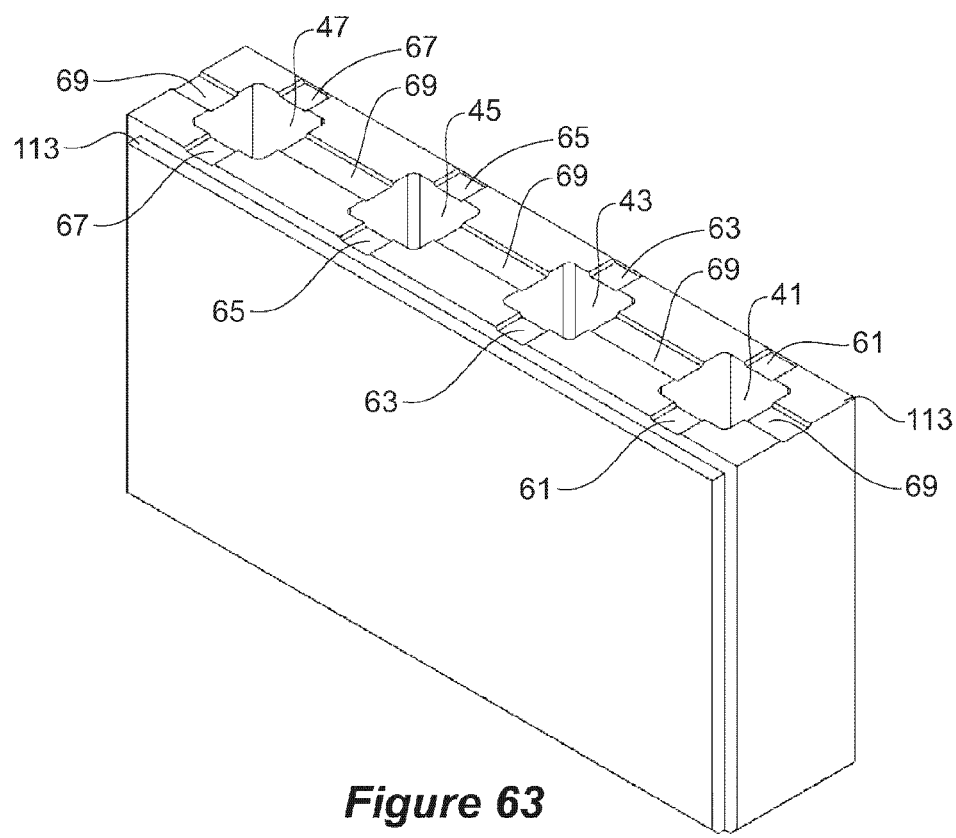
FIGS. 63 and 64 are isometric views of a block according to a further embodiment.
Figure 64:
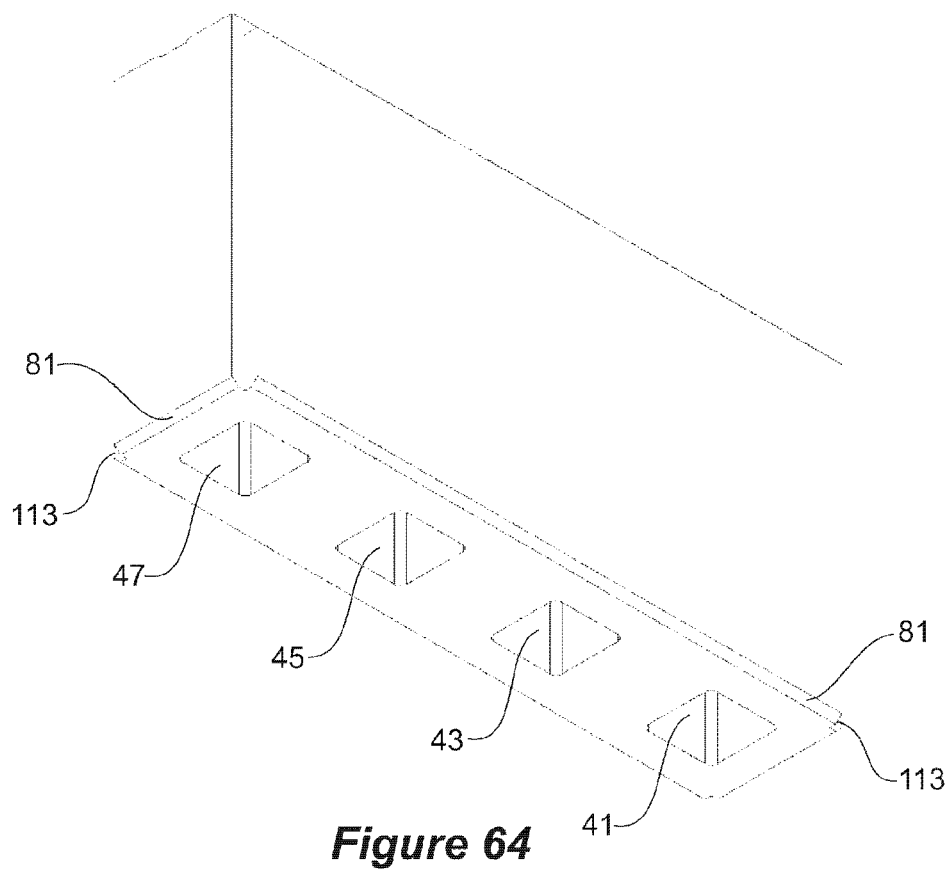
Figure 65:
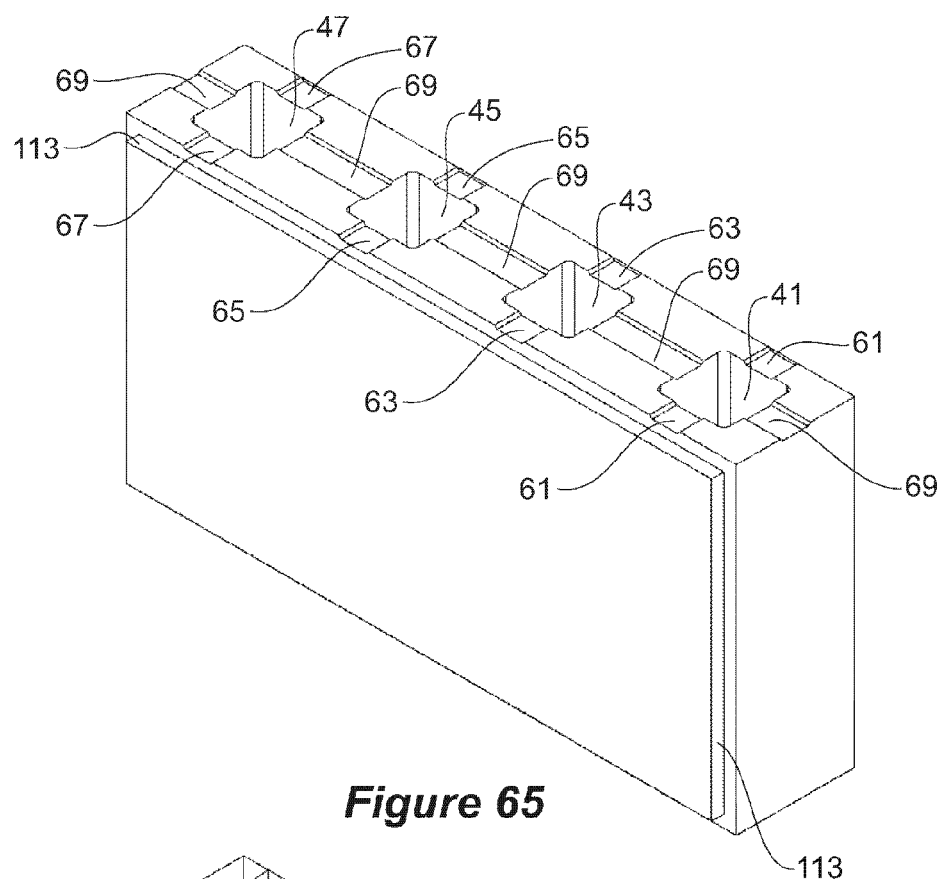
FIGS. 65 and 66 are isometric views of a block according to a further embodiment.
Figure 66:
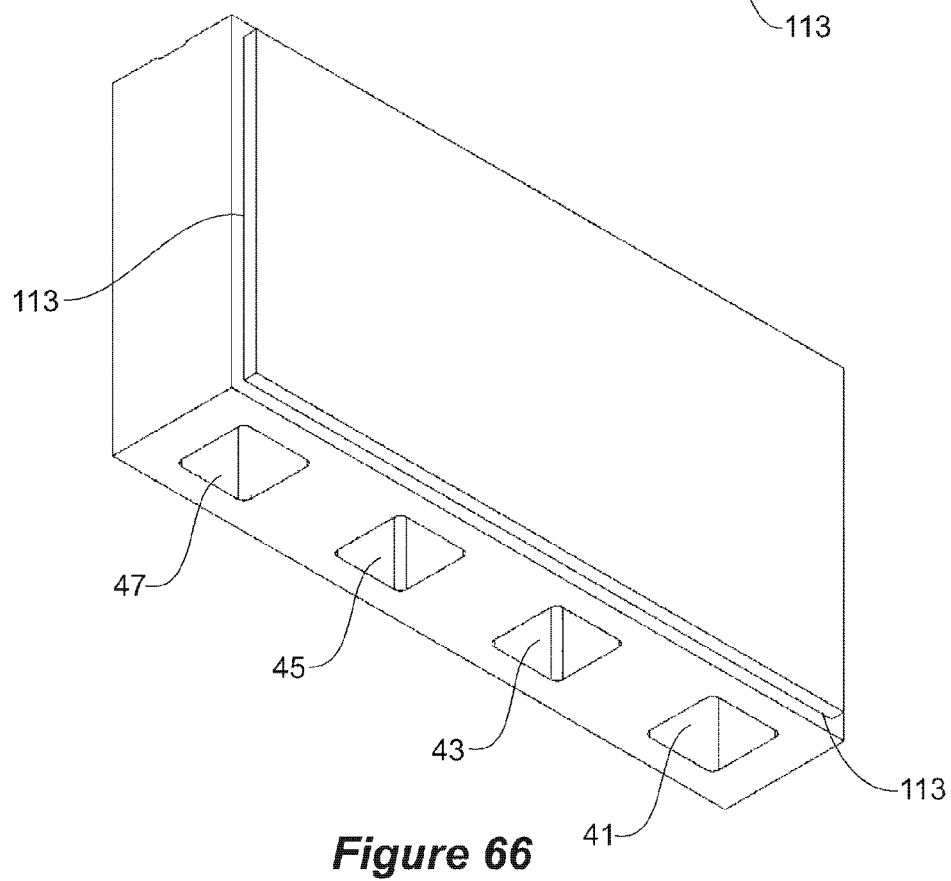
Figure 67:
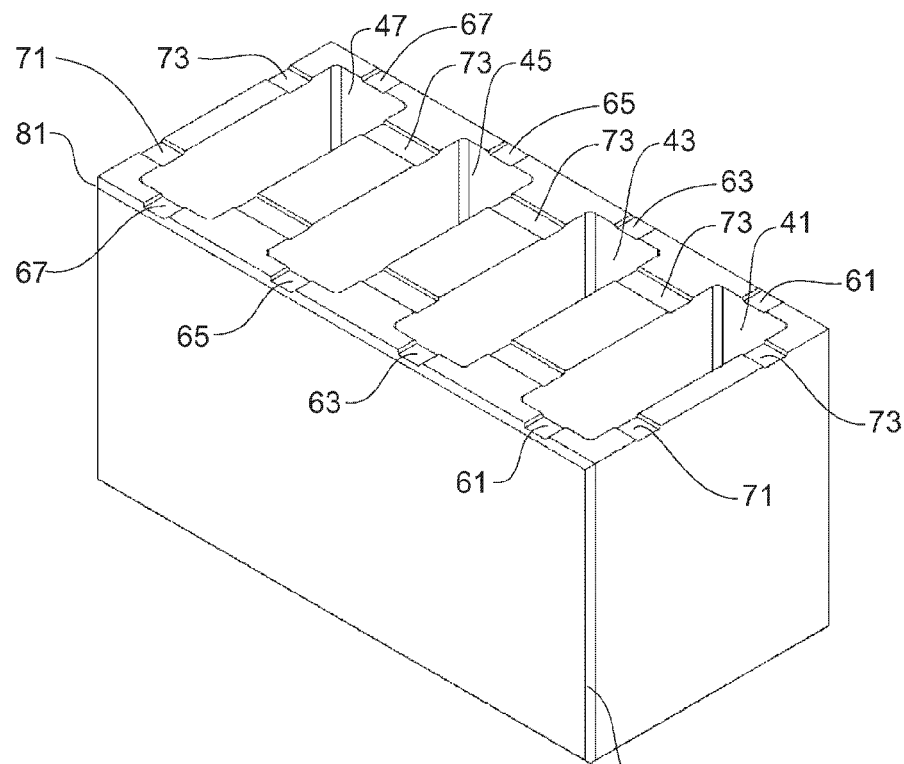
FIG. 67 is an isometric view of a block according to a further embodiment.
Figure 68:
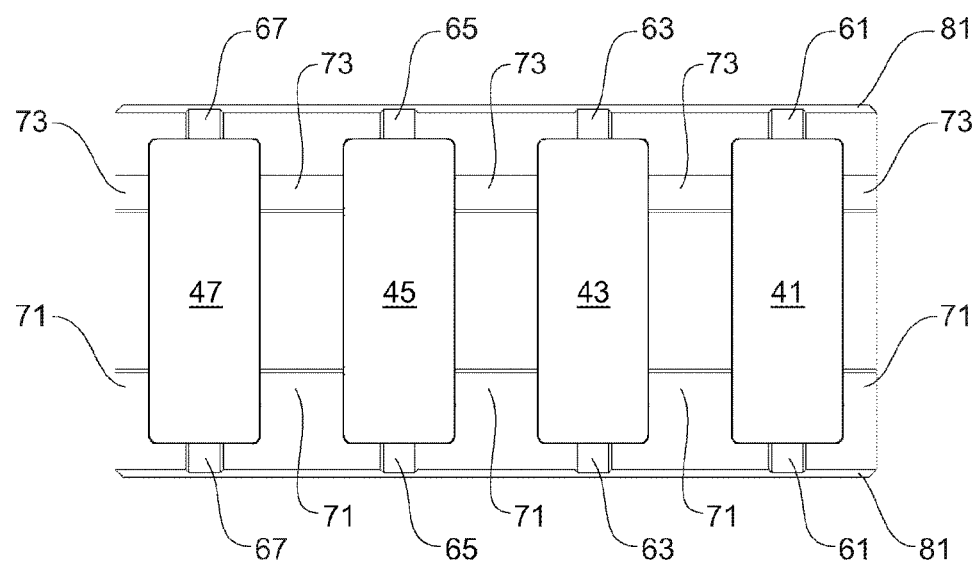
FIG. 68 is a top view of the block according to FIG. 67.
Figure 69:
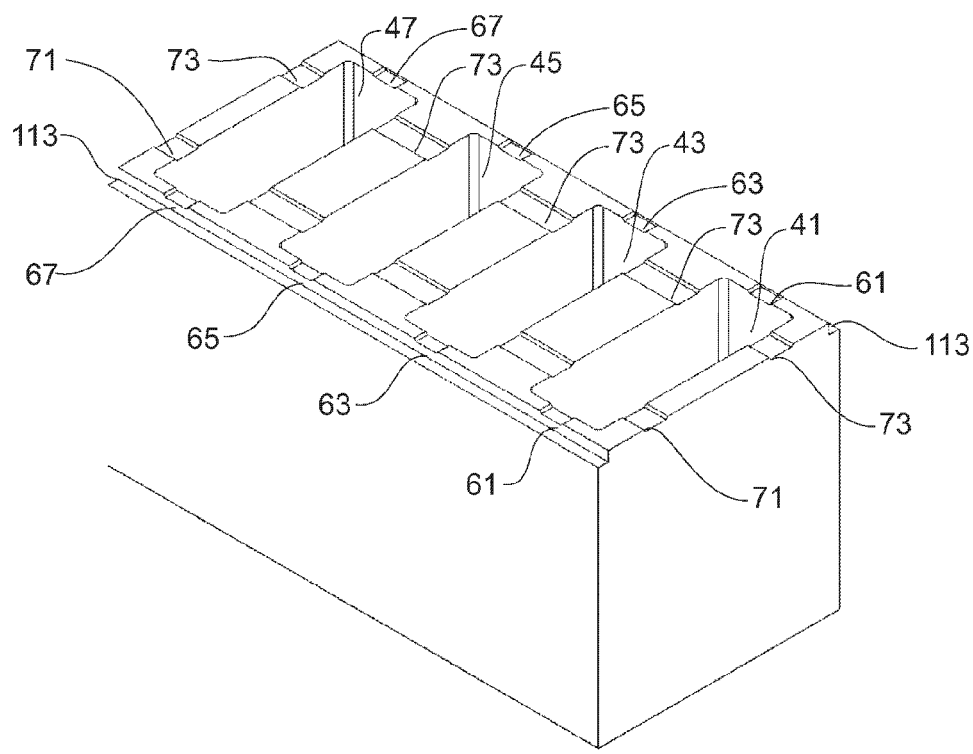
FIGS. 69 and 70 are isometric views of a block according to a further embodiment.
Figure 70:
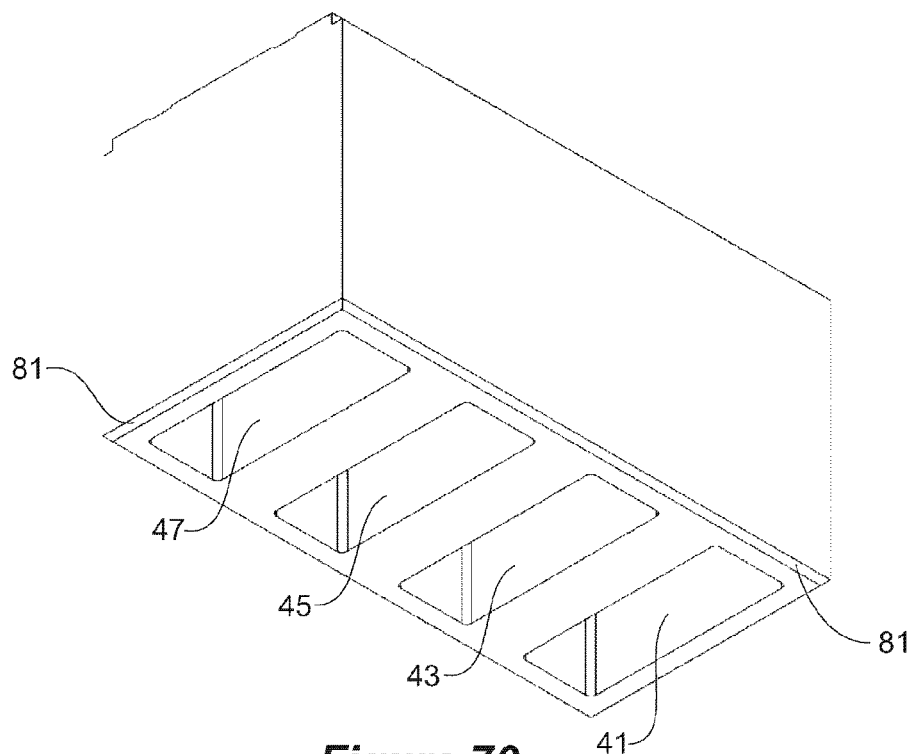
Figure 71:
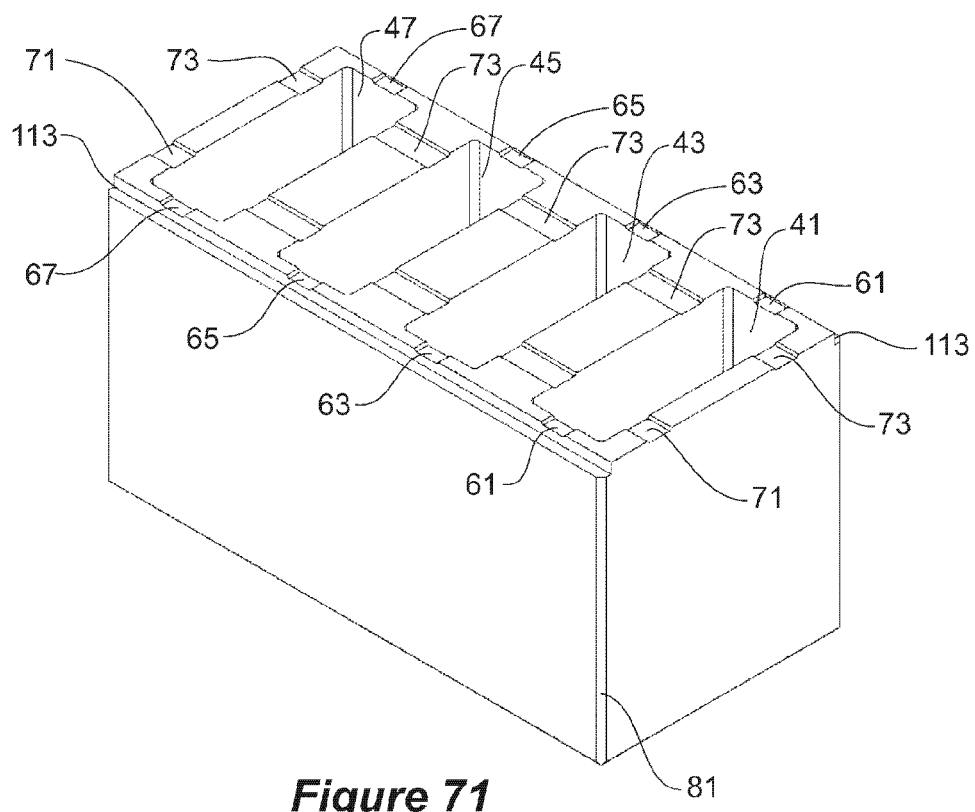
FIGS. 71 and 72 are isometric views of a block according to a further embodiment.
Figure 72:
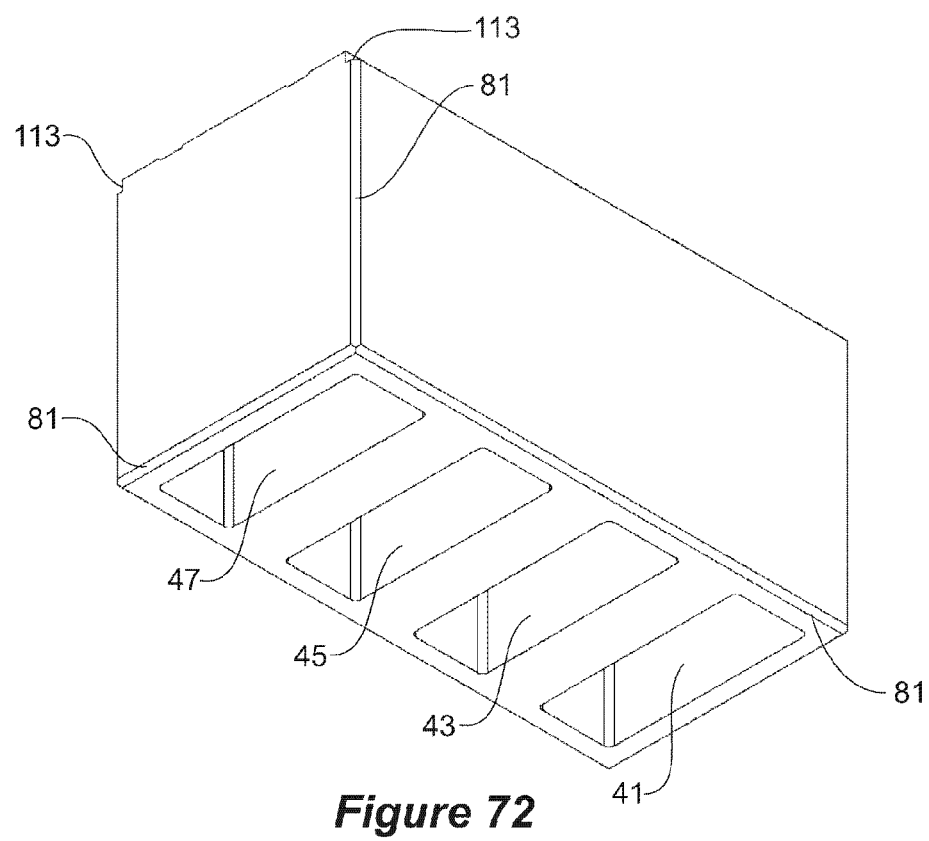
Figure 73:
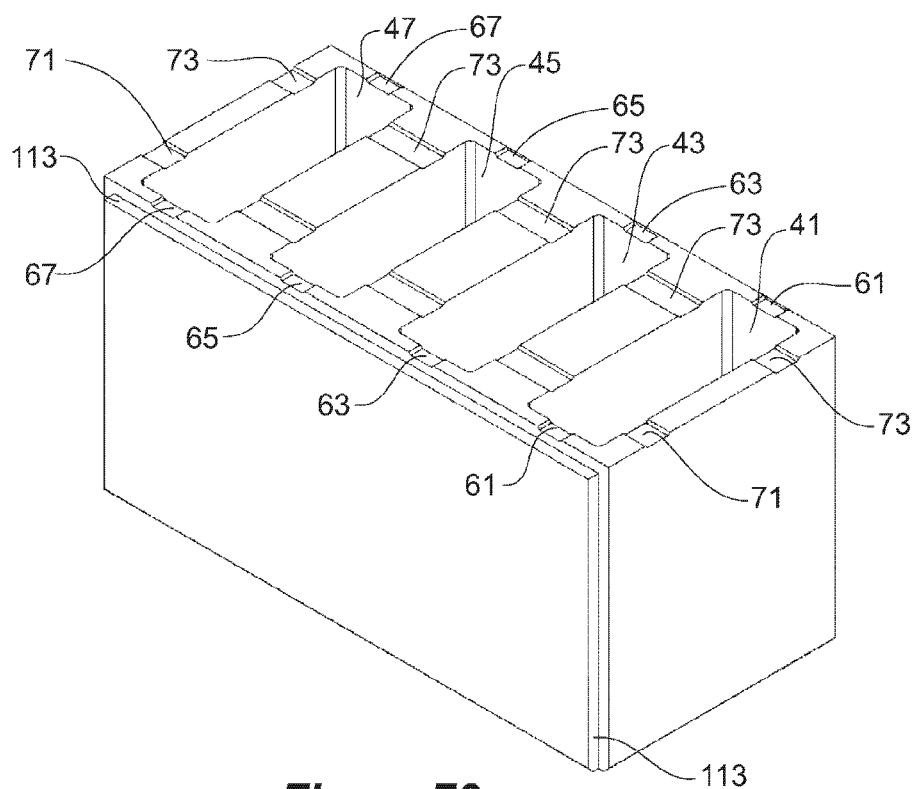
FIGS. 73 and 74 are isometric views of a block according to a further embodiment.
Figure 74:
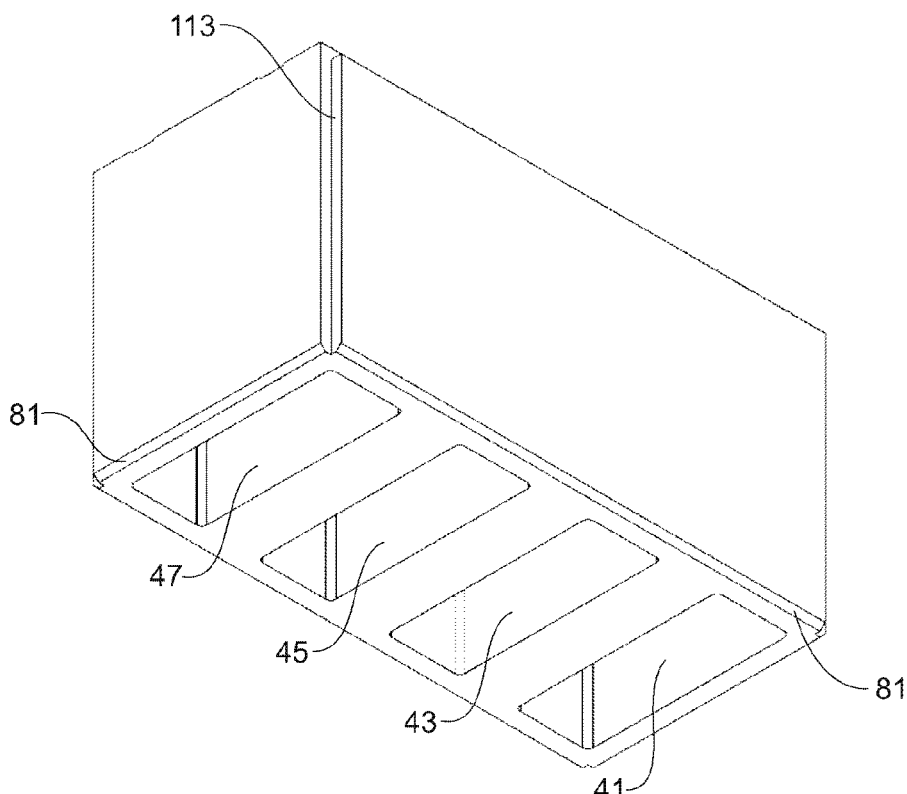
Figure 75:
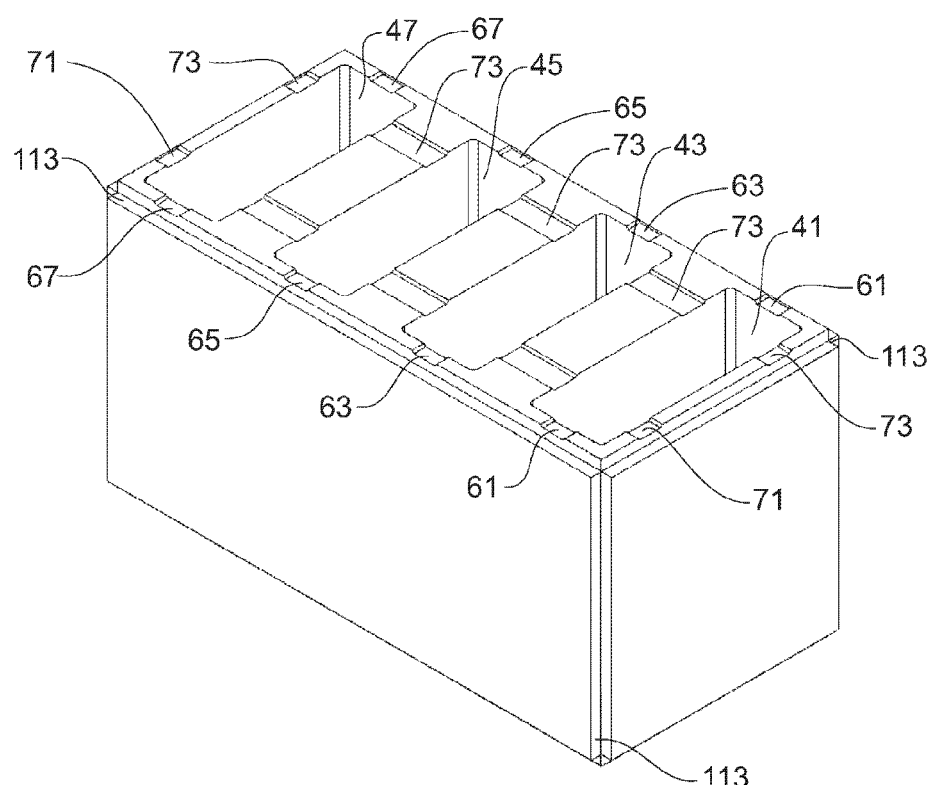
FIGS. 75 and 76 are isometric views of a block according to a further embodiment.
Figure 76:
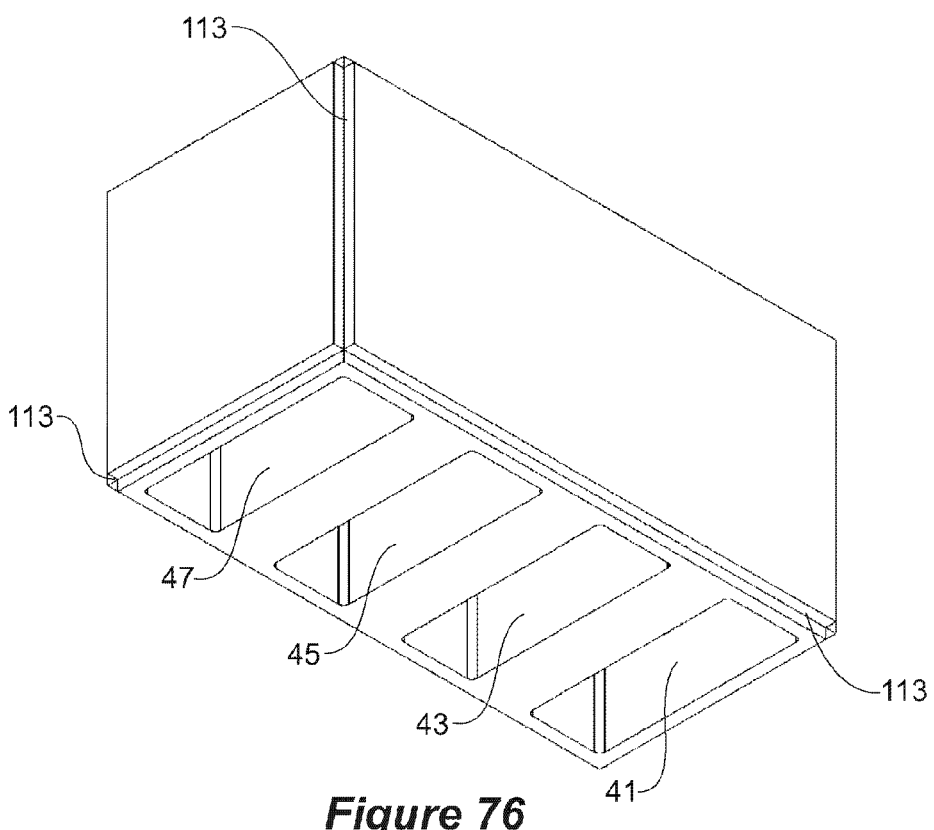

Referring now to FIG. 57, where there is illustrated a wall assembly 400 atop a slab of reinforced concrete 402. The wall assembly 400 includes an external wall that is comprised of a plurality of the blocks 13 laid in a plurality of courses, with an adhesive 421 applied between each course of blocks 13 and a successive course to bond these, and a render 422 applied to both sides thereof. The wall assembly 400 further includes an internal wall 420 comprised of a plurality of the blocks 11 laid in a plurality of courses, with an adhesive 421 applied between each course of blocks 11 and a successive course to bond these, and a render 422 optionally applied to one or both sides thereof.

FIGS. 59 through 66 illustrate 'slot-less' embodiments of the block with cores 41, 43, 45 and 47 of square cross-sectional shape. That is to say, none of these embodiments of the block comprise the slots 51, 53 or 55. With cores 41, 43, 45 and 47 of square cross-sectional shape, these then are the block intended for use in internal walls. Each of these blocks is divisible into a plurality of substantially identical block portions of rectilinear cross-sectional shape, each portion comprising four walls of substantially uniform wall thickness about its core.

FIGS. 67 through 76 illustrate 'slot-less' embodiments of the block with cores of rectangular cross-sectional shape. That is to say, none of these embodiments of the block comprise the slots 51, 53 or 55. With cores of rectangular cross-sectional shape, these then are the blocks intended for use in external walls.

Each of the embodiments of the block illustrated in FIGS. 59 through 76 comprise different combinations of the bevels 81 and steps 113 described and identified with the same reference numerals above, so these will not be described again in detail here, to avoid repetition.

Figure 77:
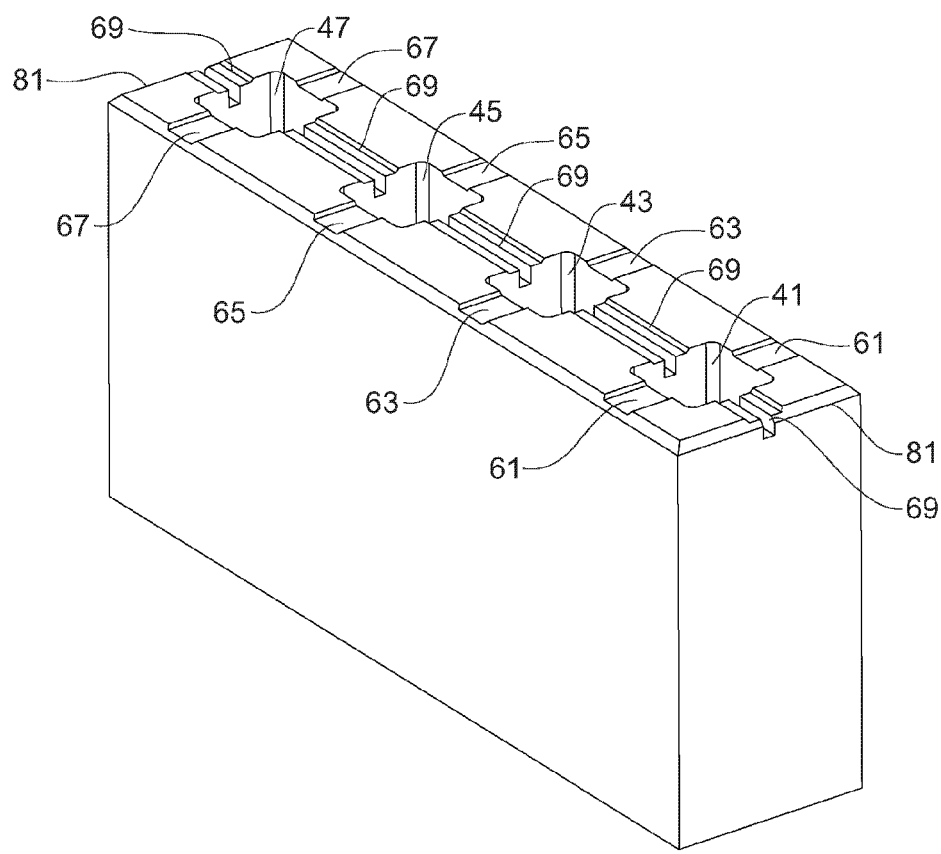
FIG. 77 is an isometric view of a block according to a further embodiment.
Figure 78:
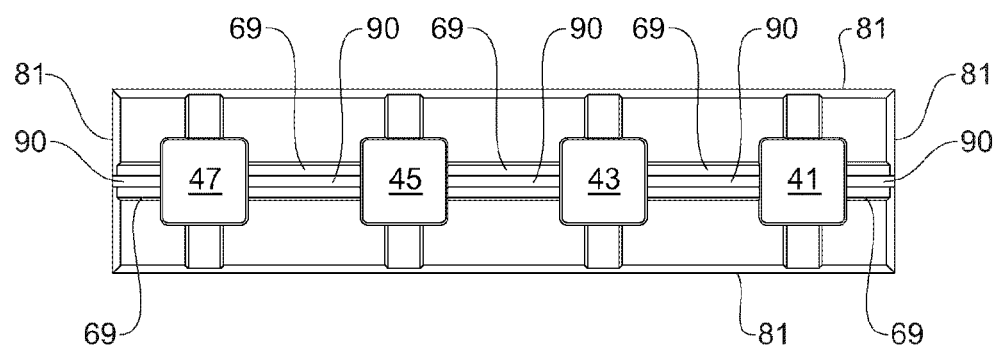
FIG. 78 is a top view of the block according to FIG. 77.
Figure 79:
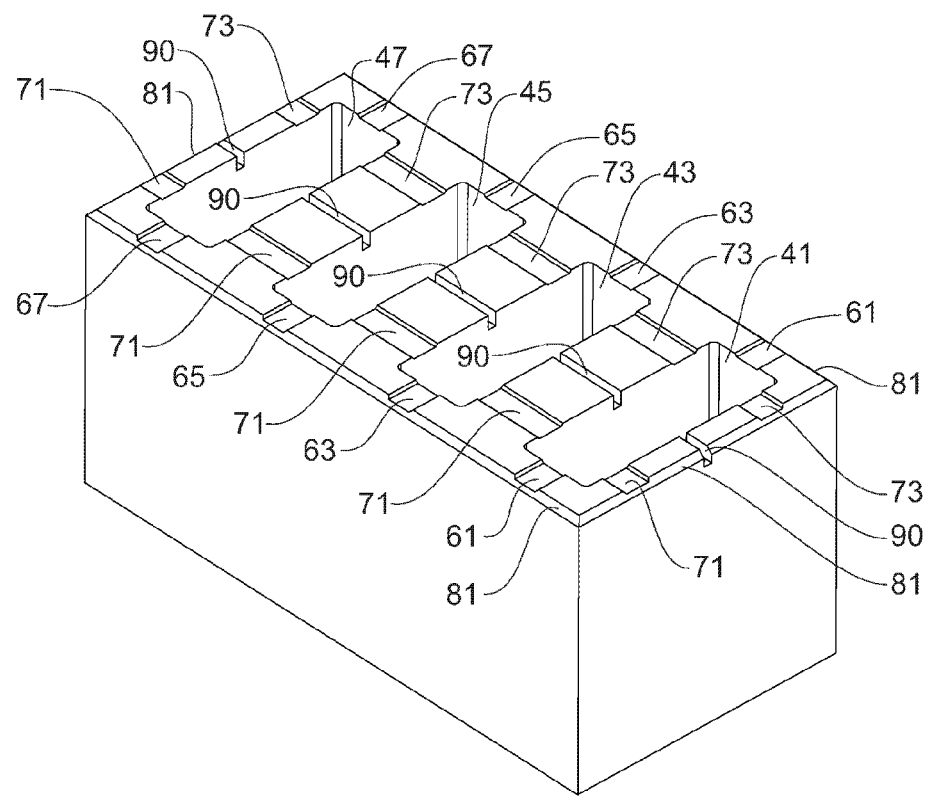
FIG. 79 is an isometric view of a block according to a further embodiment.
Figure 80:
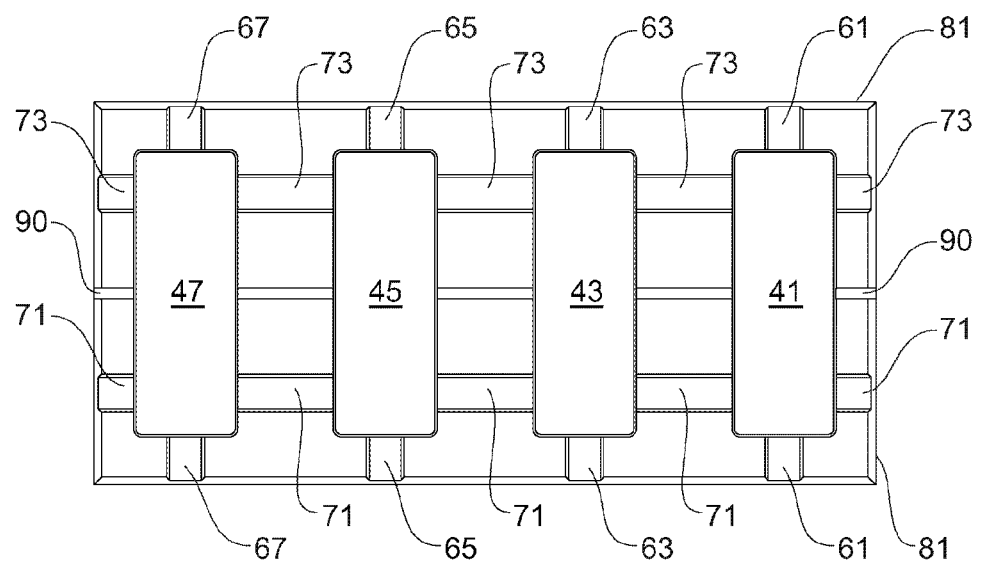
FIG. 80 is a top view of the block according to FIG. 79.

Referring now to FIGS. 77 to 80, further examples of a preferred block for automated building construction are illustrated. In FIGS. 77 to 78, a block 11 for an internal wall is shown. The block 11 is similar to the internal blocks previously described including recessed grooves 61, 63, 65, 67, 69 for tie down clips. In this example, the block 11 has a bevelled edge around the entire perimeter of the top face. Also shown is longitudinally extending slot 90 which extends centrally along the block and which is an artefact of the moulding process. A block 13 of similar design having bevelled edges around the entire top perimeter is shown in FIGS. 79 to 80 for a larger block suitable for an external wall.

Figure 81:
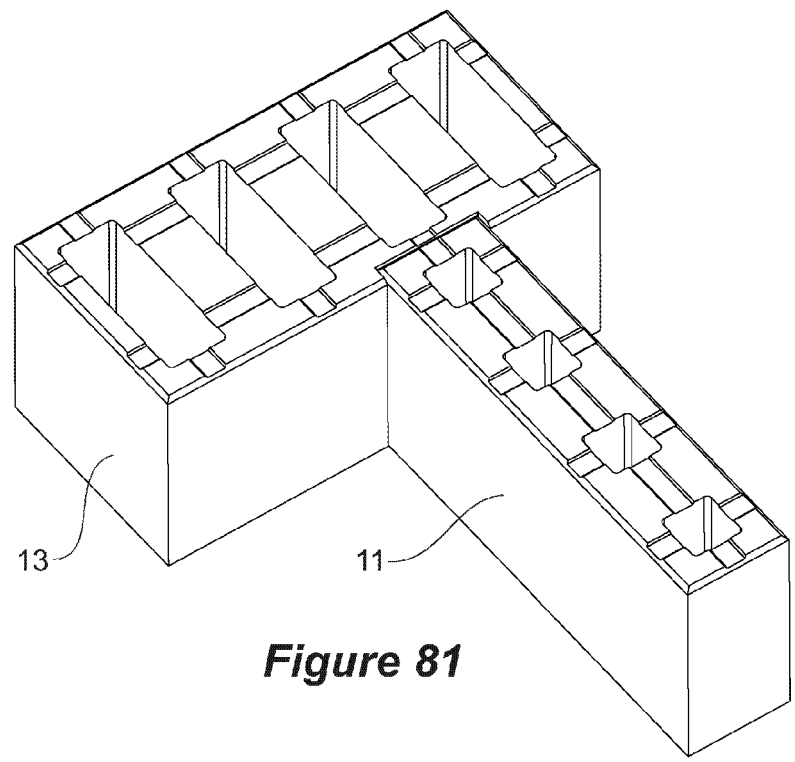
FIG. 81 is a perspective view of an interlocking joint arrangement between an external block and an internal block.
Figure 82:
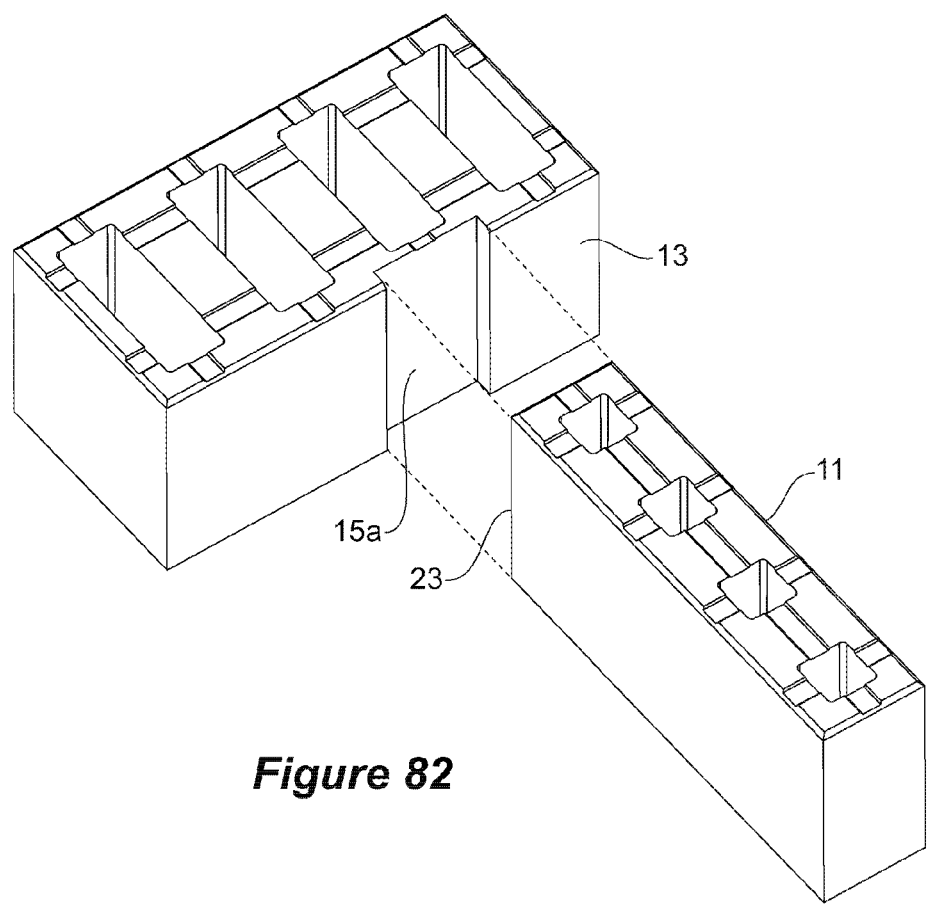
FIG. 82 is an exploded view of the interlocking joint arrangement of FIG. 81.

Whilst the use of tie clips to interlock wall sections at joins between external and internal walls has been previously described, it is to be appreciated that other ways of 'keying in' the walls may be used as an alternative. In one example, as shown in FIGS. 81 to 82, a cut-out or groove 15A is routed into a side face of the body 15 of an external block 13 proximate and aligned with one of the cores. The width of the cut-out is substantially the same as the width of an internal block so that during assembly an end 23 of an internal block 11 is inserted into the groove to thereby tie the blocks together. This may be repeated on each course or on at least alternating courses.

Figure 83:
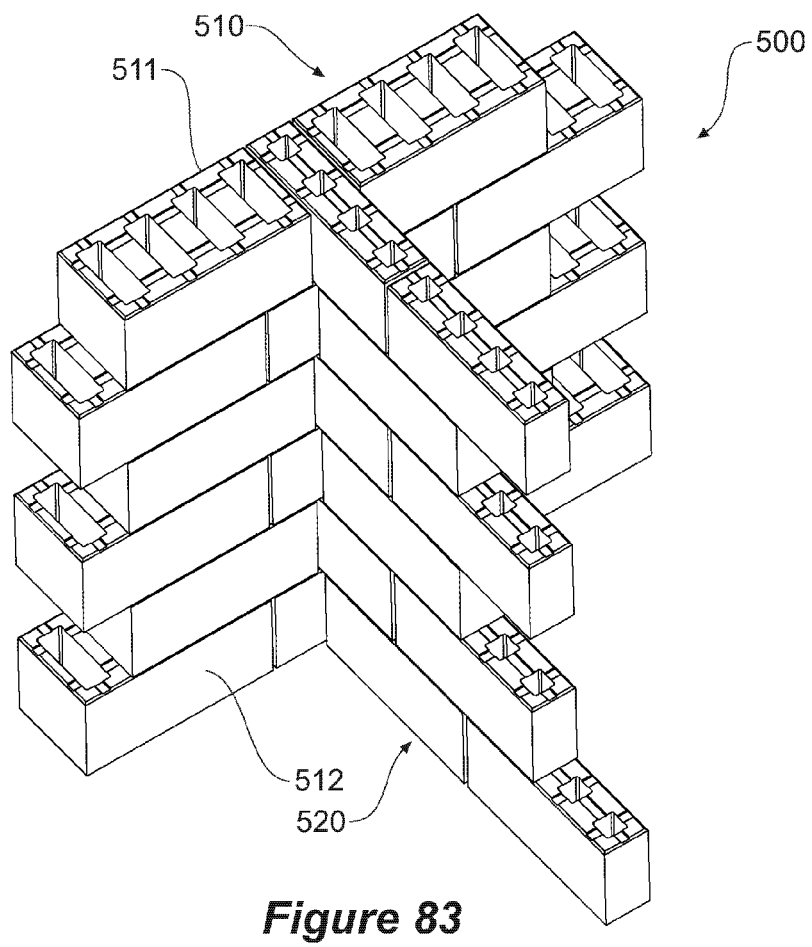
FIG. 83 is a perspective view of part of a wall assembly showing an intersection between an internal wall and an external wall.
Figure 84:
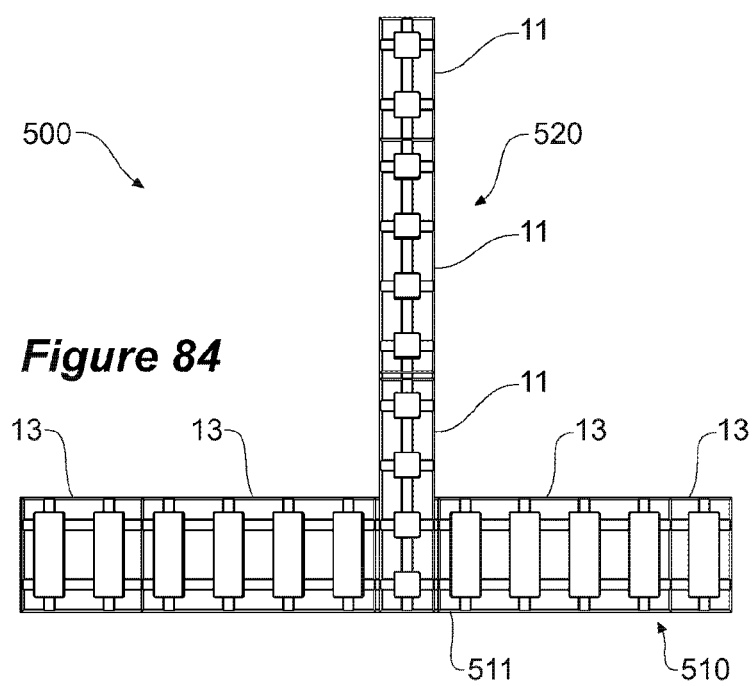
FIG. 84 is a plan view of the wall assembly of FIG. 83.
Figure 85:
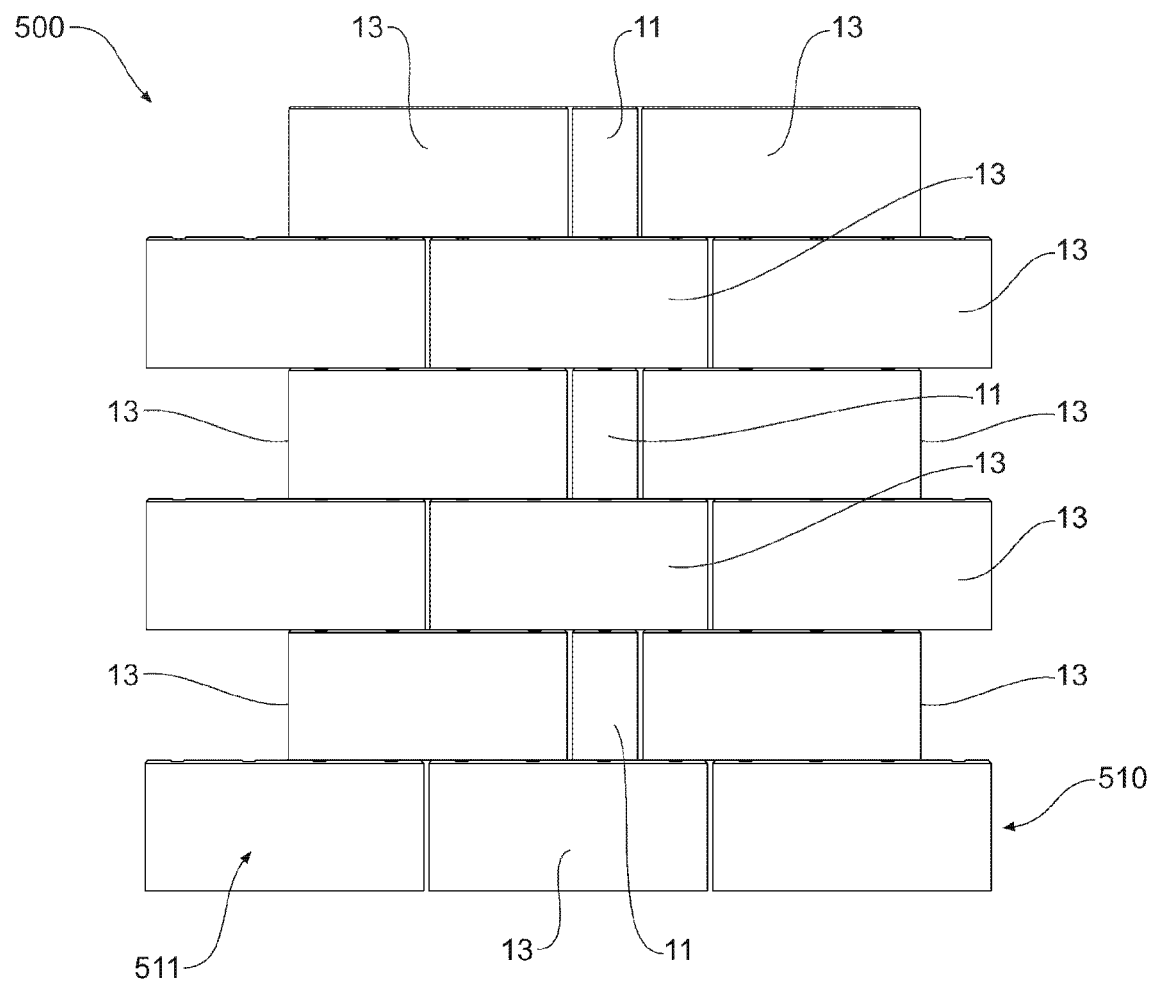
FIG. 85 is an exterior view of the wall assembly of FIG. 83.

An alternative and preferred method of keying in the blocks is shown in FIGS. 83 to 85. In this example, a wall assembly 500 is shown comprising an external wall 510 joined to an internal wall 520. The internal wall 520 is tied into the external wall 510 by inserting internal blocks 11 between adjacent external blocks 13 for at least alternating courses of blocks so that ends of the internal blocks 11 lay flush with an outer face 511 of an external wall 510. Internal blocks 11 of the other courses may be in abutment with an inner face 512 of the external wall 510. Preferably, internal blocks 11 that extend to the outer face 511 of the external wall 510 are laid onto external blocks below (and external blocks laid above) so that the hollow cores of the internal blocks are aligned with the hollow cores of the external blocks. As a result, the internal blocks are usually offset from centre with regard to the external blocks located above and below.

Described herein is a block which is well suited to use in an automated brick laying machine, and a wall assembly constructed from the blocks via such a machine.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A block for use in automated building construction, the block comprising:
   a cuboid body having:
   a) a top and a base;
   b) a length extending between a pair of opposed ends;
   c) a width extending between a pair of opposed sides;
   d) a plurality of hollow cores extending from said top to said base, and arranged in a row between said opposed ends; wherein each core has a rectilinear cross-sectional shape, wherein a first thickness is formed between each pair of adjacent cores and a second thickness is formed on all other sides of each core; and
   wherein the first thickness of the block between each pair of adjacent cores is at least double the second thickness of the block on all other sides of each core, so that the block is divisible into a plurality of substantially identical block portions of rectilinear cross-sectional shape, each portion having a respective core, each portion including four walls of a substantially uniform wall thickness about the respective core, and wherein the walls extending about the cores include a plurality of secondary cores extending from said top to said base, the secondary cores separated by a plurality of webs, wherein the block includes at least one tongue located at a first of the opposed ends, and at least one groove located at a second of the opposed ends, each groove being configured to at least partially accommodate a tongue of an adjacent block, wherein each tongue and each groove extend vertically from the top to the base of the block.

2. The block according to claim 1, wherein the block includes four hollow cores, so as to be divisible into four substantially identical block portions.

3. The block according to claim 1, wherein the cores comprise at least one of:
   a) a square cross-sectional shape; and,
   b) a rectangular cross-sectional shape.

4. The block according to claim 1, wherein each hollow core is spaced evenly from each of the opposed sides, and the hollow cores adjacent each end are spaced evenly therefrom.

5. The block according to claim 1, further including at least one rectangular recess for accommodating a rectangular-section tie plate, wherein the at least one rectangular recess is located on a top face of the block and extends one or more of:
   i) transversely between a respective hollow core and a side of the block;
   ii) longitudinally between a respective hollow core and an end of the block; and,
   iii) longitudinally between respective hollow cores of the block.

6. The block according to claim 1, wherein a respective said block portion is divided from the block by a cut made at a midpoint between adjacent cores.

7. The block according to claim 1, wherein the block is for use in constructing an external wall, the block having:
   a) a length of approximately 490 mm;
   b) a width of approximately 240 mm;
   c) a height of approximately 230 mm; and,
   d) a dry mass of approximately 17 to 22 kg.

8. The block according to claim 1, wherein the block is for use in constructing an internal wall, the block having:
   a) a length of approximately 490 mm;
   b) a width of approximately 115 mm;
   c) a height of approximately 230 mm; and
   d) a dry mass of approximately 10 to 14 kg.

9. The block according to claim 1, wherein the block is manufactured from a mixture including at least:
   a) water;
   b) cement; and,
   c) a lightweight expanded aggregate being one of:
   i) an expanded clay aggregate;
   ii) an expanded slate aggregate;
   iii) an expanded shale aggregate; and
   iv) an expanded glass aggregate.

10. The block according to claim 9, wherein the mixture further includes one or more of:
    a) a plasticizer; and
    b) a fine aggregate.

11. The block according to claim 9, wherein the mixture includes: lightweight expanded aggregate is a lightweight expanded clay aggregate (LECA) having particles of diameter at least one of 0 mm-1 mm, 1 mm-2 mm, 2 mm-3 mm, 3-4 mm, 4 mm-5 mm, 5 mm-6 mm, 7 mm-8 mm, 8 mm-9 mm and 9 mm-10 mm.

12. A wall assembly including a plurality of said blocks according to claim 1 laid in a plurality of courses, and an adhesive applied between each course of blocks and a successive course to bond these.

13. The wall assembly according to claim 12, further including one or more block portions divided from a block or a remainder thereof by a cut made at a midpoint between adjacent cores.

14. The wall assembly according to claim 12, wherein cores of blocks in the wall assembly are used as conduits for carrying services for a building.

15. The wall assembly according to claim 12, further including a render applied to at least external surfaces thereof.

16. The wall assembly according to claim 15, wherein the render is an acrylic non-porous render to seal a wall from moisture ingress.

17. The wall assembly according to claim 12, wherein the adhesive is machine applied to the base of a block before being laid onto a lower course.

18. The wall assembly according to claim 17, wherein at least two parallel beads of adhesive are applied onto the base of a block along a lengthwise extent thereof.

19. The wall assembly according to claim 17, wherein the adhesive is further applied onto one or more end faces of a block so as to form a perp joint with an adjacent block in a course.

20. The wall assembly according to claim 12, wherein the wall assembly is assembled using a plurality of first blocks having a first width and a plurality of second blocks having a second width twice that of said first width plus the thickness of the spacing between the blocks.

21. The wall assembly according to claim 20, wherein the first blocks are internal blocks that are used substantially in the construction of internal walls and the second blocks are external blocks that are used substantially in the construction of external walls.

22. The wall assembly according to claim 21, wherein internal walls are tied into external walls by at least one of:
  a) inserting internal blocks between adjacent external blocks for at least alternating courses of blocks so that ends of the internal blocks lay flush with an outer face of an external wall;
  b) forming a cut-out in an inner face of one or more external blocks and locating an internal block into the cut-out to thereby interlock the blocks; and
  c) by tie clips used in one or more of the courses.

23. The wall assembly according to claim 21, wherein internal walls are tied into external walls so that overlapping hollow cores of respective internal and external blocks are substantially aligned.

* * * * *